(12) United States Patent
Jones et al.

(10) Patent No.: US 11,390,046 B2
(45) Date of Patent: Jul. 19, 2022

(54) SYSTEM AND METHOD FOR APPLYING TUBULAR MATERIAL ONTO A MANDREL

(71) Applicant: The Boeing Company, Chicago, IL (US)

(72) Inventors: Darrell D. Jones, Mill Creek, WA (US); Paul Chace Wilcoxson, Kent, WA (US); Raviendra S. Suriyaarachchi, Daniel Island, SC (US)

(73) Assignee: The Boeing Company, Chicago, IL (US)

( * ) Notice: Subject to any disclaimer, the term of this patent is extended or adjusted under 35 U.S.C. 154(b) by 7 days.

(21) Appl. No.: 16/876,677

(22) Filed: May 18, 2020

(65) Prior Publication Data

US 2021/0354403 A1 Nov. 18, 2021

(51) Int. Cl.
*B29C 70/54* (2006.01)
*B29C 70/30* (2006.01)

(52) U.S. Cl.
CPC .............. *B29C 70/54* (2013.01); *B29C 70/30* (2013.01)

(58) Field of Classification Search
CPC ............................ B65G 47/907; B29C 70/542
See application file for complete search history.

(56) References Cited

U.S. PATENT DOCUMENTS

| | | |
|---|---|---|
| 2006/0231981 A1 | 10/2006 | Lee |
| 2013/0086873 A1 | 4/2013 | Bahr |
| 2014/0033491 A1* | 2/2014 | Donaldson .......... B29C 66/1224 29/237 |

FOREIGN PATENT DOCUMENTS

EP 2889127 1/2015

* cited by examiner

*Primary Examiner* — Barbara J Musser

(57) ABSTRACT

A tubular material application system for applying a tubular material onto an elongate mandrel includes a gripper system including a first gripper and a second gripper configured to move with inchworm-type movement along an elongated mandrel and incrementally apply a tubular material onto the mandrel to thereby result in a tubular material-mandrel assembly.

20 Claims, 33 Drawing Sheets

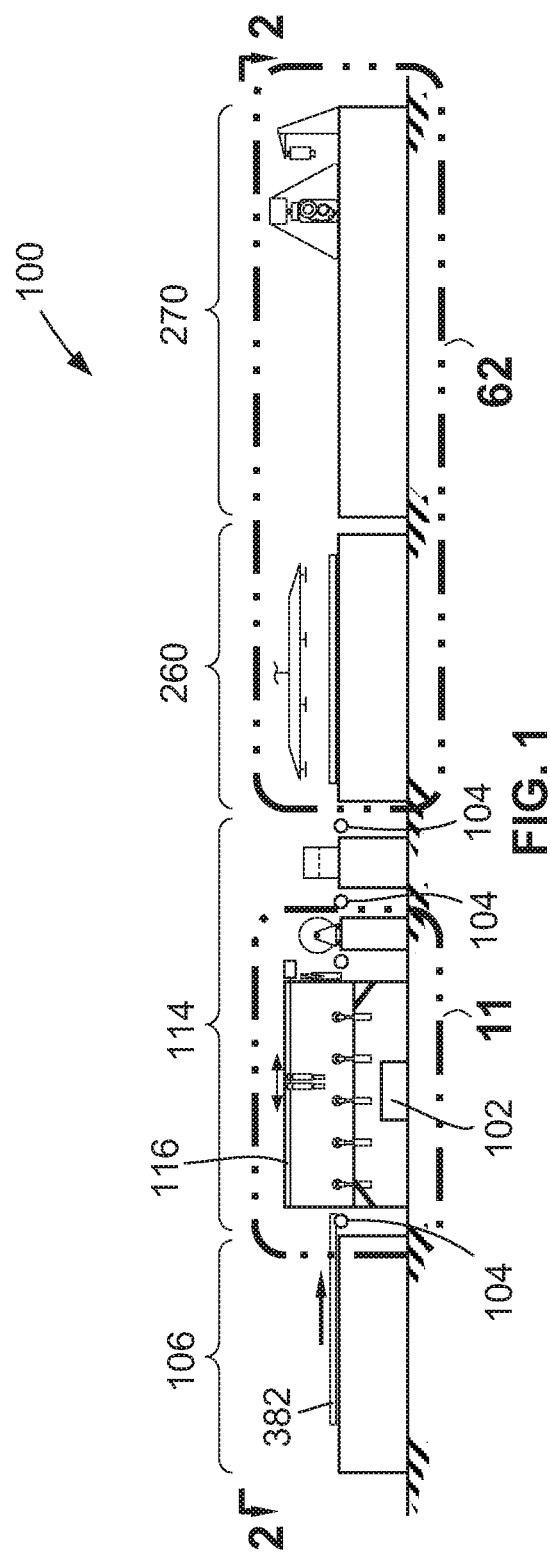
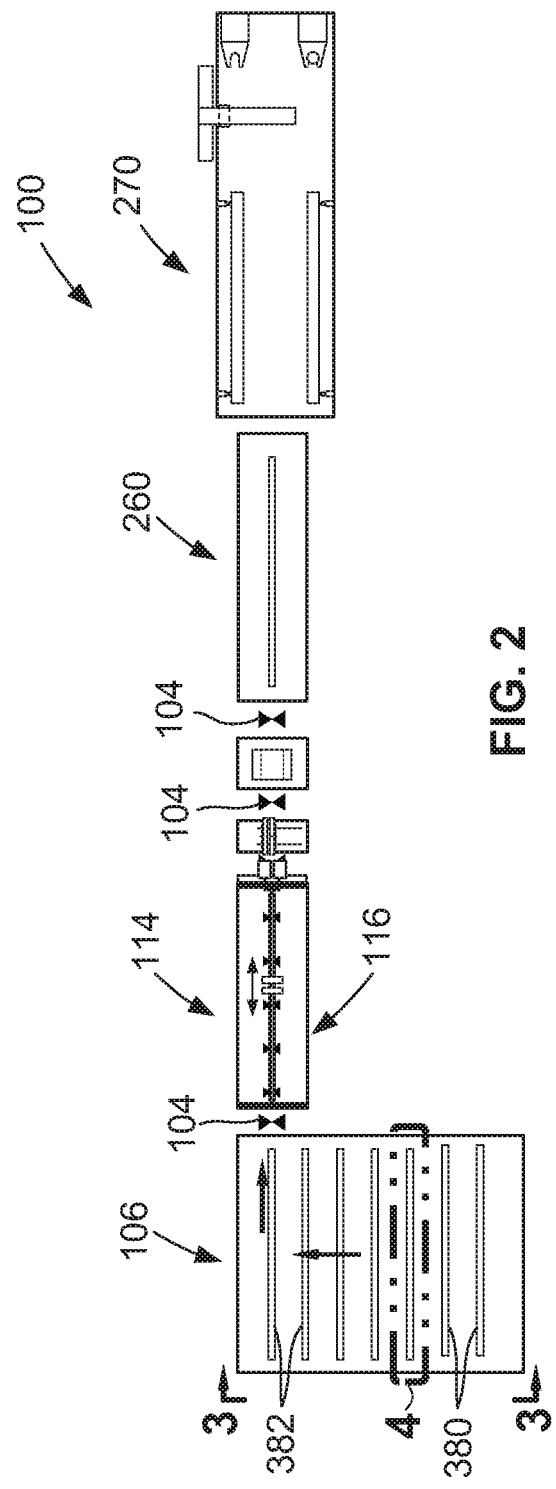

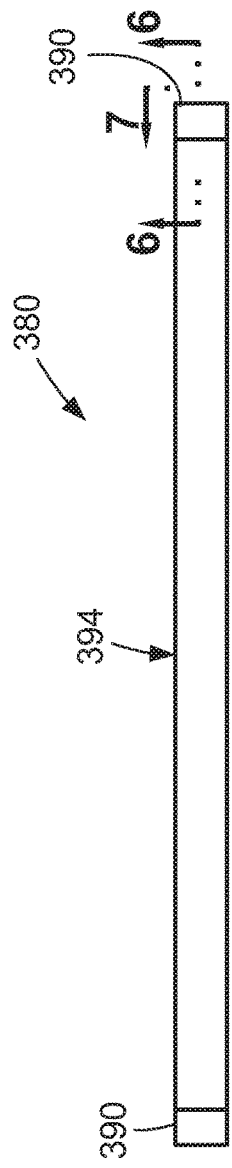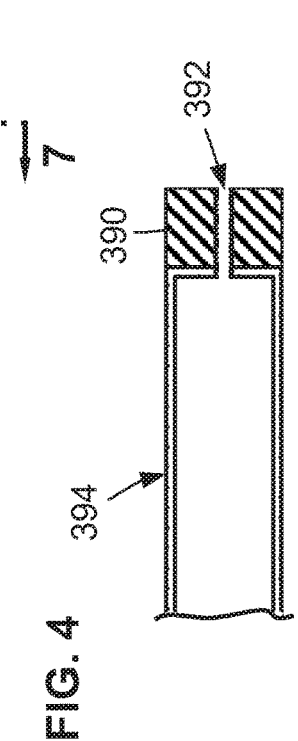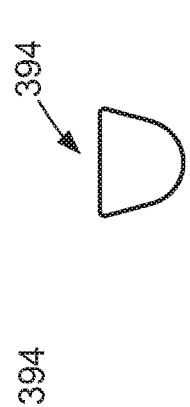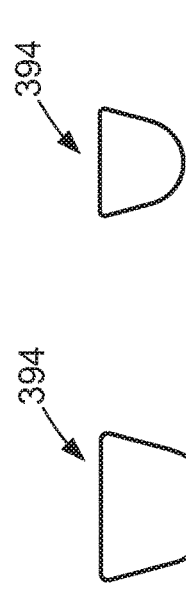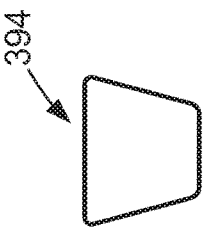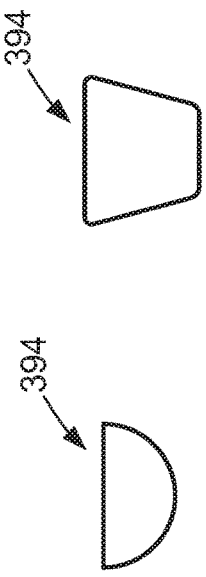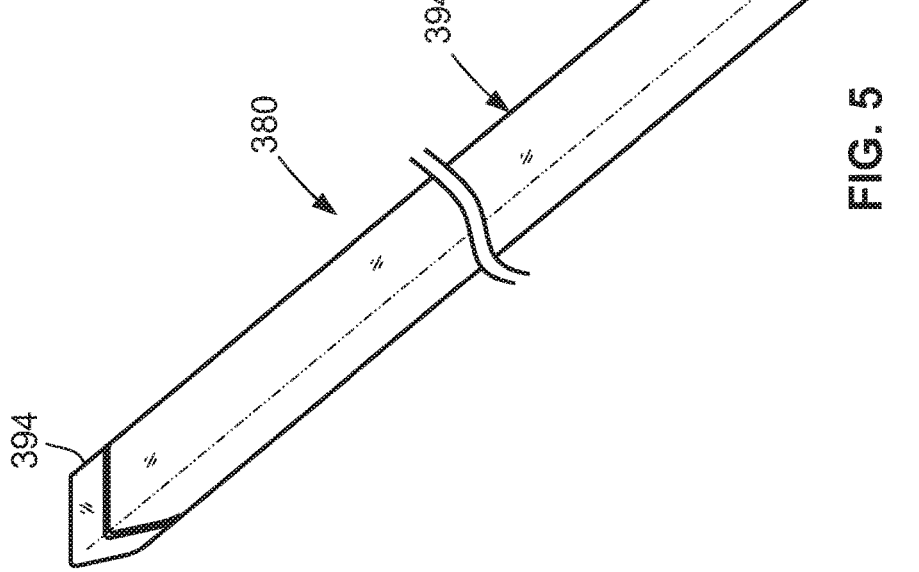

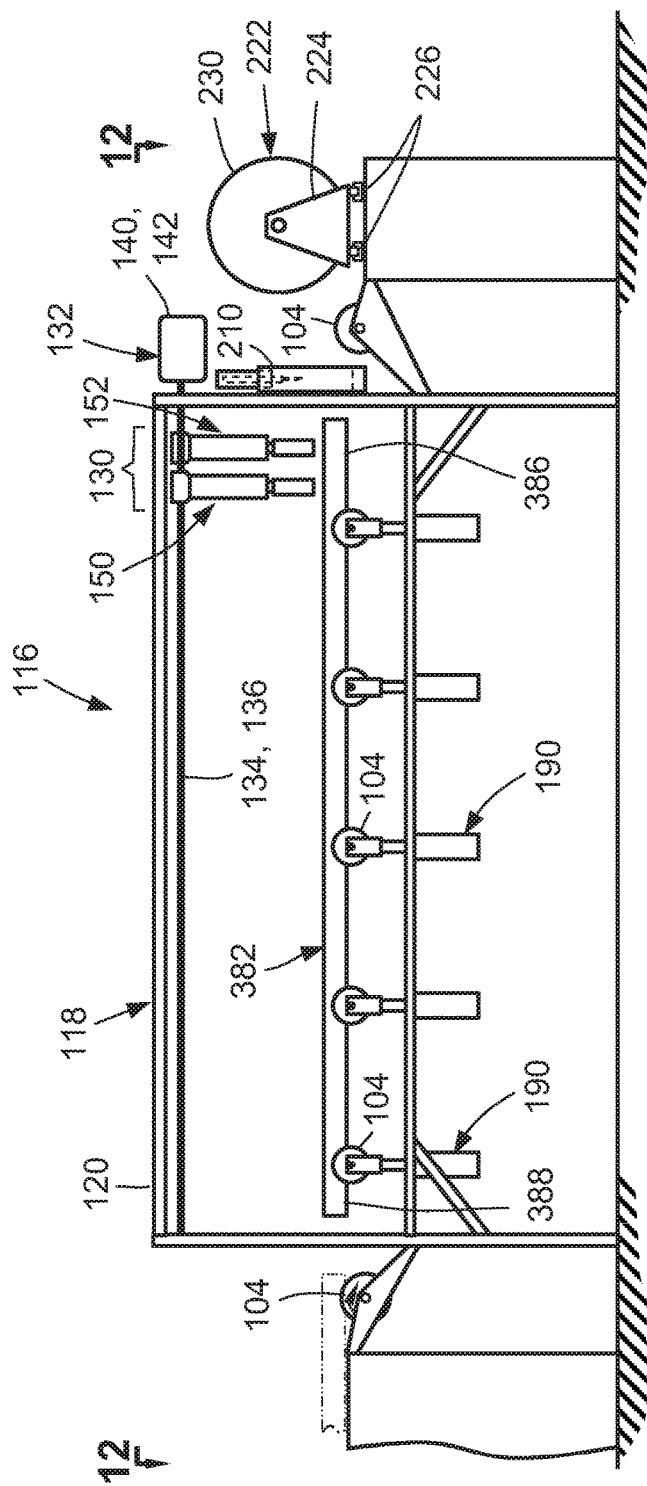
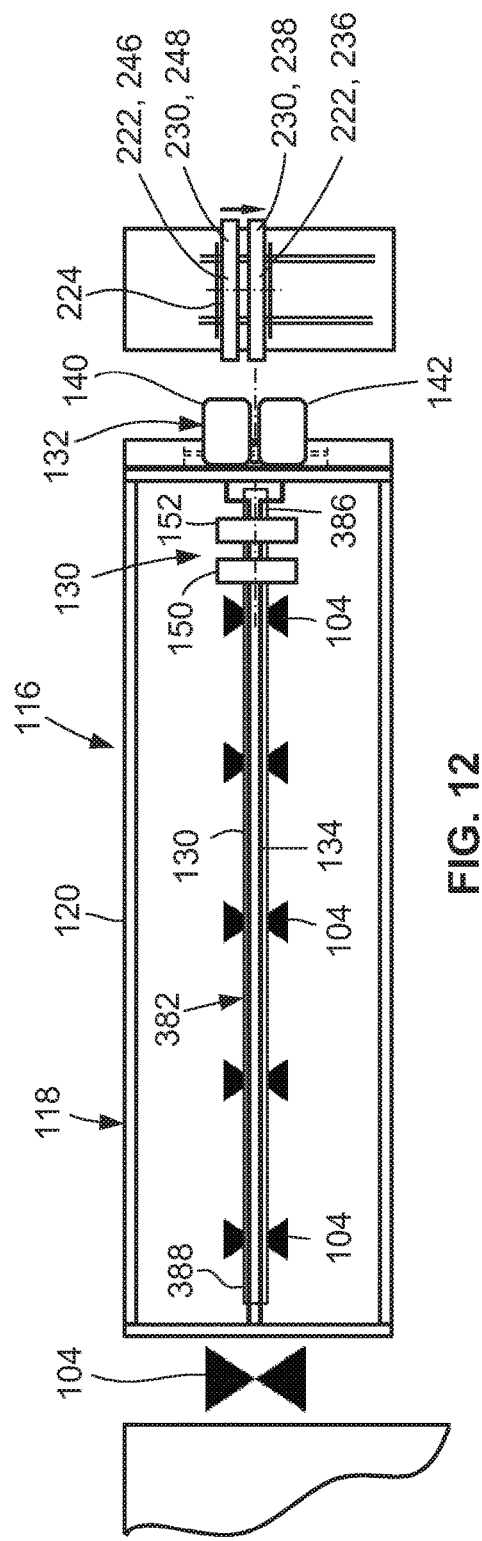
FIG. 11
FIG. 12

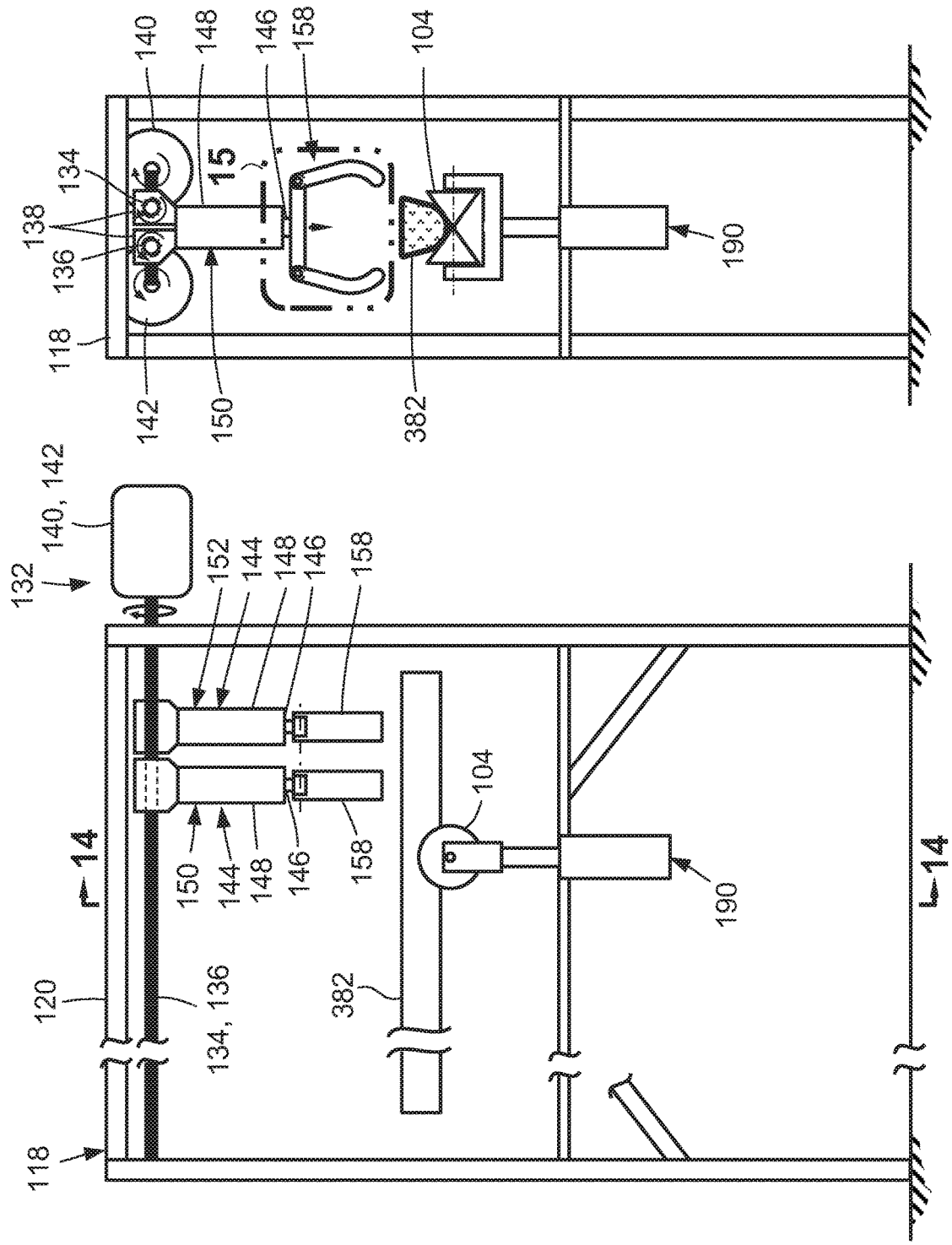

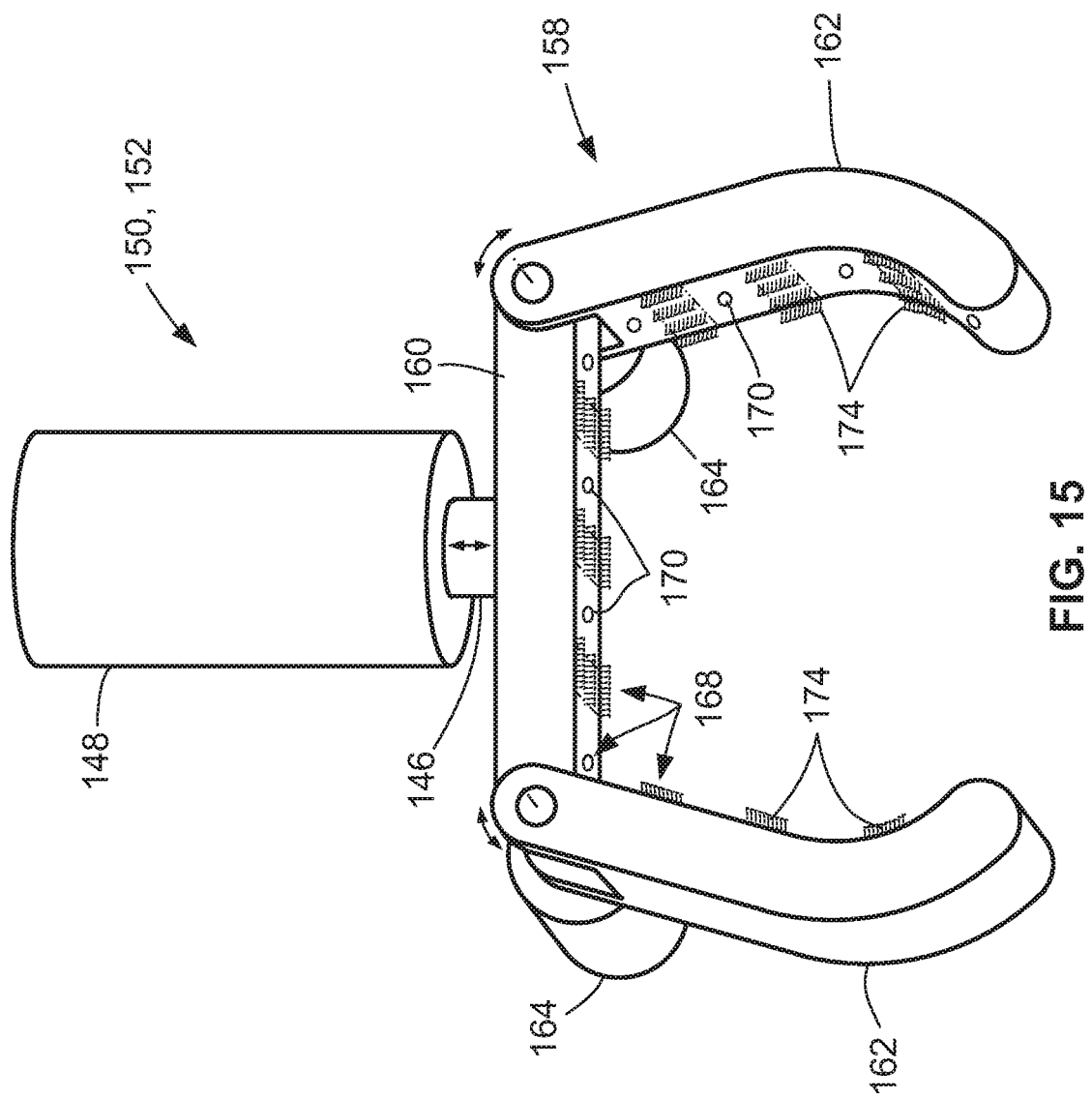

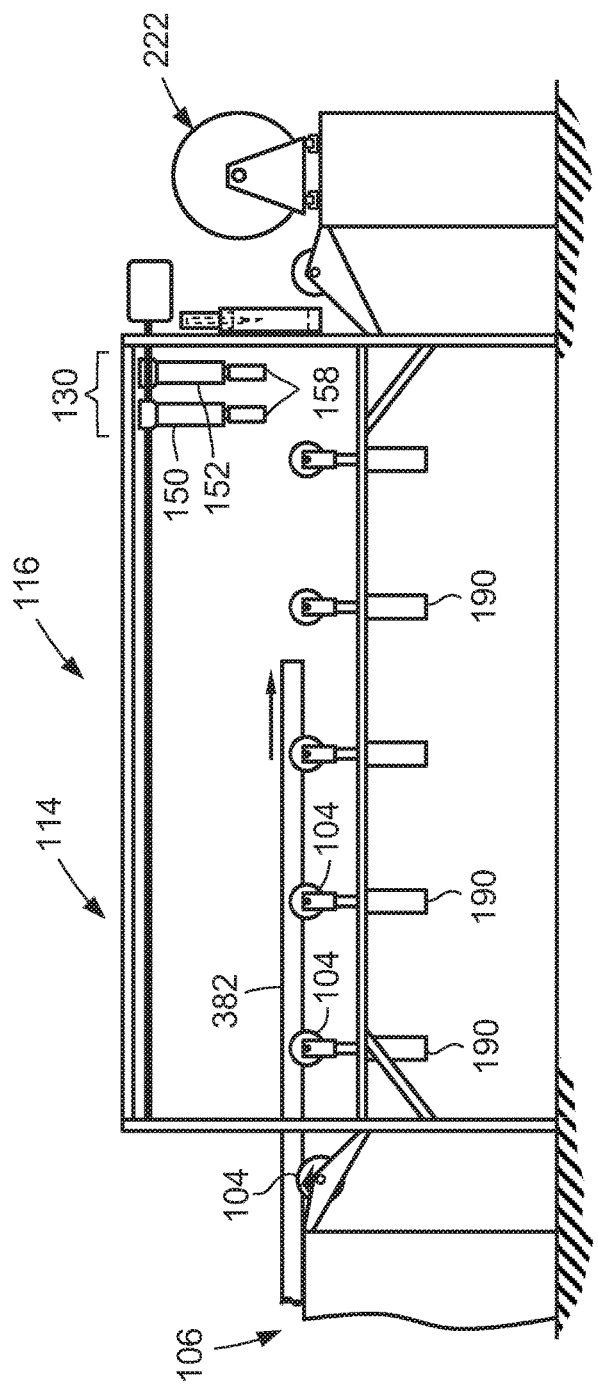
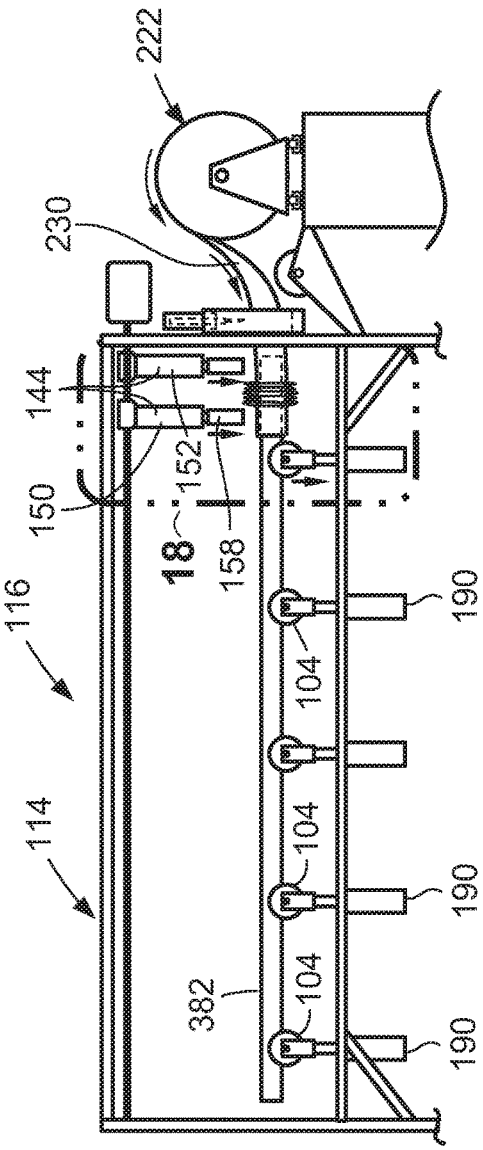

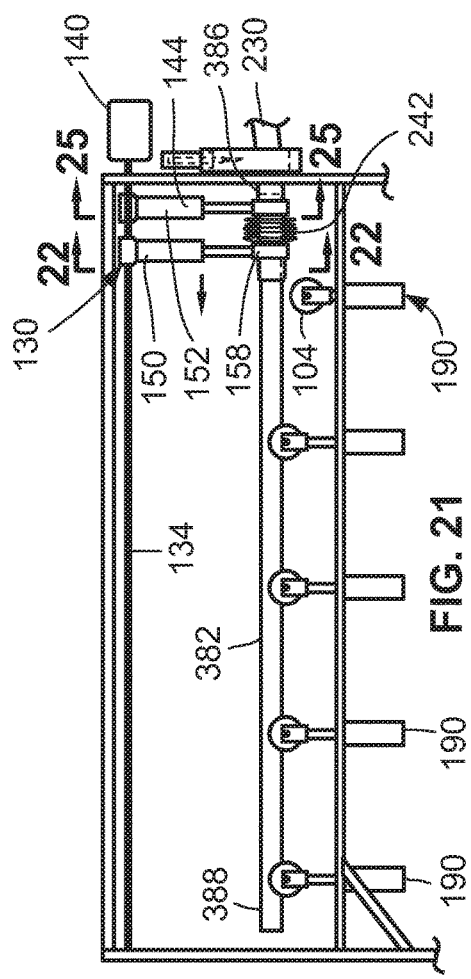
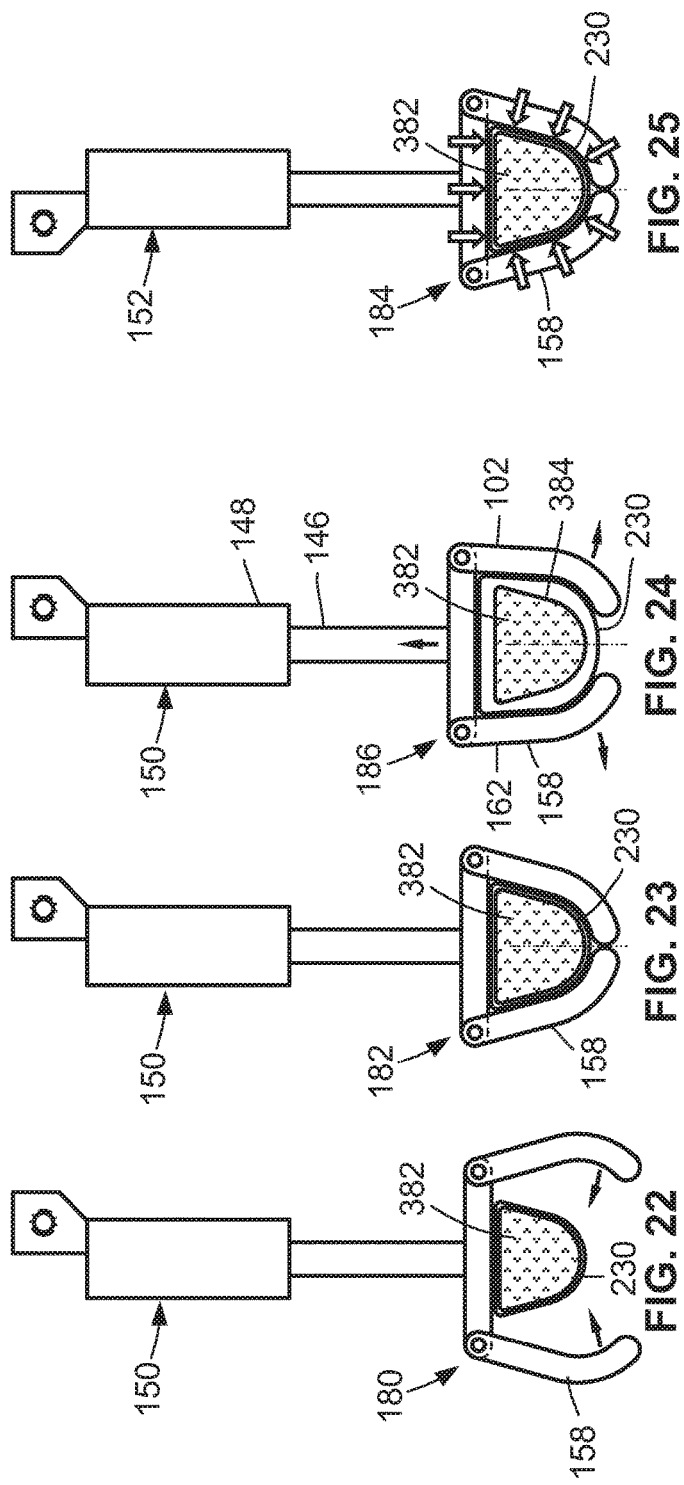

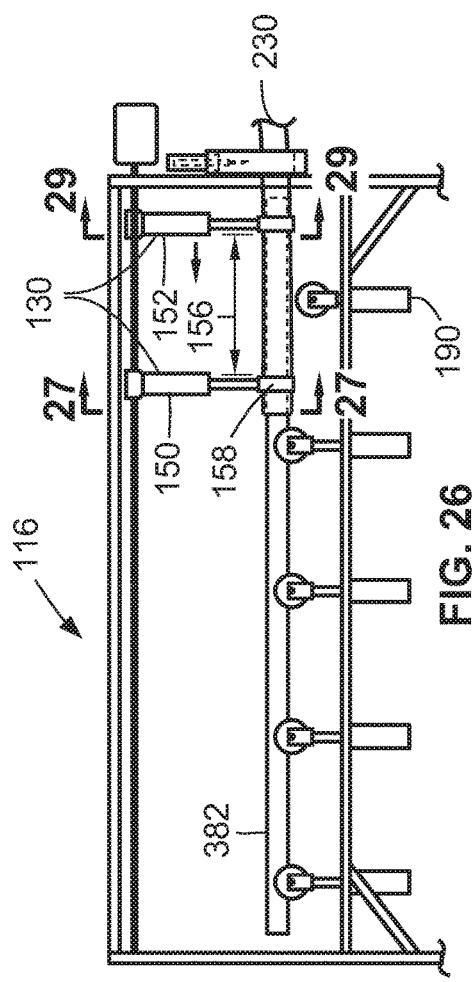
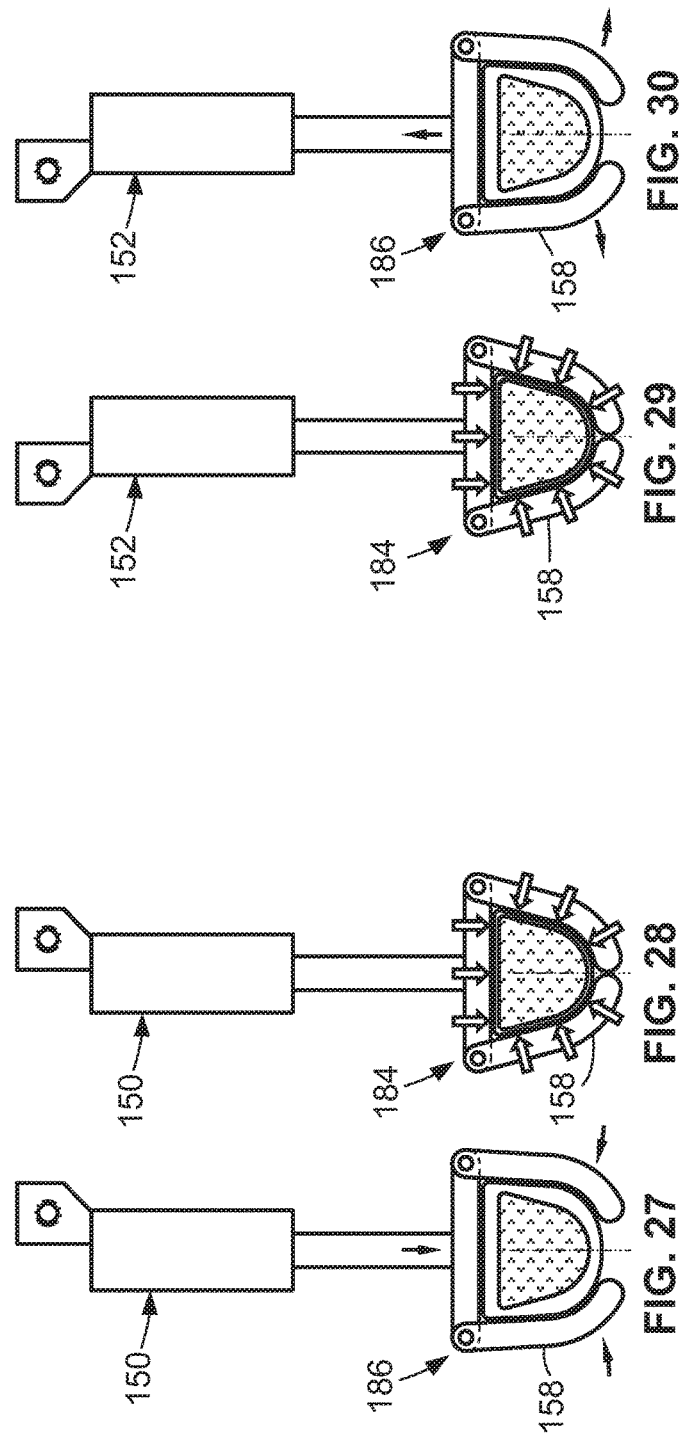

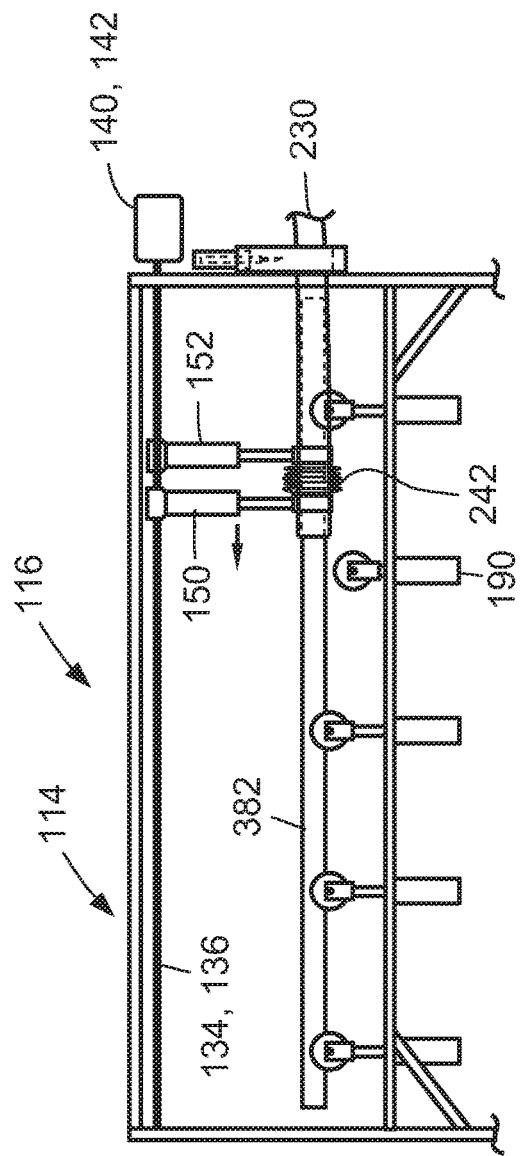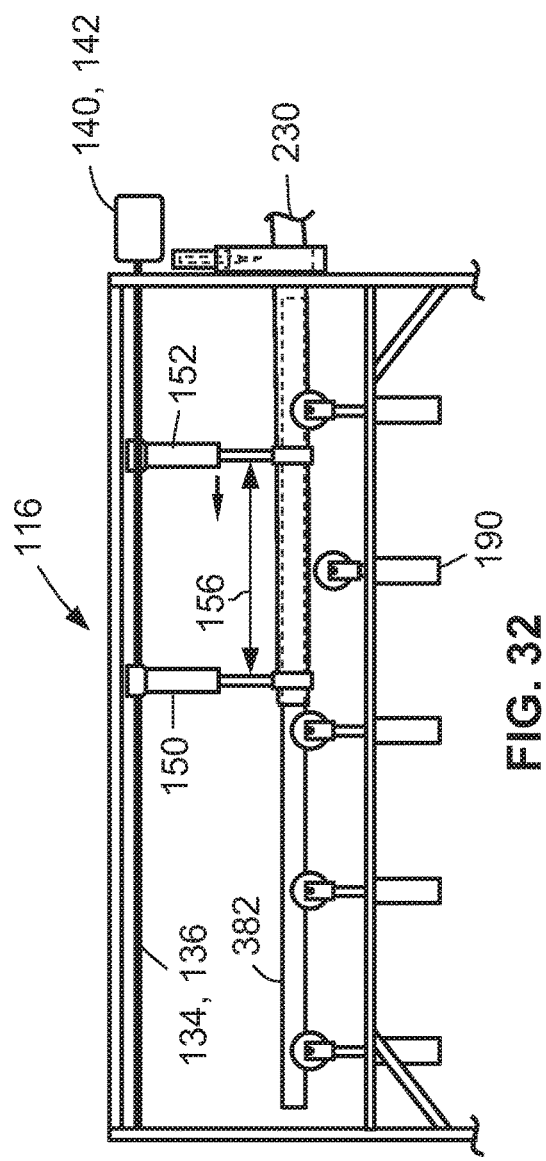

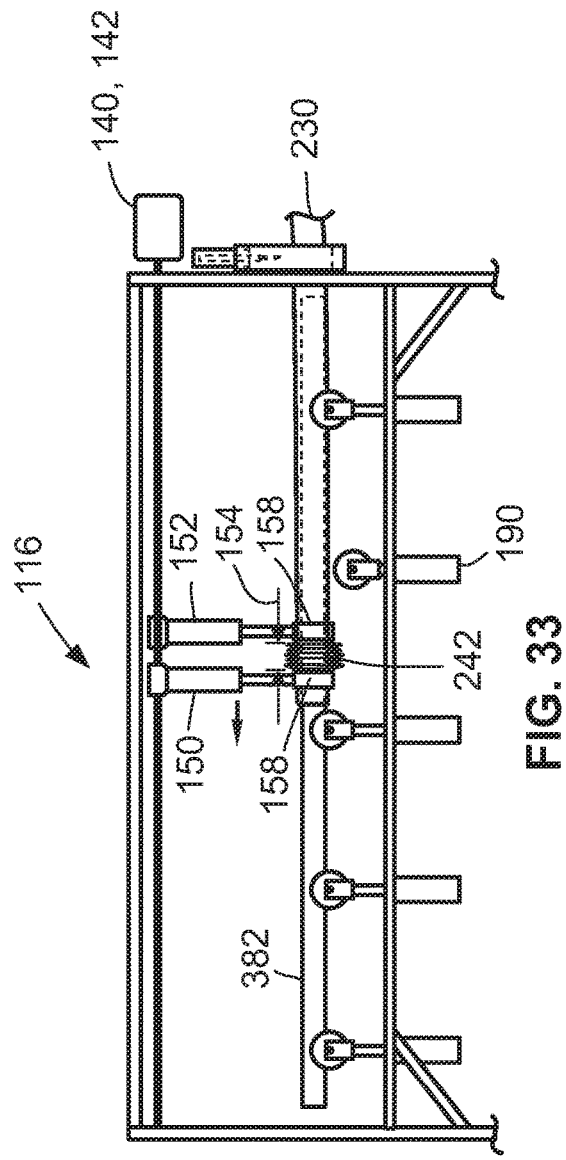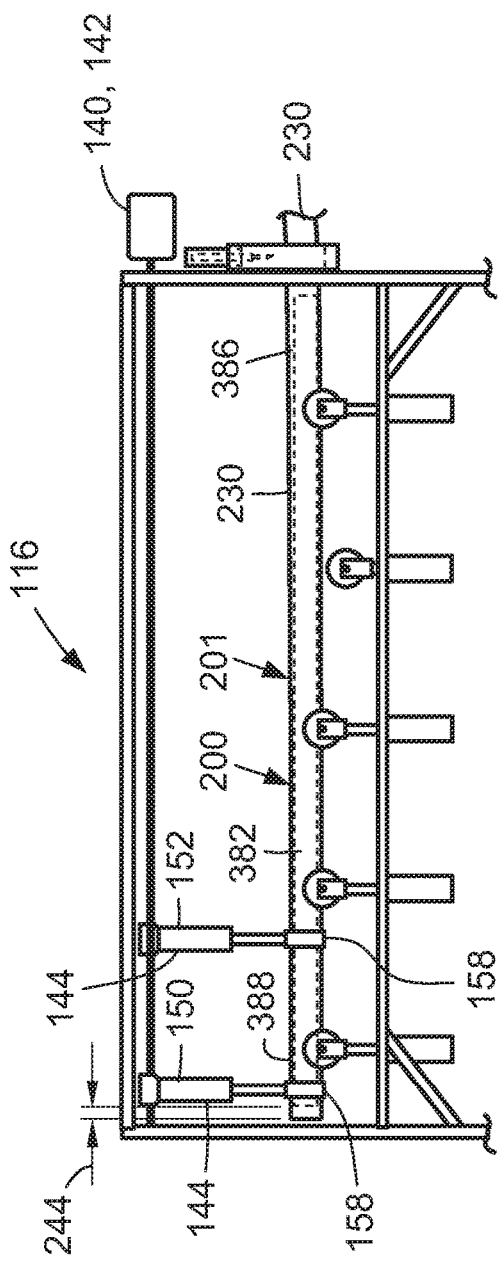

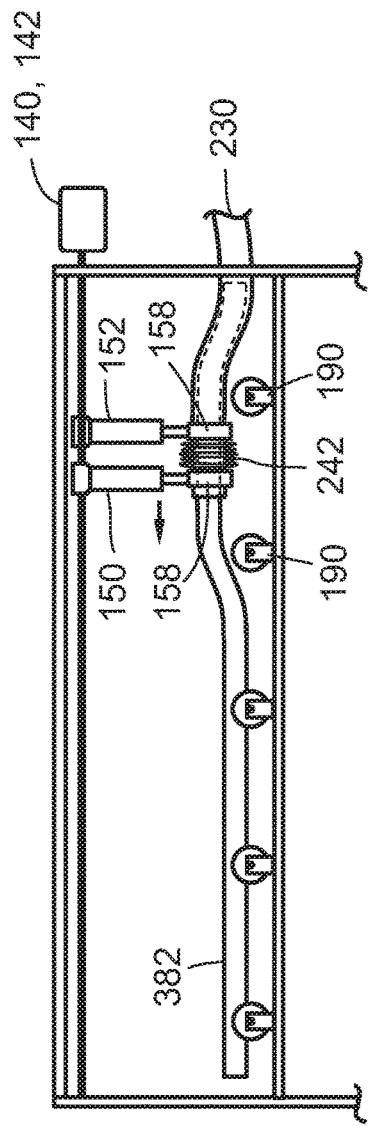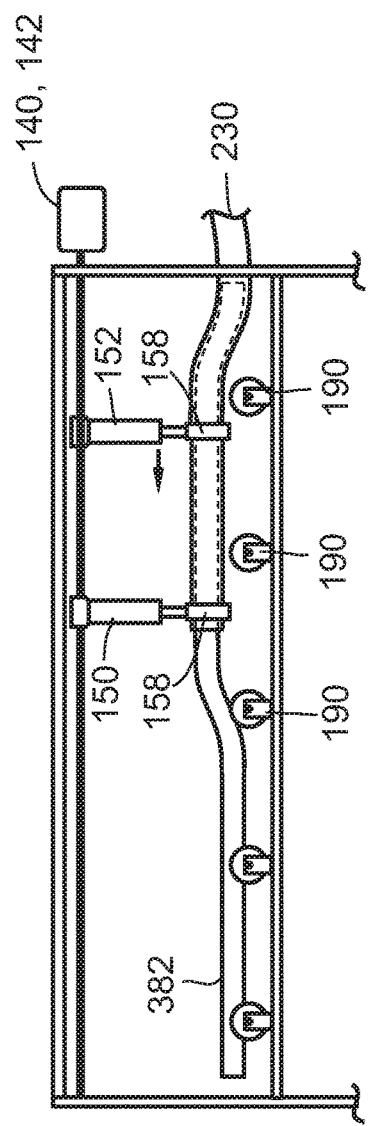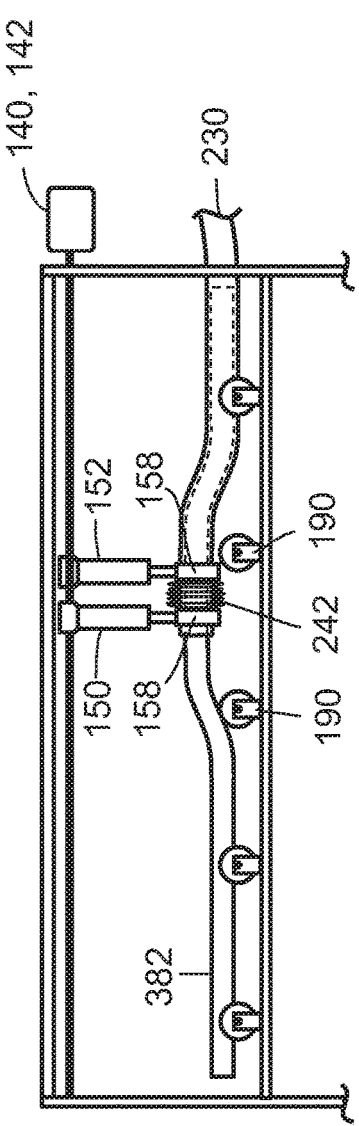

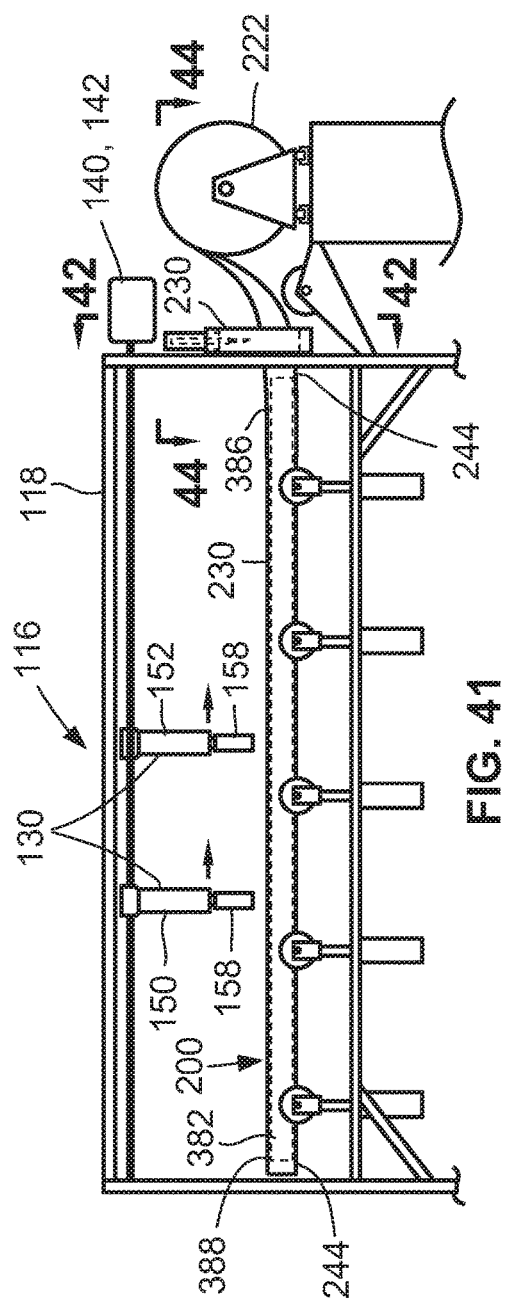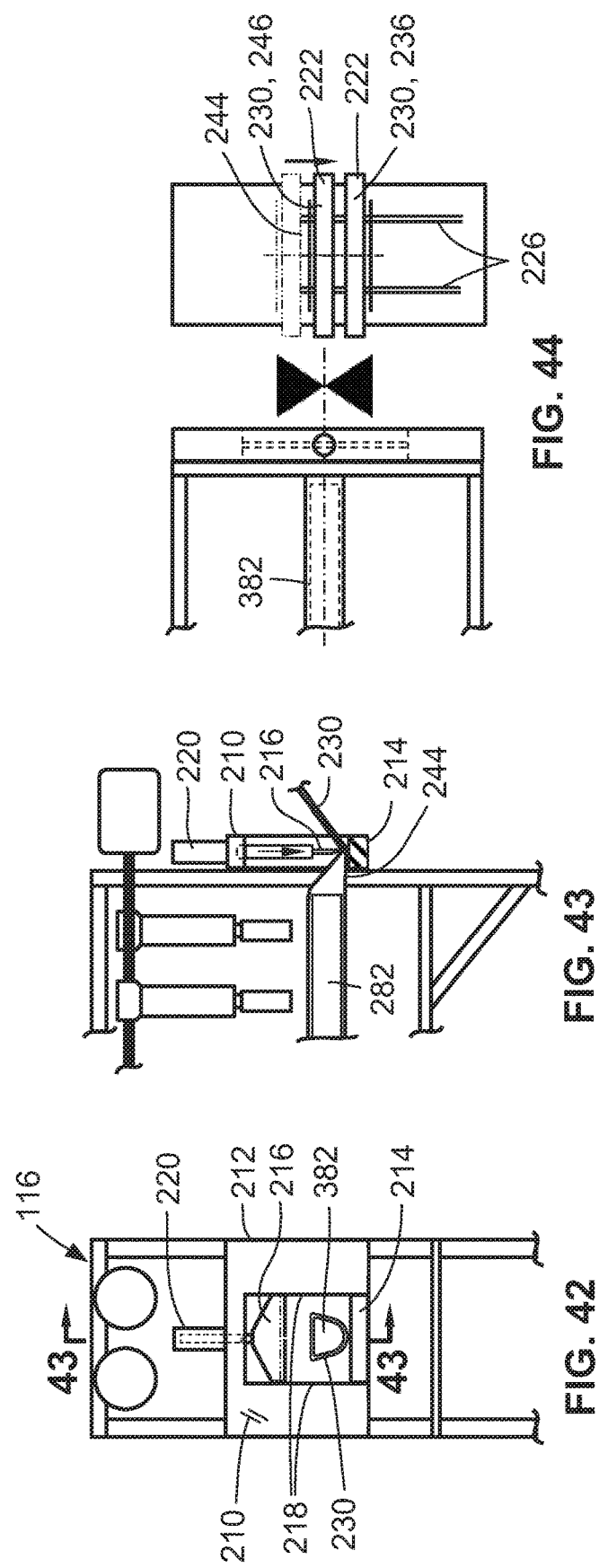

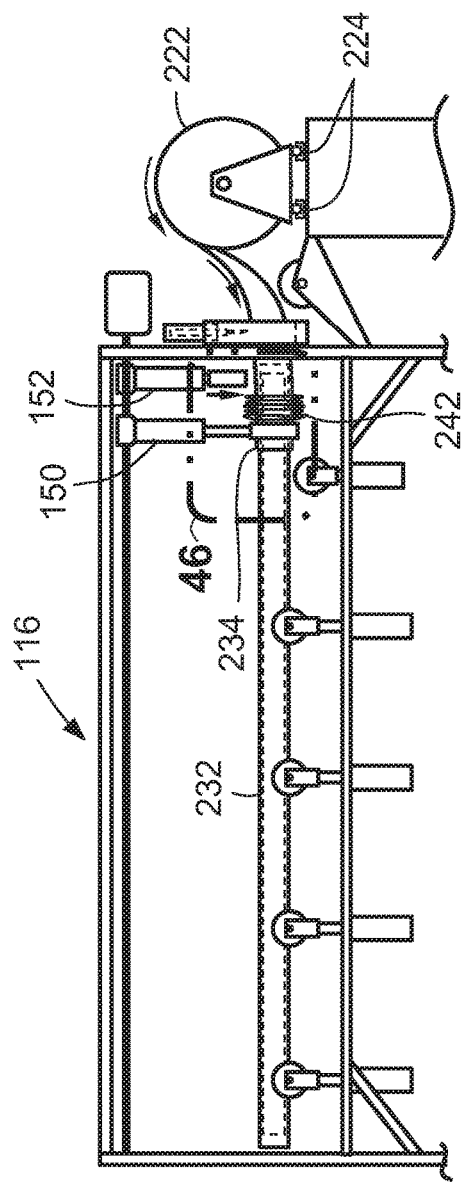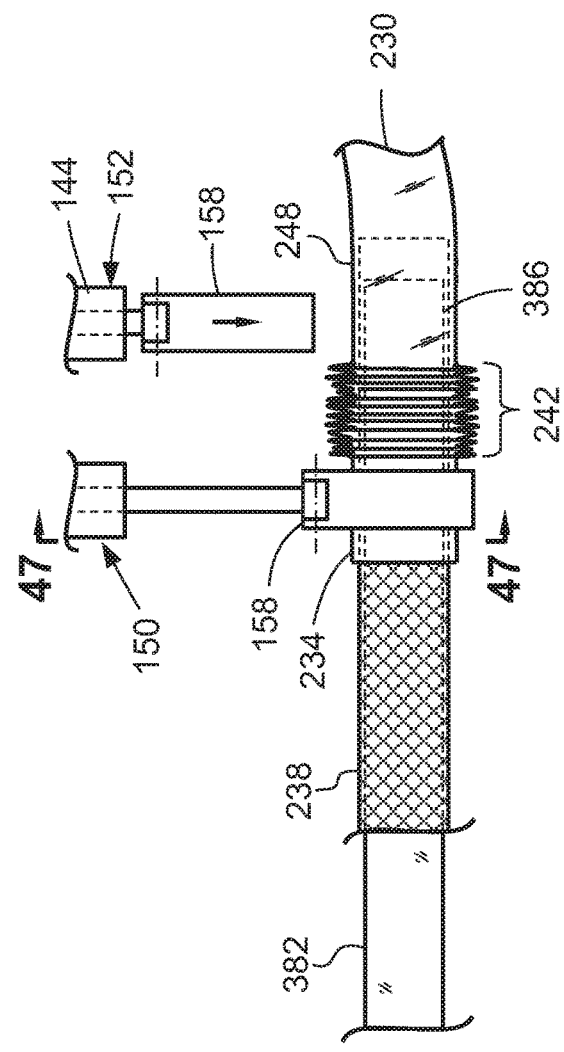

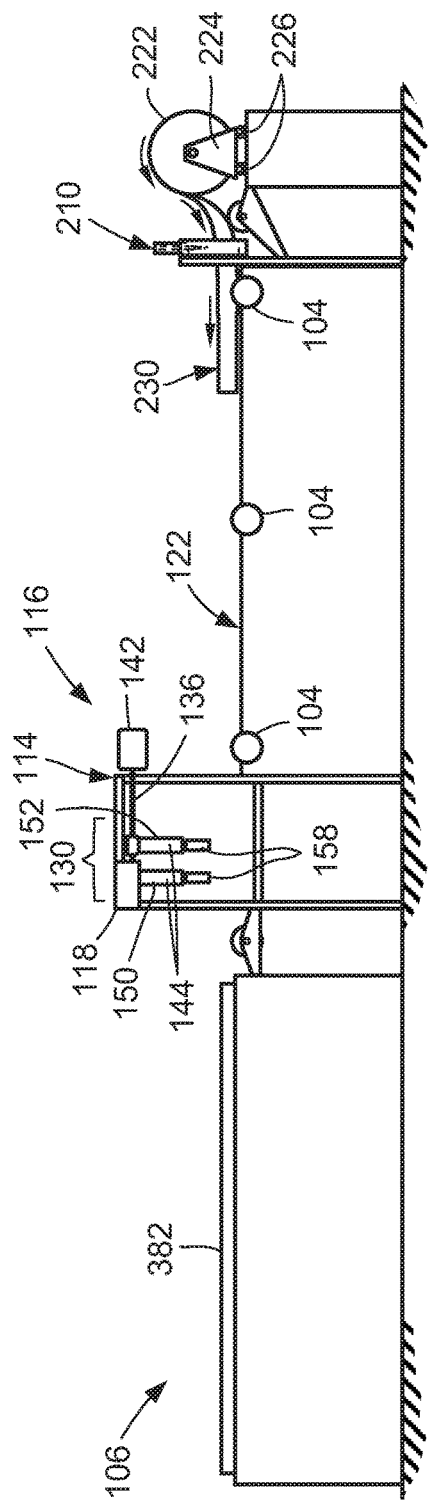
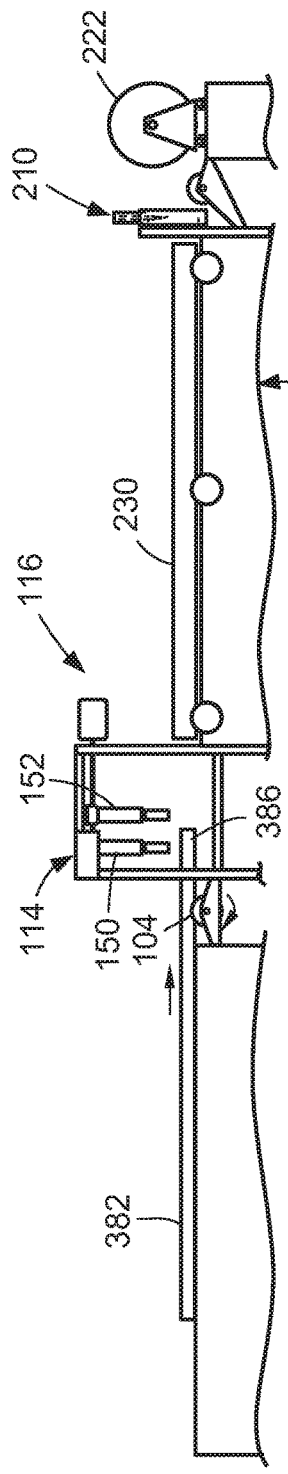
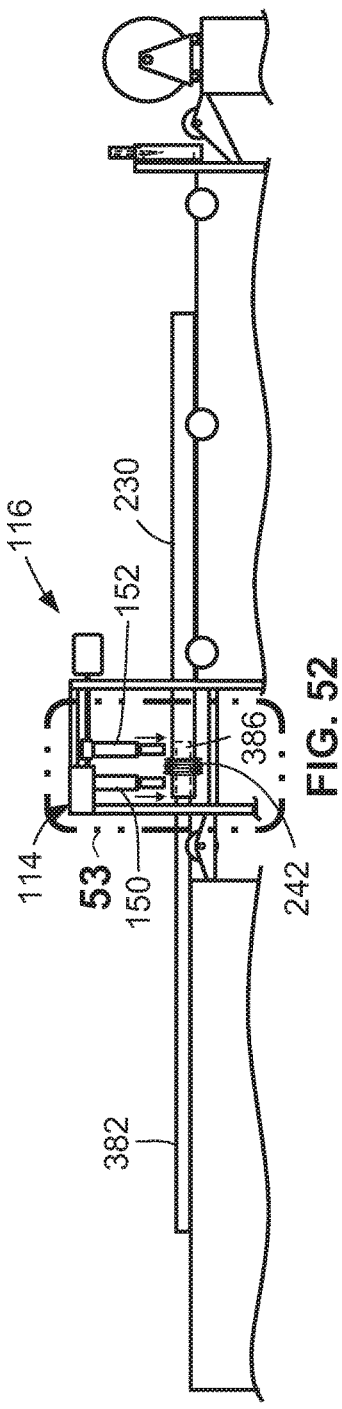
FIG. 50
FIG. 51
FIG. 52

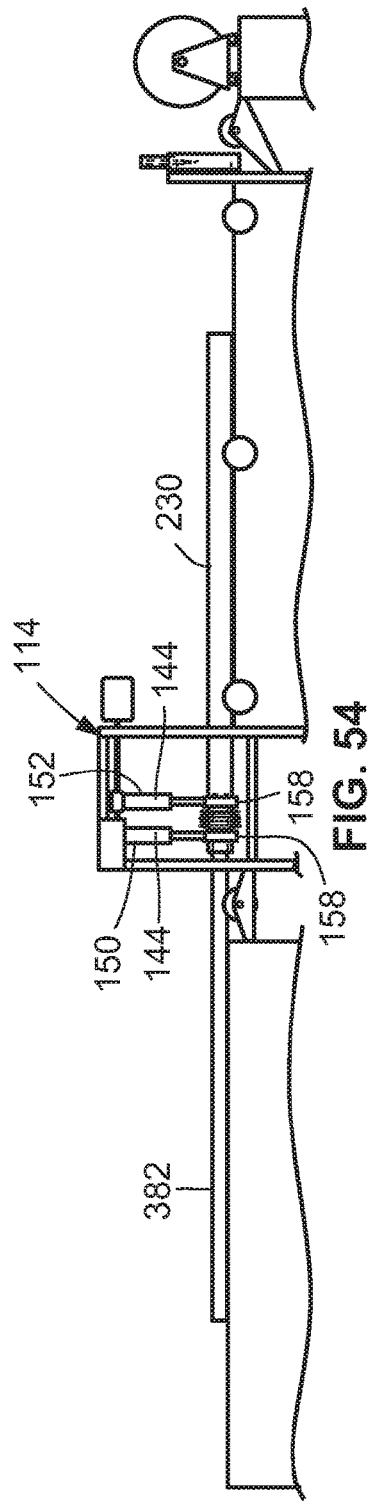
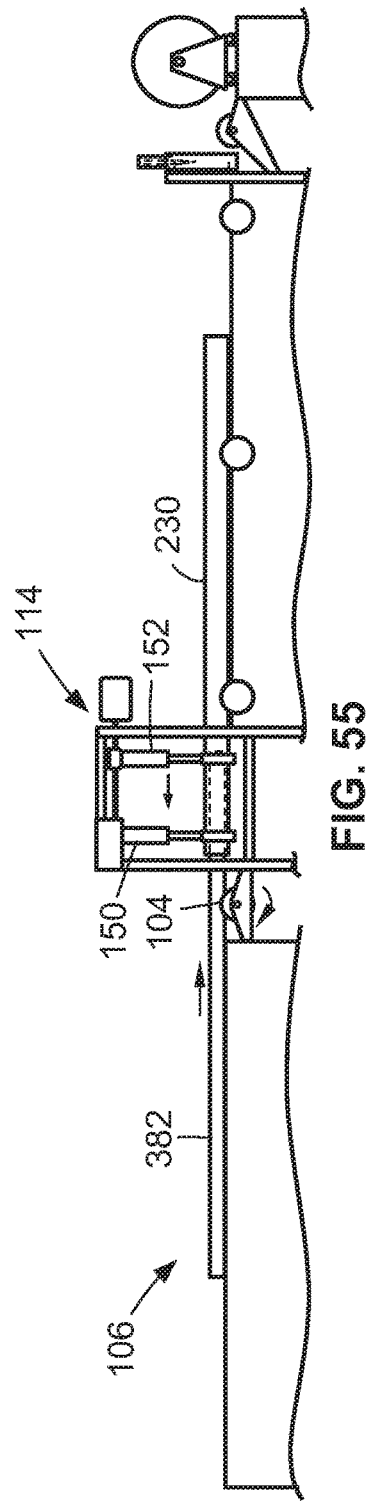
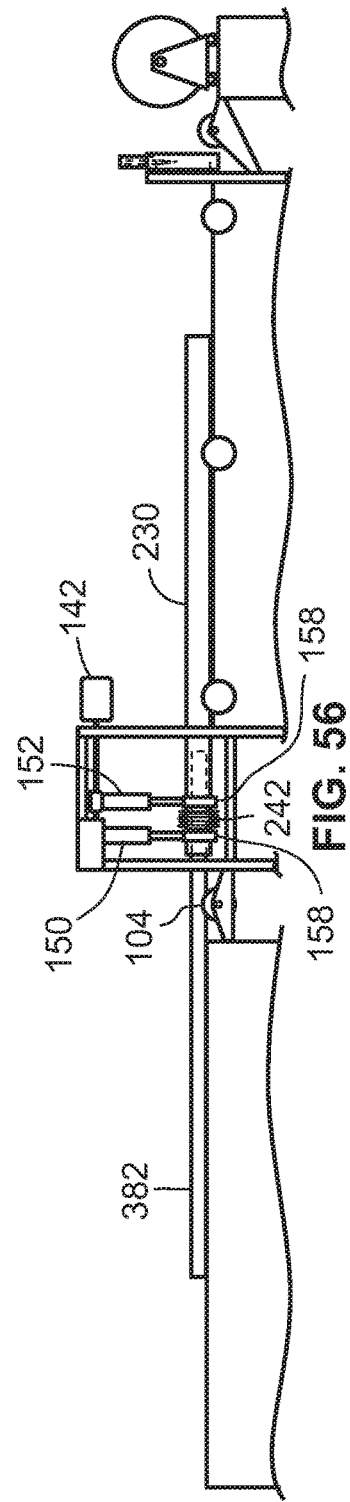

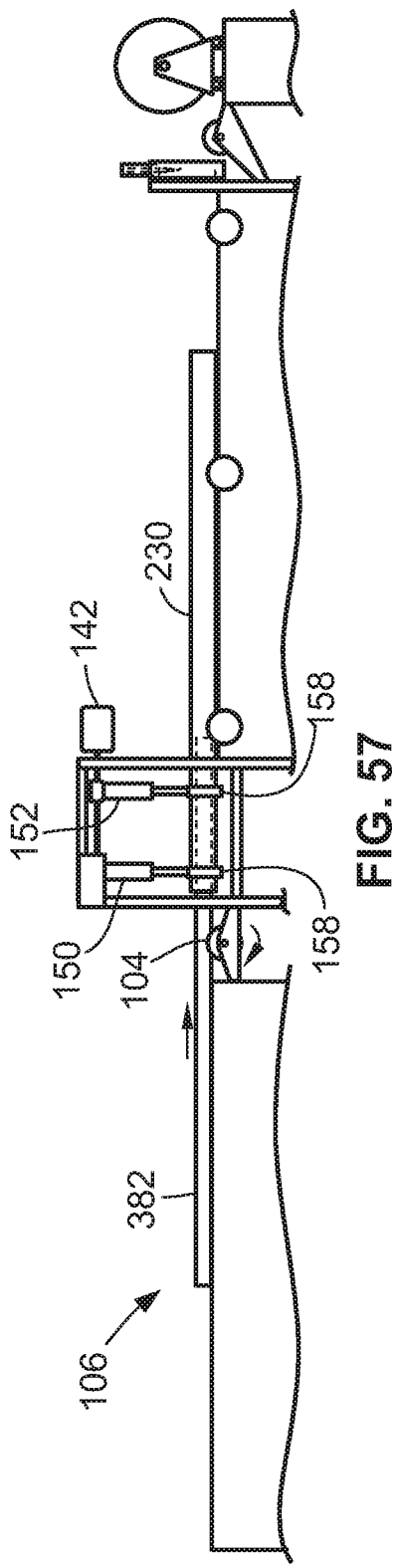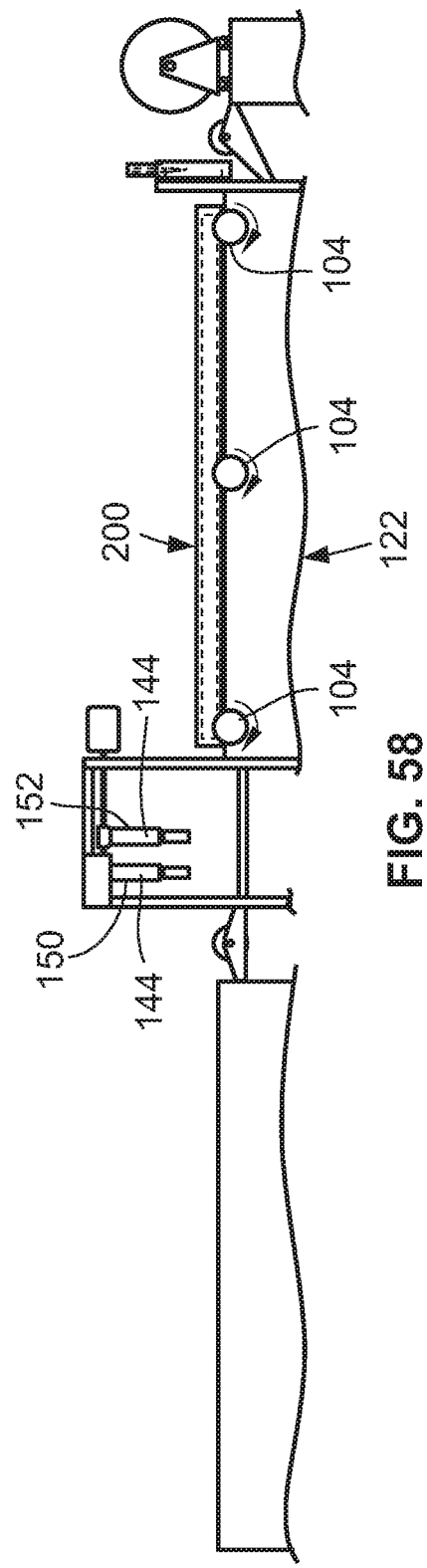

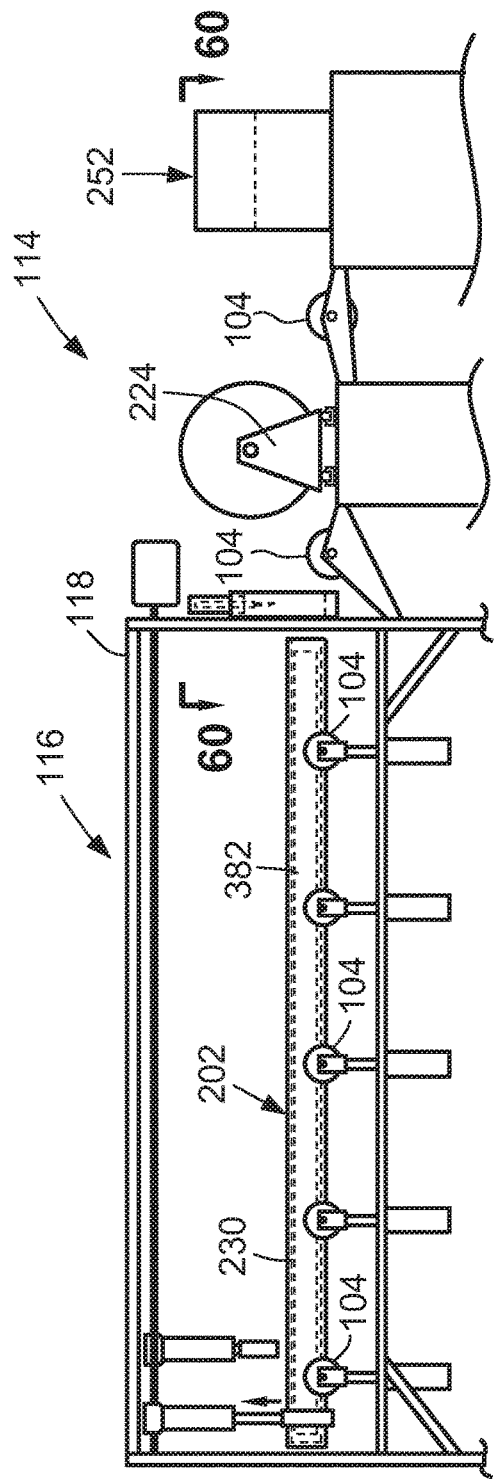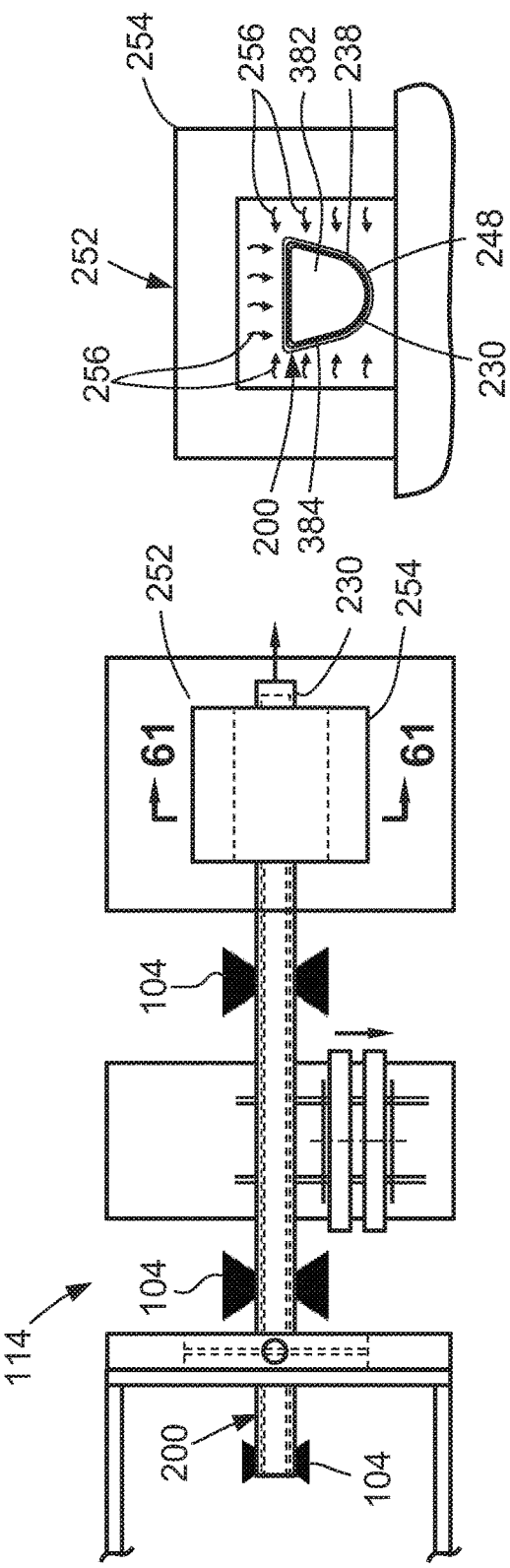

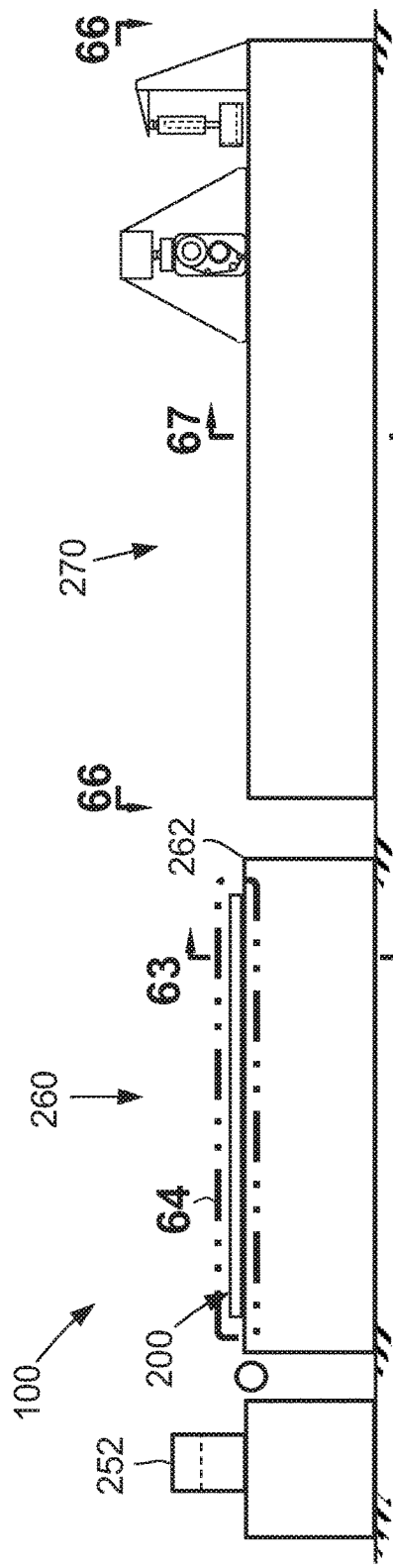
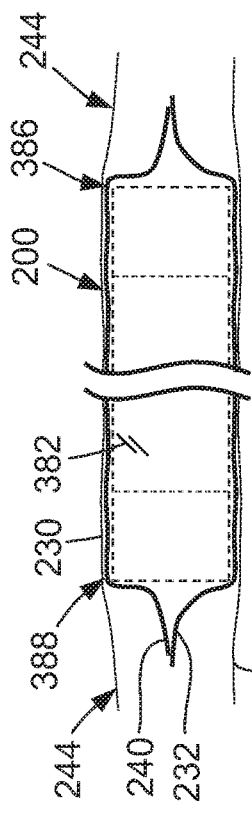
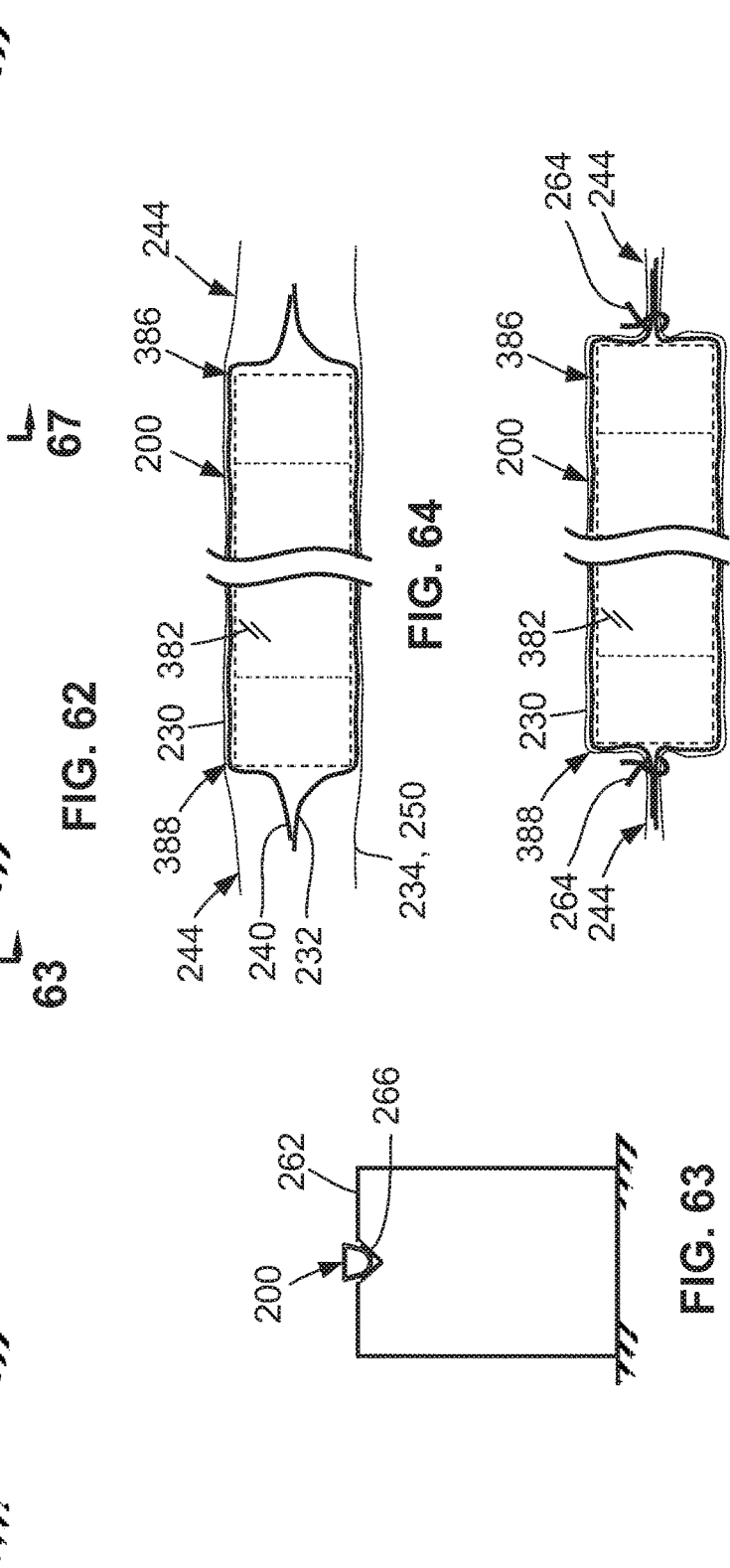
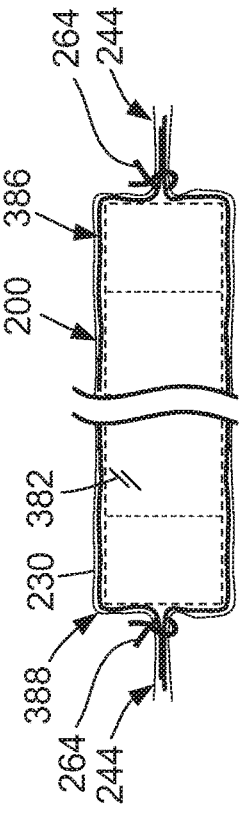

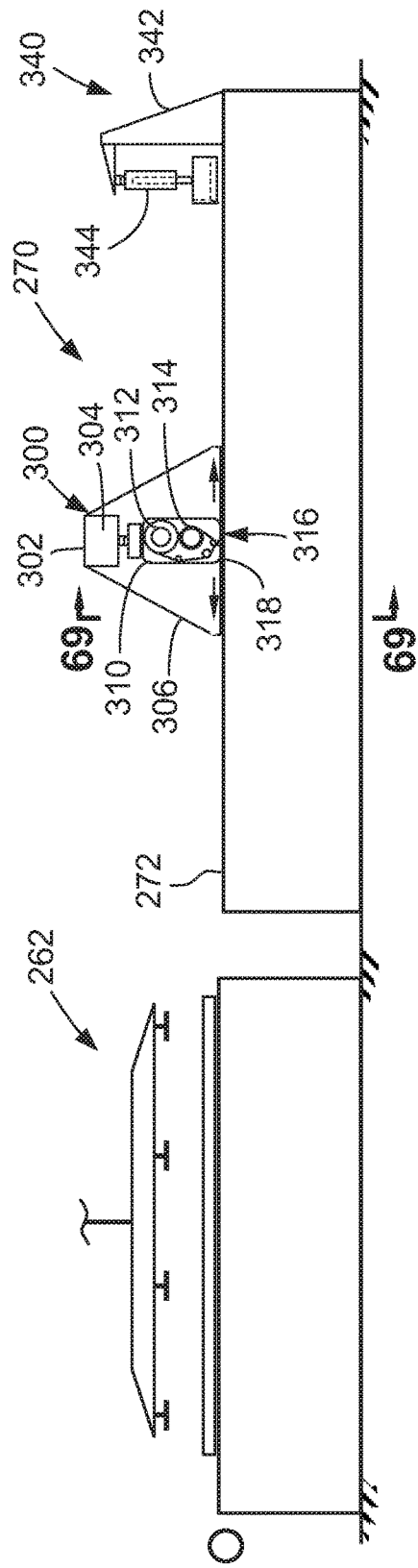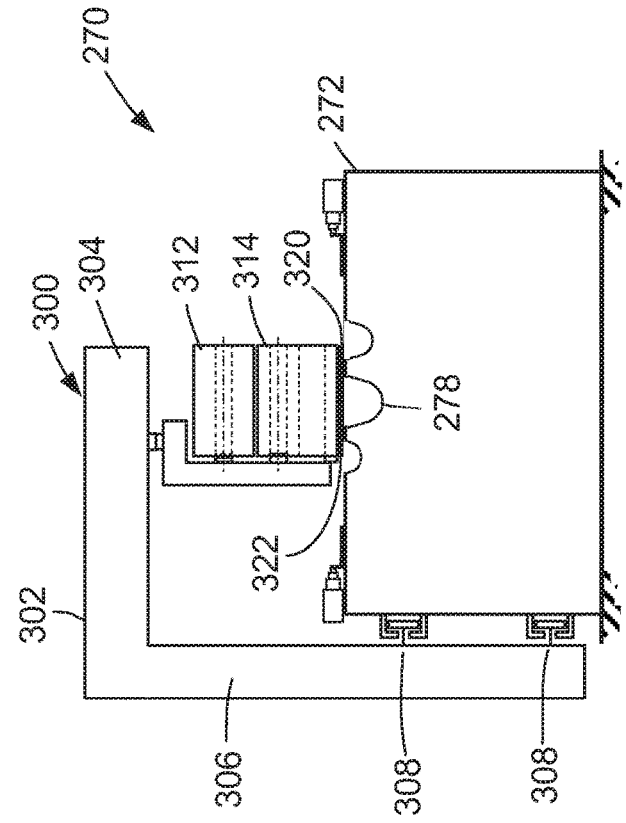
FIG. 68
FIG. 69

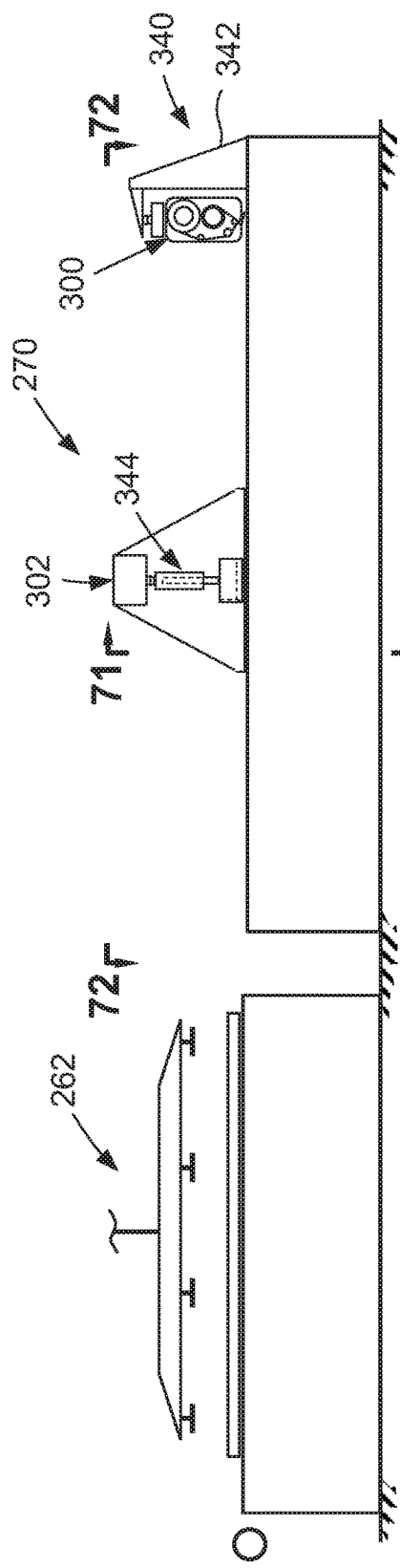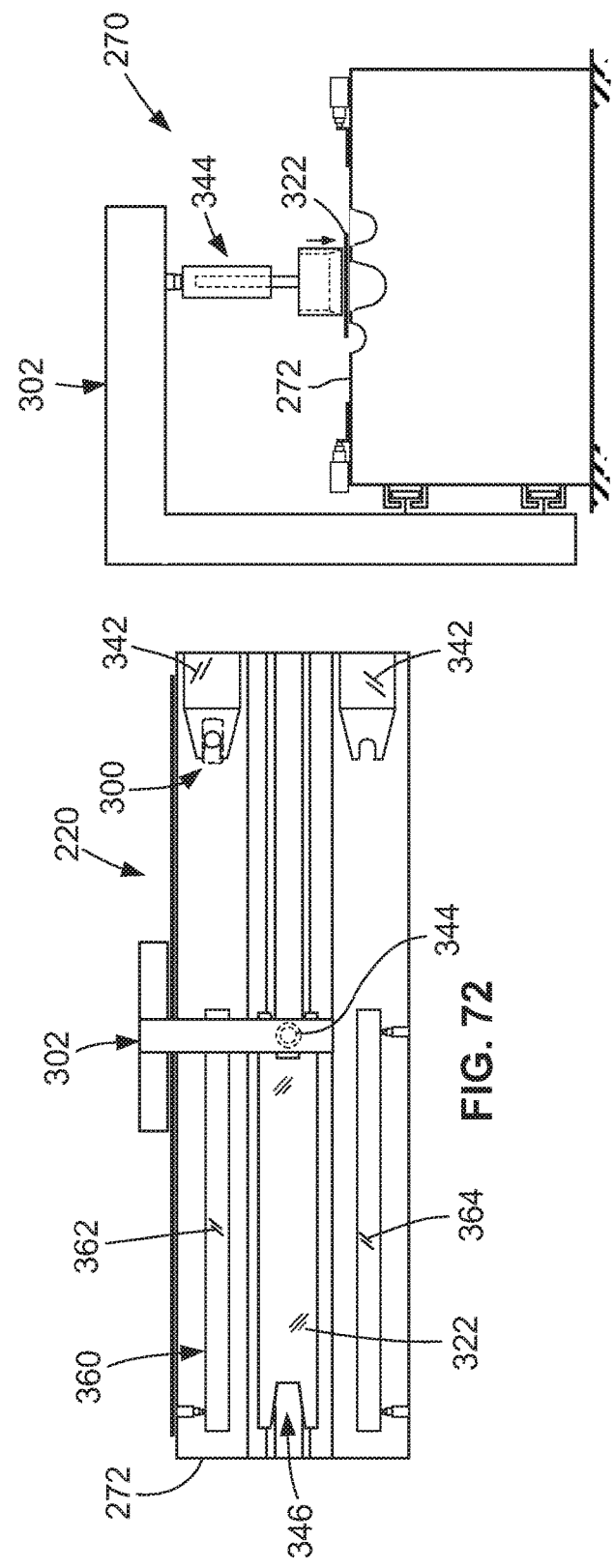

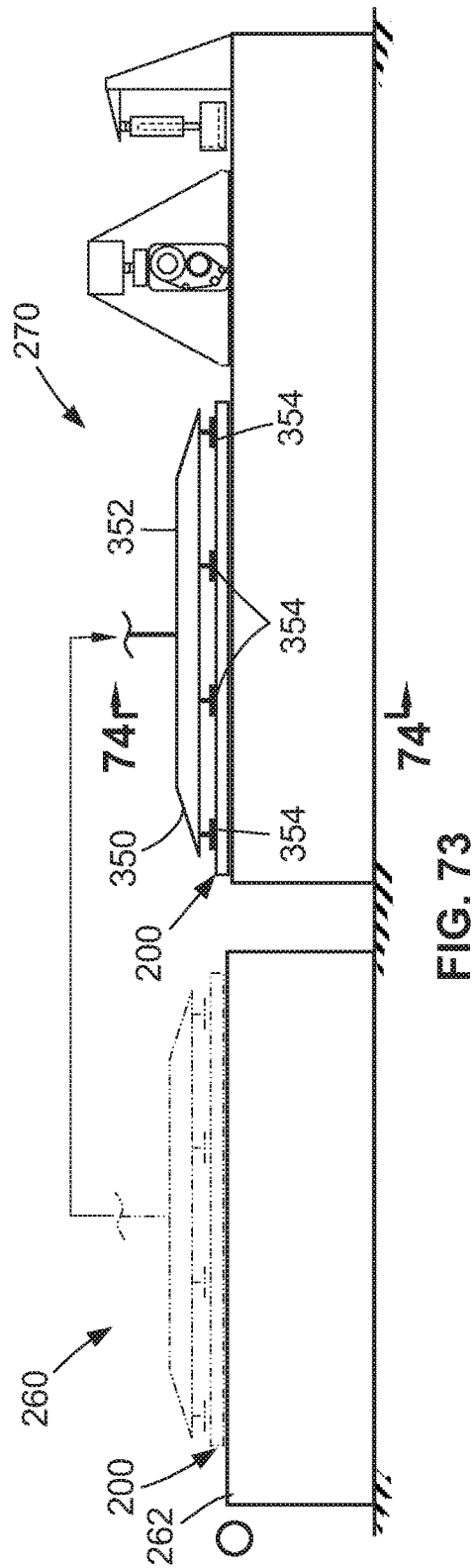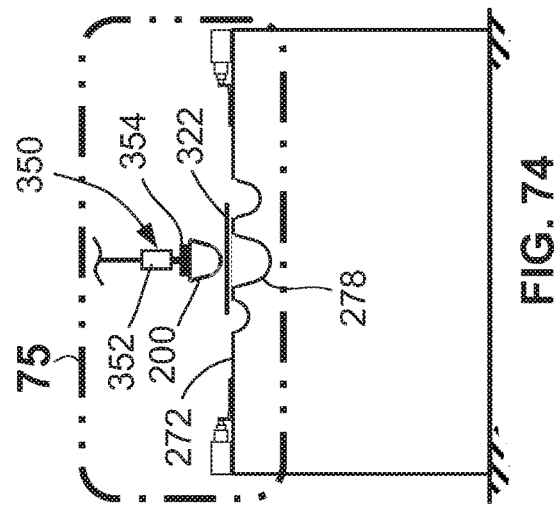

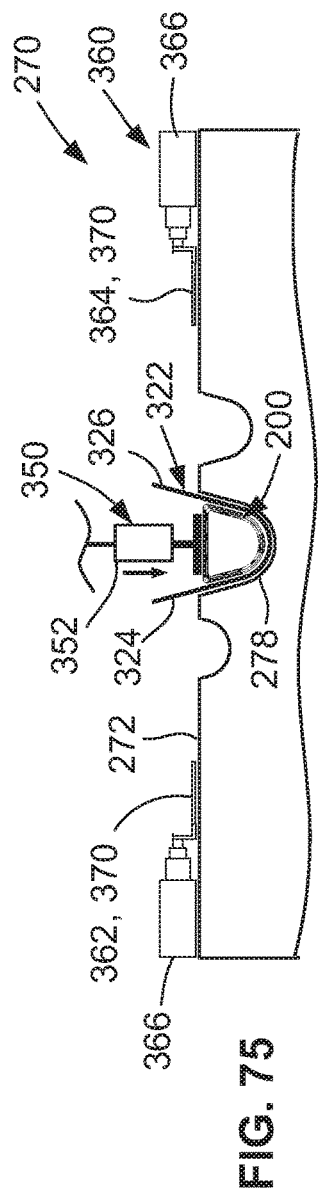
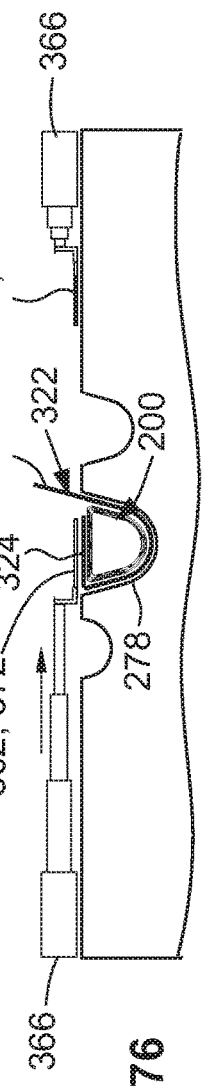
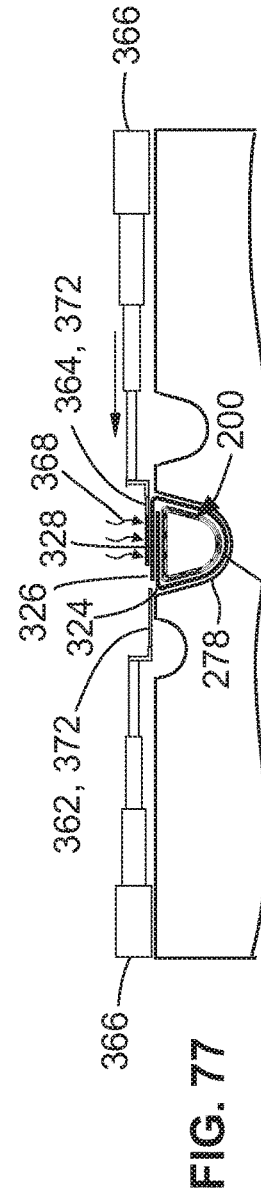
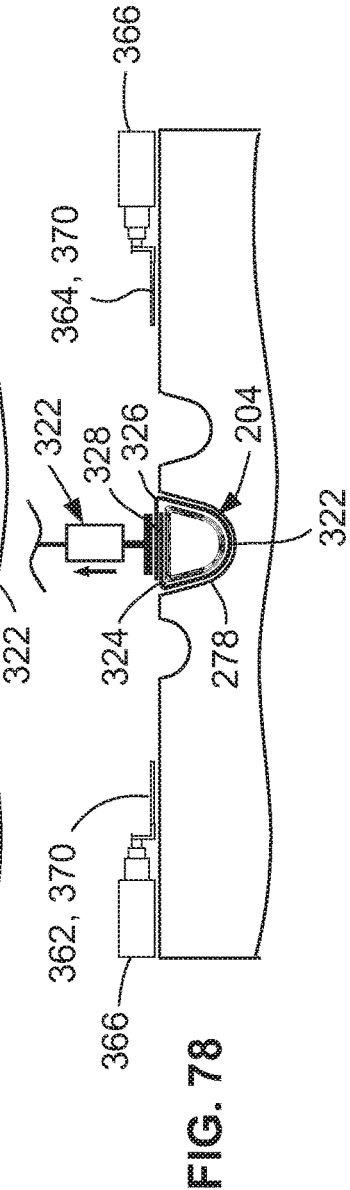

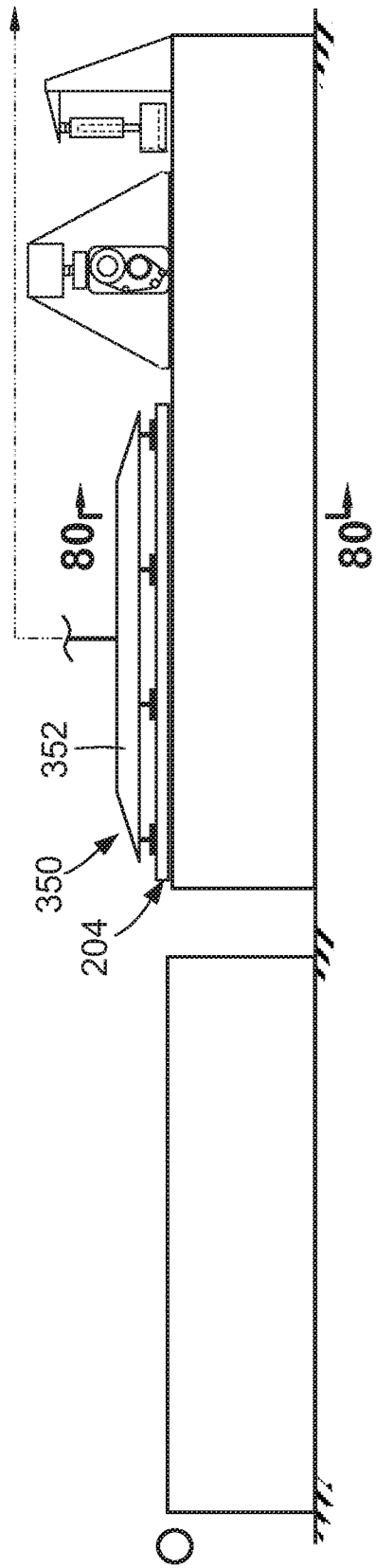
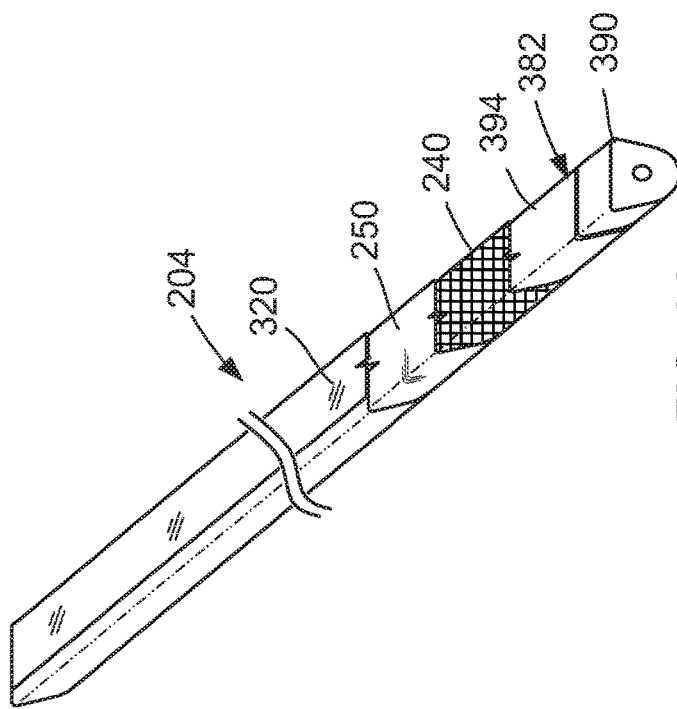
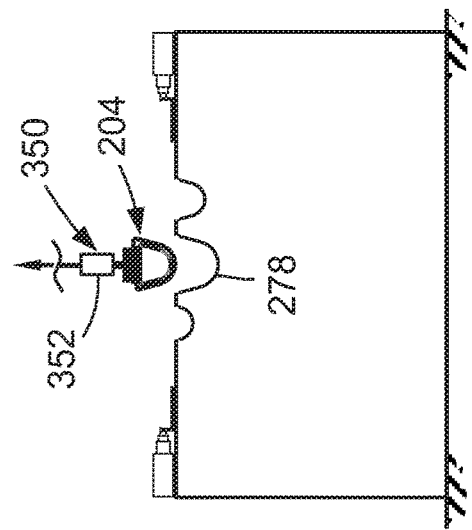
FIG. 79
FIG. 80
FIG. 81

SYSTEM AND METHOD FOR APPLYING
TUBULAR MATERIAL ONTO A MANDREL

FIELD

The present disclosure relates generally to composites manufacturing and, more particularly, to a system and method for applying a tubular material onto an elongated member, such as a mandrel for use in manufacturing a composite stringer.

BACKGROUND

Composite materials are used in a wide variety of applications due to their favorable properties such as high specific strength, high specific stiffness, and high corrosion resistance. The manufacturing of a composite structure typically involves the layup of multiple plies of composite laminate material to form a composite laminate. The layup material is typically a fibrous material that is pre-impregnated with resin (e.g., prepreg). For example, the layup material may be epoxy-impregnated carbon fiber prepreg.

Certain composite structures include a composite skin member and a plurality of composite stringers coupled to the skin for increasing the stiffness of the composite structure. For example, a composite wing of an aircraft may include a composite skin panel and a plurality of longitudinally extending composite stringers located on the skin inner surface. The composite stringers are typically individually laid up and formed, and then mounted on an assembly tool which is then overlaid with composite material to form a composite skin panel. The panel-stringer assembly may be co-bonded or co-cured to form a composite wing skin.

Prior to forming each composite stringer, a mandrel must typically be assembled with the unformed composite stringer to maintain the shape of the composite stringer during forming and/or curing. The mandrel must be prepared for assembling with the composite stringer by applying a breather layer over the length of the mandrel, followed by applying a release film over the breather layer. One or more composite plies may be wrapped around the breather and film covered mandrel. Conventional methods for applying the breather layer, the release film, and the composite plies over a mandrel are manual processes that are labor-intensive and time-consuming.

As can be seen, there exists a need in the art for a system and method for preparing a mandrel for use in composite stringer manufacturing and which avoids the above-noted challenges associated with conventional mandrel preparation methods.

SUMMARY

The above-noted needs associated with preparing a mandrel for use in composite stringer manufacturing are addressed by the below disclosure which provides a tubular material application system for applying a tubular material onto an elongate mandrel. The tubular material application system includes a gripper system including a first gripper and a second gripper configured to move with inchworm-type movement along an elongated mandrel and incrementally apply a tubular material onto the mandrel to thereby result in a tubular material-mandrel assembly.

Also disclosed is a mandrel preparation system for use in manufacturing a composite stringer. The mandrel preparation system includes a tubular material application station having a gripper system. The gripper system includes a first gripper and a second gripper configured to move with inchworm-type movement along an elongated mandrel and incrementally apply a tubular material onto the mandrel to thereby result in a tubular material-mandrel assembly. The mandrel preparation system also includes a composite ply application station located downstream of the tubular material application station and having a wrap ply forming bed containing at least one forming bed opening. The wrap ply forming bed is configured to receive one or more wrap plies of a wrap laminate for urging into the forming bed opening by the tubular material-mandrel assembly to produce a ply-tubular material-mandrel assembly.

In addition, disclosed is a method of applying a tubular material onto an elongated mandrel. The method includes engaging a first gripper and a second gripper of a gripper system to a tubular material covering a mandrel downstream end of an elongate mandrel. In addition, the method includes moving the gripper system with inchworm-type movement relative to the mandrel from the mandrel downstream end to a mandrel upstream end for incrementally applying the tubular material onto the mandrel to thereby result in a tubular material-mandrel assembly.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is an example of a mandrel preparation system for preparing a mandrel for use in manufacturing a composite stringer, and illustrating a mandrel staging station, a tubular material application station, an end preparation station, and a composite ply application station;

FIG. 2 is a top view of the mandrel preparation system taken along Line 2-2 of FIG. 1;

FIG. 4 is a top view of an example of a mandrel identified by reference numeral 4 of FIG. 2;

FIG. 5 is a perspective view of the mandrel of FIG. 4 configured as an inflatable bladder having end fittings on opposite ends of the bladder;

FIG. 6 is a longitudinal sectional view of a portion of the bladder taken along Line 6-6 of FIG. 4;

FIG. 7 is a transverse cross-sectional view of the mandrel taken along line 7-7 of FIG. 4;

FIG. 8 is a further example of a mandrel having a smaller cross-sectional shape and size than the mandrel of FIG. 7;

FIG. 9 is a still further example of a mandrel having a semi-circular cross-sectional shape;

FIG. 10 is a still further example of a mandrel having a trapezoidal cross-sectional shape;

FIG. 11 is a magnified view of a portion of the mandrel preparation system identified by reference numeral 11 of FIG. 1 and illustrating an example of the tubular material application system supporting a mandrel on a plurality of mandrel support stands;

FIG. 12 is a top view of the tubular material application system taken along Line 12-12 of FIG. 11;

FIG. 13 is a further magnified view of the example of the tubular material application system of FIG. 11 and illustrating a gripper system including a gripper drive assembly configured to independently move a first gripper and a second gripper with inchworm-type movement along the mandrel and incrementally apply a tubular material onto the mandrel to thereby result in a tubular material-mandrel assembly;

FIG. 14 is a sectional view taken along Line 14-14 of FIG. 13 and illustrating the first gripper and second gripper supported above the mandrel prior to moving downwardly for engaging the tubular material initially installed on the mandrel downstream end;

FIG. 15 is an example of a gripper (e.g., the first gripper or the second gripper) identified by reference numeral 15 of FIG. 14 and illustrating movable gripper arms having gripping elements including vacuum apertures and hook elements for respectively engaging non-porous material (e.g., film material) and fabric material (e.g., breather material) for incrementally applying the material over the mandrel during inchworm-type movement of the gripper system;

FIG. 16 is a side view of the tubular material application system and illustrating the mandrel supported by the mandrel support stands as the mandrel moves into the tubular material application system from the mandrel staging station, and further illustrating the first gripper and second gripper supported above the mandrel;

FIG. 17 is a side view of the tubular material application system showing the tubular material initially installed on the mandrel downstream end and further illustrating the first gripper and the second gripper moving downwardly into engagement with the mandrel;

FIG. 21 is a side view of the tubular material application system showing the gripper arms of the first gripper and second gripper during engagement to the tubular material on opposite sides of the gathered portion, and the second gripper clamped to the mandrel;

FIG. 22 is an end view of the first gripper taken along Line 22-22 of FIG. 21 and illustrating the gripper arms in an open position prior to engaging the tubular material on the mandrel;

FIG. 23 is an end view of the first gripper showing the gripper arms moved into an engaged position in which the gripper arms are engaged to the tubular material;

FIG. 24 is an end view of the first gripper showing the gripper arms engaged to the tubular material while the upper arms pivoted outwardly into an unclamped position away from the mandrel surfaces;

FIG. 25 is an end view of the second gripper taken along Line 25-25 of FIG. 21 and illustrating the gripper arms in a clamped position in which the gripper arms are clamping the tubular material against the mandrel surfaces;

FIG. 26 is a side view of the tubular material application system showing the first gripper moved in an upstream direction away from the second gripper until the gathered portion of tubular material is extended between the first gripper and the second gripper during the inchworm-type movement;

FIG. 27 is an end view of the first gripper taken along Line 27-27 of FIG. 26 and illustrating the gripper arms moving from the open position toward the clamped position;

FIG. 28 is an end view of the first gripper showing the gripper arms in the clamped position;

FIG. 29 is an end view of the second gripper taken along Line 29-29 of FIG. 26 and illustrating the gripper arms in the clamped position;

FIG. 30 is an end view of the second gripper showing the gripper arms after moving into the unclamped position;

FIG. 31 is a side view of the tubular material application system showing another gathered portion of tubular material formed between the first gripper and the second gripper following movement of the second gripper in the upstream direction;

FIG. 32 is a side view of the tubular material application system after movement of the first gripper in the upstream direction away from the second gripper, and placing the tubular material of the gathered portion in an extended position;

FIG. 33 is a side view of the tubular material application system showing another gathered portion of tubular material formed between the first gripper and the second gripper following movement of the second gripper in the upstream direction;

FIG. 34 is a side view of the tubular material application system showing the first gripper at the mandrel upstream end after completion of the inchworm-type movement of the gripper system, resulting in the tubular material being applied over the entire length of the mandrel;

FIG. 38 is a side view of the tubular material application system of FIG. 37 showing the first gripper clamped against the mandrel and lifting the lengthwise section of the mandrel while the second gripper moves in the upstream direction over the mandrel support stand toward the first gripper to result in another gathered portion of tubular material between the first gripper and the second gripper during the inchworm-type movement;

FIG. 39 is a side view of the tubular material application system of FIG. 38 showing the second gripper clamped against the mandrel while the first gripper moves in the upstream direction over the mandrel support stand;

FIG. 40 is a side view of the tubular material application system of FIG. 39 showing the first gripper clamped against the mandrel while the second gripper moves in the upstream direction over the mandrel support stand toward the first gripper during the inchworm-type movement;

FIG. 41 is a side view of the tubular material application system showing the first gripper and second gripper moving back toward the mandrel downstream end after applying the tubular material onto the entire length of the mandrel;

FIG. 42 is an end view of the tubular material application system showing an example of a material cutting device for cutting the downstream end of the tubular material after application onto the mandrel;

FIG. 43 is a side view of the downstream end of the tubular material application system during the cutting of the tubular material by the material cutting device;

FIG. 44 is a top view of an example of a spool support rack configured to support one or more tubular material spools each containing tubular material for application by the gripper system onto a mandrel;

FIG. 45 is a side view of the tubular material application system showing the initial installation of a second layer of tubular material (e.g., shrink wrap film) over the first layer of tubular material (e.g., breather material) on the mandrel downstream end prior to the gripper system applying the second layer of tubular material over the mandrel length using the inchworm-type movement of the gripper system;

FIG. 46 is a magnified view of the portion of the region of the tubular material application system identified by reference numeral 46 and illustrating the first gripper engaged to the second layer of tubular material on the upstream side of the gathered portion, and the second gripper moving downwardly into engagement with the second layer of tubular material on the downstream side of the gathered portion;

FIG. 50 is a side view of an example of a tubular material application system in which at least one of the grippers is stationary during the application of the tubular material onto the mandrel as the mandrel moves through the tubular material application system, and illustrating a length of tubular material drawn from a tubular material spool and positioned on a material support table;

FIG. 51 is a side view of the mandrel preparation system of FIG. 50 showing the mandrel downstream end moving into position underneath the gripper system of the tubular material application system;

FIG. 52 is a side view of the mandrel preparation system of FIG. 51 showing the tubular material installed on the mandrel downstream end with a gathered portion of tubular material located between the positions of the first gripper and the second gripper;

FIG. 54 is a side view of the mandrel preparation system showing the first gripper and the second gripper engaged to the mandrel on opposite sides of the gathered portion of tubular material;

FIG. 55 is a side view of the mandrel preparation system showing the second gripper moving with the mandrel along the downstream direction while the first gripper remains stationary as a means for extending the gathered portion of the tubular material during the inchworm-type movement of the gripper system;

FIG. 56 is a side view of the mandrel preparation system showing the first gripper clamped against the mandrel while the second gripper moves in the upstream direction to result in another gathered portion of tubular material between the first gripper and the second gripper during the inchworm-type movement;

FIG. 57 is a side view of the mandrel preparation system showing the second gripper again moving with the mandrel along the downstream direction while the first gripper remains stationary for further applying the tubular material over the mandrel;

FIG. 58 is a side view of the mandrel preparation system after the tubular material has been applied over the length of the mandrel to result in a tubular material-mandrel assembly that is supported on the material support table;

FIG. 59 is a side view of the tubular material application system after applying the tubular material onto the entire length of the mandrel, and resulting in a tubular material-mandrel assembly;

FIG. 60 is a top view of the tubular material application system taken along Line 60-60 of FIG. 59 and showing the tubular material-mandrel assembly moving through a heat shrink device;

FIG. 61 is a sectional view of the heat shrink device taken along Line 61-61 of FIG. 60 and showing the application of heat to the second layer of tubular material (e.g., shrink wrap film) on the tubular material-mandrel assembly in a manner to compact the first and second layer of tubular material against the mandrel surfaces;

FIG. 62 is a side view of a portion of the mandrel preparation system identified by reference numeral 62 of FIG. 1 and showing an example of an end preparation platform and a composite ply application station both located downstream of the tubular material application system;

FIG. 63 is a transverse sectional view of the end preparation platform taken along Line 63-63 of FIG. 62 and showing a lengthwise notch in the end preparation platform for stably supporting the mandrel;

FIG. 64 is a side view of the upstream and downstream ends of the tubular material-mandrel assembly identified by reference numeral 64 of FIG. 62 and showing a material overhang of tubular material (e.g., the first layer and the second layer) extending beyond the upstream mandrel end and downstream mandrel end;

FIG. 65 is a side view of the upstream and downstream ends of the tubular material-mandrel assembly of FIG. 64 and showing an end clamping element installed on each of the opposing ends of the tubular material-mandrel assembly;

Figure 66:
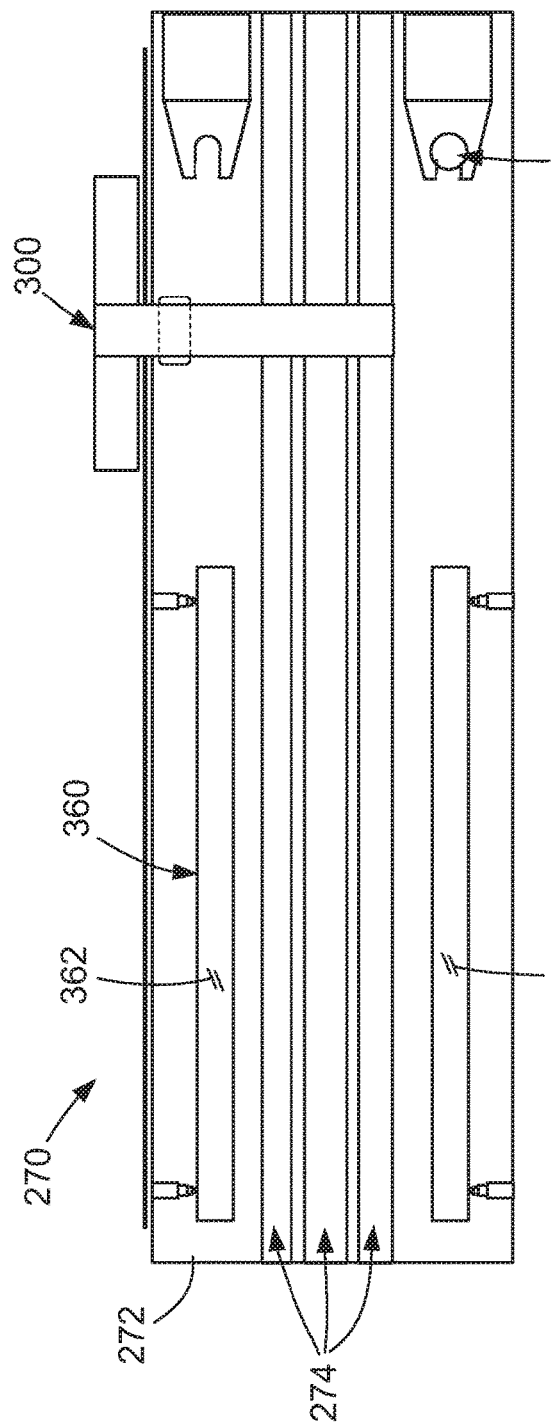
Figure 67:
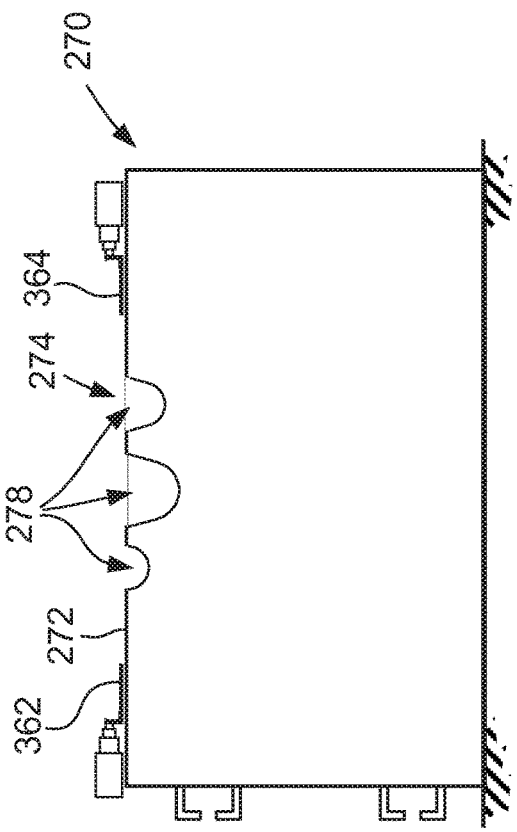
Figure 83:
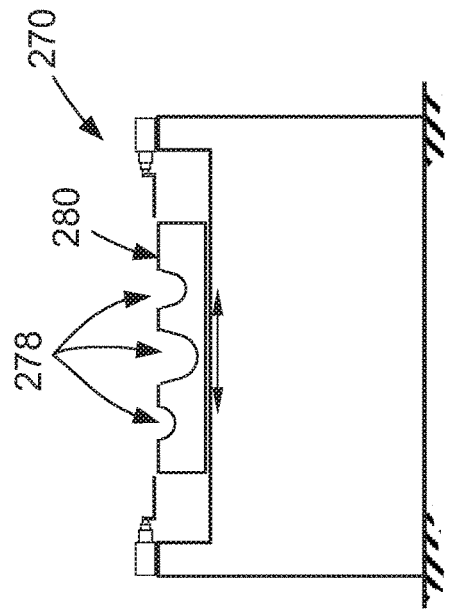
Figure 85:
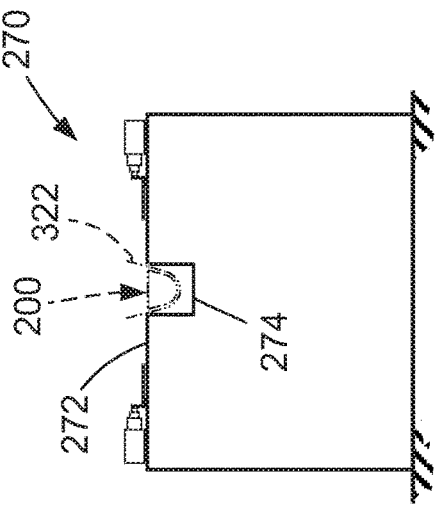
Figure 82:
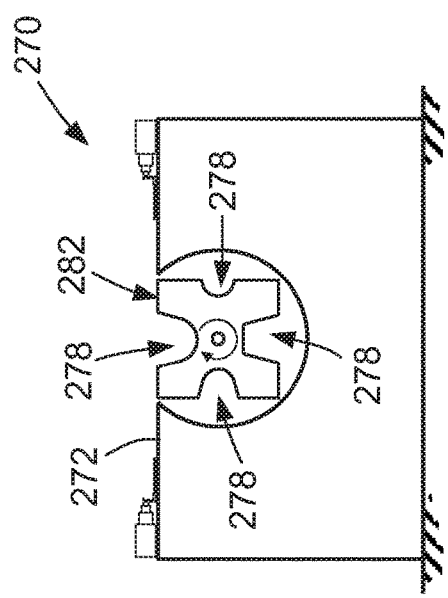
Figure 84:
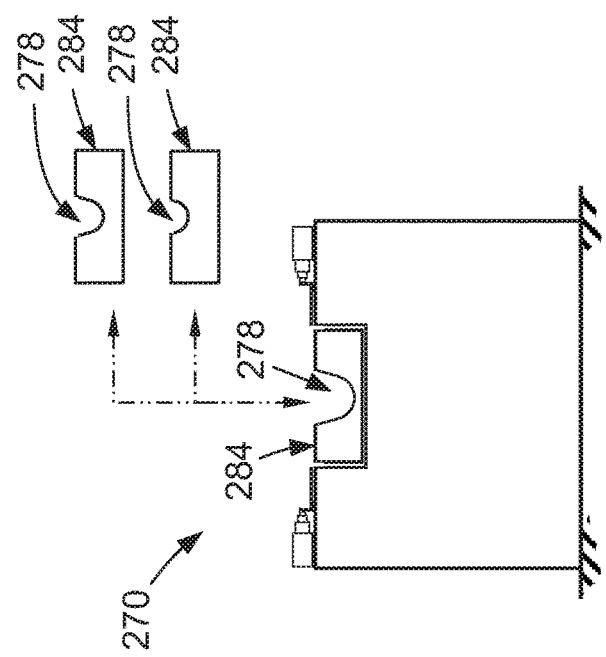
Figure 86:
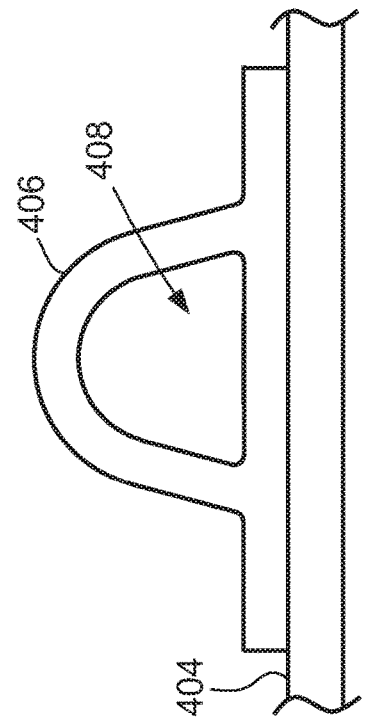
Figure 89:
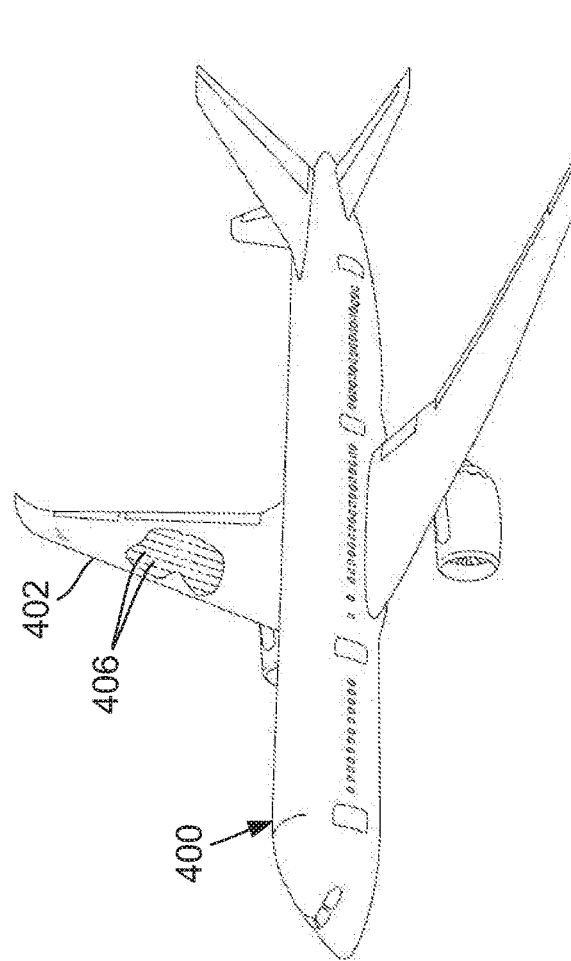
Figure 87:
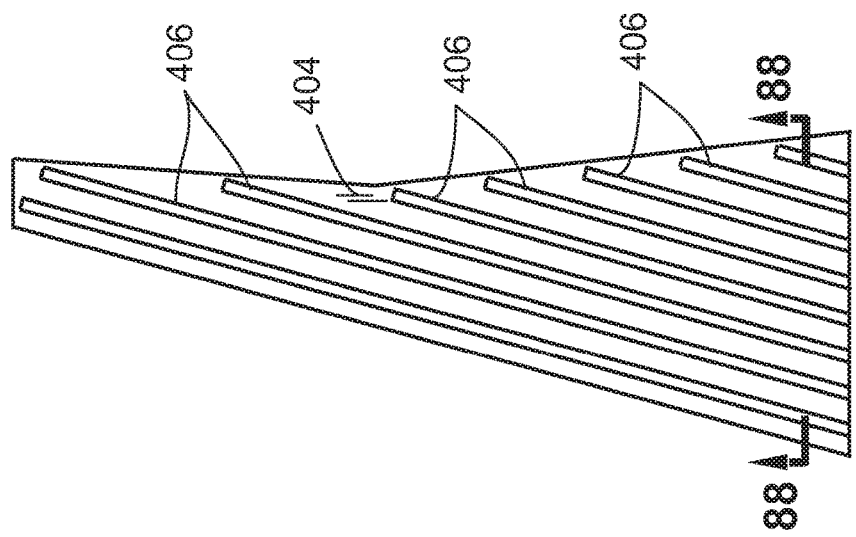
Figure 88:
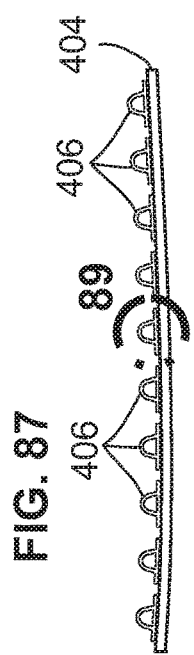
Figure 90:
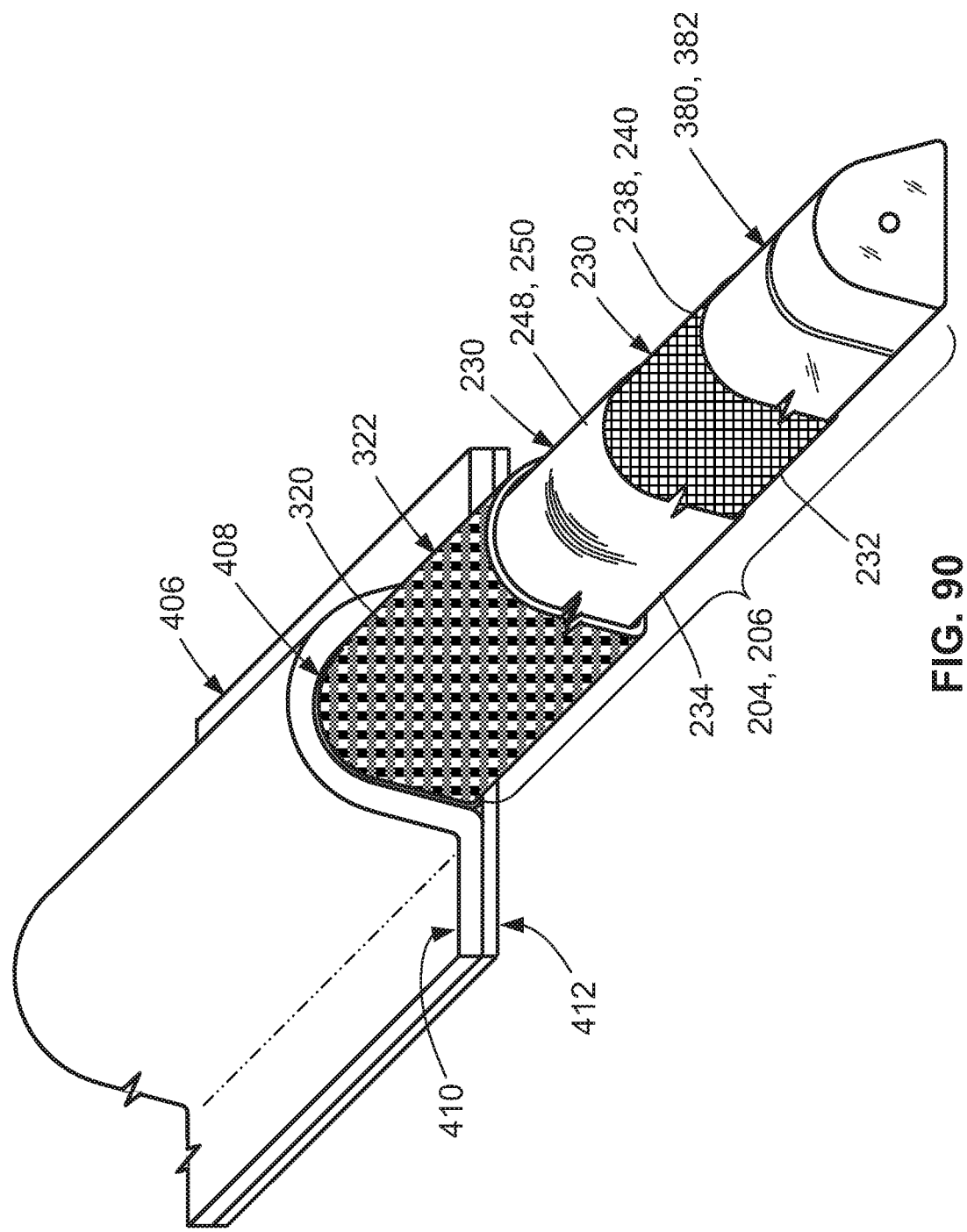
Figure 91:
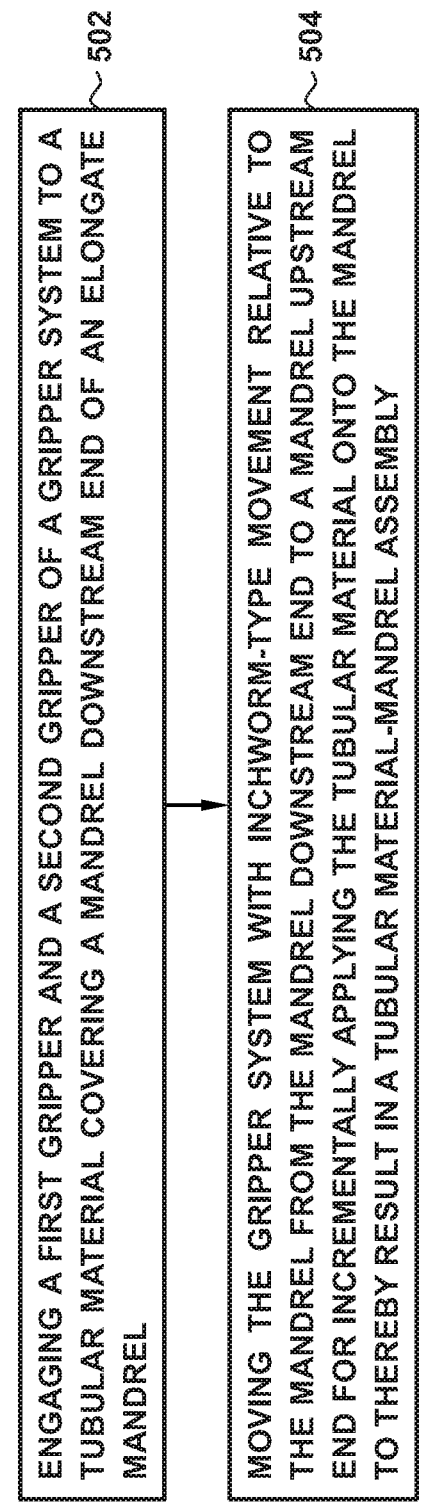

FIG. 66 is a top view of the composite ply application station taken along Line 66-66 of FIG. 62 and showing first and second wrap ply forming plate, a ply lamination head, and a ply trimming device;

FIG. 67 is a transverse sectional view of the composite ply application station taken along Line 67-67 of FIG. 62 and showing the first and second wrap ply forming plates, and a wrap ply forming bed having a plurality of die cavities of different sizes and/or shapes for supporting mandrels of different sizes and shapes;

FIG. 68 is a side view of the end preparation platform and the composite ply application station, and illustrating a ply lamination head dispensing composite wrap plies onto the wrap ply forming bed;

FIG. 69 is a transverse sectional view of the composite ply application station taken along Line 69-69 of FIG. 68 and showing the ply lamination head dispensing the composite wrap plies over one of the die cavities of the wrap ply forming bed to form a wrap laminate;

FIG. 70 is a side view of the end preparation platform and the composite ply application station, and showing the mandrel transfer mechanism positioned over the tubular material-mandrel assembly, and also showing a ply trimming device trimming the wrap laminate;

FIG. 71 is a transverse sectional view of the composite ply application station taken along Line 71-71 of FIG. 70 and showing the ply trimming device trimming the wrap laminate;

FIG. 72 is a top view of the composite ply application station taken along Line 72-72 of FIG. 70 and showing the ply trimming device trimming the wrap laminate on the wrap ply forming bed;

FIG. 73 is a side view of the end preparation platform and the composite ply application station, and showing the mandrel transfer mechanism transferring the tubular material-mandrel assembly from the end preparation platform to the wrap ply forming bed;

FIG. 74 is a transverse sectional view of the composite ply application station taken along Line 74-74 of FIG. 73 showing the tubular material-mandrel assembly being lowered onto the wrap laminate;

FIG. 75 is a magnified view of the portion of the composite ply application station identified by reference numeral 75 of FIG. 74, and showing the tubular material-mandrel assembly urging the wrap laminate into a die cavity of the wrap ply forming bed;

FIG. 76 shows a first wrap ply folding plate folding a first protruding portion of the wrap laminate over on top of the tubular material-mandrel assembly;

FIG. 77 shows a second wrap ply folding plate folding a second protruding portion of the wrap laminate over on top of the first protruding portion, and also illustrates a heating element of the second wrap ply folding plate locally heating and tacking together the first protruding portion and the second protruding portion on top of the tubular material-mandrel assembly to form a wrap ply lap joint and resulting in a ply-tubular material-mandrel assembly;

FIG. 78 shows the first wrap ply folding plate and the second wrap ply folding plate retracted, and also showing the mandrel transfer mechanism engaging the ply-tubular material-mandrel assembly;

FIG. 79 is a side view of the end preparation platform and the composite ply application station, and showing the mandrel transfer mechanism removing the ply-tubular material-mandrel assembly from the die cavity;

FIG. 80 is a transverse sectional view of the composite ply application station taken along Line 80-80 of FIG. 79 and showing the mandrel transfer mechanism removing the ply-tubular material-mandrel assembly from the die cavity;

FIG. 81 is a perspective view of a ply-tubular material-mandrel assembly manufactured using the mandrel preparation system;

FIG. 82 is a transverse sectional view of the composite ply application station showing an example of a rotatable forming die containing a plurality of die cavities of different sizes and/or shapes;

FIG. 83 is a transverse sectional view of a further example of a composite ply application station configured to receive one of a plurality of replaceable forming dies each having a single die cavity;

FIG. 84 is a transverse sectional view of a further example of a composite ply application station having a horizontally translatable forming die containing a plurality of die cavities of different sizes and/or shapes;

FIG. 85 is a transverse sectional view of a further example of a composite ply application station having a forming die having a forming bed opening (e.g., at least one die cavity) configured to receive the wrap laminate when urged downwardly into the forming bed opening by the tubular material-mandrel assembly;

FIG. 86 is a perspective view of an example of an aircraft formed at least partially of composite material;

FIG. 87 is a perspective view of an example of a composite wing panel comprised of a composite skin panel and a plurality of composite stringers;

FIG. 88 is a cross-sectional view of the composite wing panel taken along line 88-88 of FIG. 87 and showing the composite stringers co-cured or co-bonded to the composite skin panel;

FIG. 89 is a magnified cross-sectional view of a portion of the composite wing panel identified by reference numeral 89 of FIG. 88 and illustrating an example of a composite stringer coupled to a composite skin panel;

FIG. 90 is a perspective view of a portion of a composite stringer showing a film-sock-bladder assembly protruding from a stringer cavity of the composite stringer;

FIG. 91 is a flow chart of operations included in a method of applying a tubular material over a mandrel.

DETAILED DESCRIPTION

Referring now to the drawings which illustrate various examples of the disclosure, shown in FIGS. 1-2 are respectively a side view and a top view of an example of a mandrel preparation system 100 for preparing an elongated mandrel 382 for use in manufacturing a composite stringer 406 (FIG. 90). As described below, the composite stringer 406 may be incorporated into a composite structure, such as a composite wing 402 (FIG. 86) of an aircraft 400 (FIG. 86), or in any one of a variety of other types of composite structures. The mandrel preparation system 100 includes a tubular material application station 114, and a composite ply application station 270. The mandrel preparation system 100 may also include an end preparation station 260 located between the tubular material application station 114 and the composite ply application station 270, and may include a mandrel staging station 106 located upstream of the tubular material application station 114.

Figure 19:
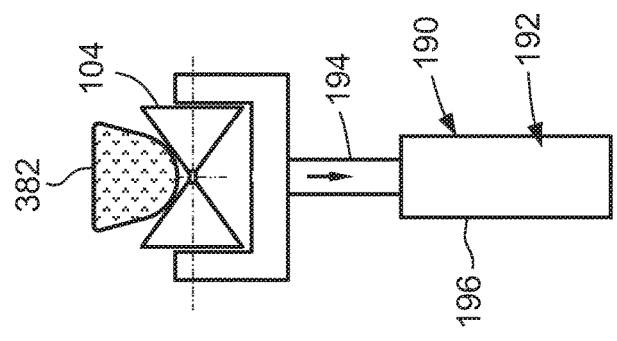
FIG. 19 is an end view of the tubular material application system taken along Line 19-19 of FIG. 18 and illustrating an example of a vertically retractable mandrel support stand supporting the mandrel.

The preparation of the elongated mandrel 382 include applying a tubular material 230 (FIG. 90) over the mandrel 382. The application of the tubular material 230 may comprise applying a breather sock 240 (FIG. 90) or sleeve onto the mandrel 382, applying a film tube 250 (FIG. 90) over the breather sock 240, and applying a wrap laminate 322 (FIG. 90) over the film tube 250 to result in a film-sock-mandrel assembly 202 (FIG. 19). As mentioned below, the film-sock-mandrel assembly 202 may be inserted into a stringer cavity 408 (FIG. 90) of a composite stringer 406 (FIG. 90) to facilitate consolidation and curing of the composite stringer 406. Although the tubular material application system 116 is described in the context of applying a layer of breather material 238 (e.g., a breather sock 240—FIG. 90) and a layer of film material 248 (e.g., a film tube 250—FIG. 90) onto a mandrel 382, the tubular material application system 116 may be implemented for applying any type of tubular material 230 onto any type of elongated member 380 (FIG. 90), and is not limited to applying breather material 238 and film material 248 onto a mandrel 382.

The mandrel preparation system 100 may include a plurality of drive rollers 104 at spaced locations along the process flow direction of the mandrel preparation system 100. The drive rollers 104 may support the mandrel 382, and may be rotatably driven by one or more drive motors (not shown) to move the mandrel 382 from station to station under the control of a controller 102. The controller 102 may control the rotation of the drive rollers 104 for moving the mandrel 382 in coordination with the operation of the various components of the different stations that make up the mandrel preparation system 100. The mandrel 382 may move over the top of the rotating drive rollers 104, each of which may have a relatively shallow circumferential groove for keeping the mandrel 382 centered on the drive rollers 104. In the example shown, the mandrel preparation system 100 may include a drive roller 104 between the mandrel staging station 106 and the tubular material application station 114, and a drive roller 104 between the tubular material application station 114 and the end preparation station 260.

As shown in FIGS. 1-2, the mandrel preparation system 100 may include a mandrel staging station 106 located upstream of the tubular material application station 114. The mandrel staging station 106 may be configured to support a plurality of mandrels 382 in preparation for the introduction of individual mandrels 382 into the tubular material application station 114. In some examples, the mandrel staging station 106 may comprise a surface such as a table (not shown) configured to statically support one or more mandrels 382. In the example shown, the mandrel staging station 106 may comprise a conveyor system 108 configured to sequentially feed the mandrels 382 into alignment with an upstream end of the tubular material application station 114.

Figure 3:
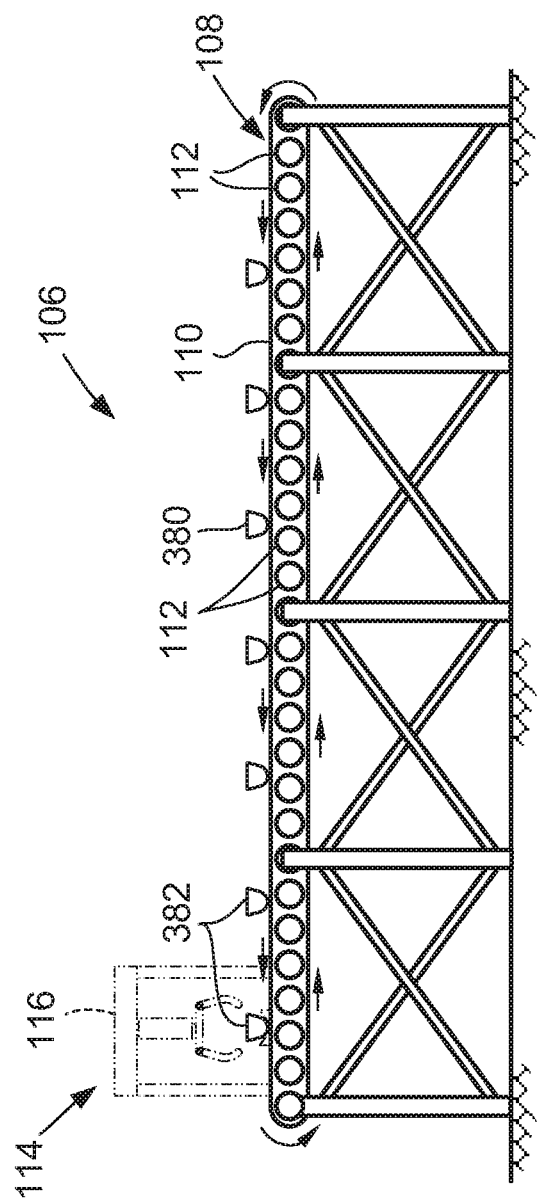
FIG. 3 is a side view of an example of the mandrel preparation station taken along Line 3-3 of FIG. 2 and illustrating a conveyor system for sequentially transporting mandrels into alignment with the tubular material application system.

Referring to FIG. 3, shown is an example of a conveyor system 108 for sequentially positioning individual mandrels 382 into alignment with the tubular material application system 116. The conveyor system 108 may include a continuous-loop conveyor belt 110 supported by a plurality of belt rollers 112. The conveyor belt 110 may be oriented perpendicular to the process flow direction of the mandrel preparation system 100. The conveyor system 108 may be operated in a pulsing manner by the controller 102 for moving each mandrel 382 into alignment with the tubular material application system 116, at which point the movement of the conveyor belt 110 may be temporarily halted to allow a mandrel 382 to be manually or autonomously transferred from the mandrel staging station 106 to the tubular material application station 114. Although the mandrel staging station 106 is shown as a conveyor system 108, the mandrel staging station 106 may include any one of a variety of mechanisms for sequentially positioning individual mandrels 382 at the upstream end of the tubular material application station 114. For example, the mandrel staging station 106 may include a robotic device (not shown), a system of rails (not shown), or an overhead gantry (not shown) for positioning mandrels 382 at the upstream end of the tubular material application station 114.

As mentioned above, the tubular material application system 116 may be implemented for applying tubular material 230 onto any type of elongated member 380, and is not limited to applying tubular material 230 onto a mandrel 382. In this regard, the tubular material application system 116 may be implemented for applying tubular material 230 onto elongated members 380 having any one of a variety of different types of cross-sectional shapes and sizes. In addition, an elongated member 380 may be provided in any one of a variety of different configurations and may be formed of any one of a variety of different types of materials. For example, an elongated member 380 may be formed of metallic material (e.g., aluminum, steel, titanium, etc.) or non-metallic material (e.g., rubber, silicone, fiberglass, carbon-fiber, etc.). Furthermore, an elongated member 380 may be rigid or flexible, and/or solid or hollow.

Referring to FIG. 4-6, shown is an example of a mandrel 382 configured as a bladder 394 having a hollow interior and formed of flexible or elastomeric material (e.g., rubber, silicone) over which tubular material 230 (FIG. 17) may be applied using the tubular material application system 116 (FIGS. 1-2). The bladder 394 may be described as an inflatable bladder, and may include an end fitting 390 affixed to each of opposing ends of the bladder 394. At least one of the end fittings 390 may include a pressure port 392 (FIG. 6) to facilitate the injection of a gas (e.g., air, nitrogen) into the bladder 394. The injection of gas may internally pressurize the bladder 394 to facilitate consolidation and/or curing of the composite stringer 406 (FIG. 90) while maintaining the cross-sectional shape of the stringer cavity 408 (FIG. 90) during consolidation and/or curing.

Referring to FIGS. 7-10, as mentioned above, the tubular material application system 116 (FIGS. 1-2) may be implemented for applying tubular material 230 (FIG. 17) to elongated members 380 (e.g., FIGS. 1-2—mandrels, bladders, composite layups, etc.) of any one of a variety of different cross-sectional shapes and sizes. For example, FIGS. 7-8 show 2 bladders 394 having different cross-sectional sizes, but having the generally same tapered cross-sectional shape with a rounded cap. FIG. 9 shows a bladder 394 having a semi-circular cross-sectional shape. FIG. 10 shows a bladder 394 having a trapezoidal cross-sectional shape. The tubular material application system 116 may be implemented for applying tubular material 230 to elongated members 380 of any length, including lengths of up to 80 feet or more as may be required for preparing a mandrel 382 for a composite stringer 406 (FIG. 86) of a composite wing 402 (FIG. 86) of an aircraft 400 (FIG. 86).

Referring to FIGS. 11-12, shown respectively is a top view and a side view of an example of a tubular material application system 116. As described in greater detail below, the tubular material application system 116 includes a gripper system 130 including a first gripper 150 and a second gripper 152. The first gripper 150 and the second gripper 152 are configured to move with inchworm-type movement from the mandrel downstream end 386 to the mandrel upstream end 388 while incrementally applying a tubular material 230 onto the mandrel 382 to thereby result in a tubular material-mandrel assembly 200 (FIGS. 34, 41, and 58). The tubular material application system 116 may optionally include one or more tubular material spools 222 each containing a continuous length of tubular material 230 to be applied onto the mandrel 382 by the gripper system 130. For example, one of the tubular material spools 222 may be a breather material spool 236 for dispensing breather material 238 as a first layer of tubular material 232 to be applied as a breather sock 240 (FIG. 19) over the mandrel 382, as mentioned above. Another one of the tubular material spools 222 may be a film material spool 246 for dispensing film material 248 as a second layer of tubular material 234 to be applied as a film tube 250 (FIG. 19) over the breather sock 240, as also mentioned above.

As described in greater detail below, the tubular material spools 222 may be located downstream of the gripper system 130, and may optionally be mounted on a spool support rack 224. In one example, the spool support rack 224 may be mounted on support rack tracks 226 that allows for laterally positioning each tubular material spool 222 into alignment with the mandrel 382. The tubular material application system 116 may also optionally include a material cutting device 210 (FIG. 11) located downstream of the gripper system 130. As described in greater detail below, the material cutting device 210 may cut the tubular material 230 after application onto the mandrel 382, and thereby separate the tubular material 230 on the mandrel 382 from the tubular material 230 on the tubular material spool 222.

As described in greater detail below, the first gripper 150 and the second gripper 152 are configured to move relative to each other with inchworm-type movement relative to the lengthwise direction of the mandrel 382. In one example of operation, the gripper system 130 is configured to move with the inchworm-type movement and incrementally apply the tubular material 230 to the mandrel 382 while the mandrel 382 is stationary within the tubular material application system 116, as shown in the example of FIGS. 11-40 and described in greater detail below. Alternatively, the inchworm-type movement of the gripper system 130 may be implemented while the gripper system 130 is semi-stationary, and the mandrel 382 moves in a pulsing manner through the tubular material application system 116, as shown in the example of FIGS. 50-58 and described in greater detail below.

Referring still to FIGS. 11-12, the tubular material application system 116 may include a frame member 118 for supporting the components of the tubular material application system 116. For example, the tubular material application system 116 may include a plurality of mandrel support stands 190 for supporting the mandrel 382 during the application of the tubular material 230. Each of the mandrel support stands 190 may be mounted to the frame member 118. The mandrel support stands 190 may be located at spaced intervals relative to each other at a spacing that avoids excessive drooping of unsupported sections of the mandrel 382 between the mandrel support stands 190 during the application of tubular material 230 by the gripper system 130. In one example, the mandrel support stands 190 may be spaced apart at a spacing of from 1-2 feet. However, the spacing between the mandrel support stands 190 may be less than 1 foot or greater than 2 feet. The mandrel support stands 190 may each include a drive roller 104. One or more of the drive rollers 104 may be rotatably driven by one or more drive motors (not shown) to facilitate movement of the mandrel 382 into the tubular material application station 114 prior to the application of tubular material 230, and to facilitate movement of the mandrel 382 out of the tubular material application system 116 after the tubular material 230 has been applied over a length of the mandrel 382. The drive rollers 104 of the tubular material application station 114 may be controlled by the controller 102 in coordination with the other drive rollers 104 of the mandrel preparation system 100.

Referring to FIGS. 11-14, the first gripper 150 and the second gripper 152 may be supported by the frame member 118. For example, the frame member 118 may include an overhead support assembly 120 supporting a motorized gripper drive assembly 132. The gripper drive assembly 132 may be configured to move the first gripper 150 and second gripper 152 relative to each other in the inchworm-type movement along the mandrel 382. In the example shown, the gripper drive assembly 132 may include a first drive screw 134 and a second drive screw 136 arranged in side-by-side relation to each other, and extending along a lengthwise direction of the frame member 118. The first drive screw 134 and the second drive screw 136 may be respectively rotatably driven by a first drive motor 140 and a second drive motor 142 which may be mounted to the frame member 118.

As shown in FIGS. 13-14, the first gripper 150 and the second gripper 152 may each include a gripper actuator 144 having a ballscrew nut 138 secured to an upper end of the gripper actuator 144. The ballscrew nut 138 of the first gripper 150 may be threadably engaged to the first drive screw 134, and the ballscrew nut 138 of the second gripper 152 be threadably engaged to the second drive screw 136. The first drive motor 140 and the second drive motor 142 may be controlled by the controller 102. The ballscrew nuts 138 translate the rotational motion of the first drive screw 134 and second drive screw 136 into linear motion respectively of the first gripper 150 and second gripper 152 along the length of the mandrel 382.

As an alternative to the overhead support assembly 120, the first gripper 150 and the second gripper 152 may be supported and moved by a movable gantry (not shown), one or more robotic devices (not shown), or by any one of a variety of other mechanisms (not shown) for effecting inchworm-type movement of the gripper system 130 relative to the lengthwise direction of the mandrel 382. For example, the tubular material application system 116 may include a first robotic device and a second robotic device each having robotic arms and respectively coupled to the first gripper 150 and second gripper 152.

Referring to FIG. 15, shown is an example of a gripper (e.g., the first gripper 150 and/or the second gripper 152) in which the gripper actuator 144 has a gripper actuator piston 146 extendable from a gripper actuator cylinder 148. Each gripper actuator 144 may be pneumatically actuated, hydraulically actuated, or electromechanically actuated. The first gripper 150 and the second gripper 152 may each include one or more gripper arms 158. The gripper arms 158 may be coupled to the end of the gripper actuator piston 146. In the example shown, the gripper arms 158 include a gripper upper arm 160 and a pair of gripper side arms 162 pivotably coupled at an arm pivot on opposite sides of the gripper upper arm 160. The cross-sectional shape and size of the gripper upper arm 160 and gripper side arms 162 may be complementary to the cross-sectional shape and size of the mandrel 382 (FIG. 14). For example, the inner surface of the gripper upper arm 160 may be generally flat to facilitate engagement with a generally flat upper surface of the mandrel 382. The inner surface of the gripper side arms 162 may be contoured complementary to the side surfaces and rounded lower surface of the mandrel 382.

Figure 18:
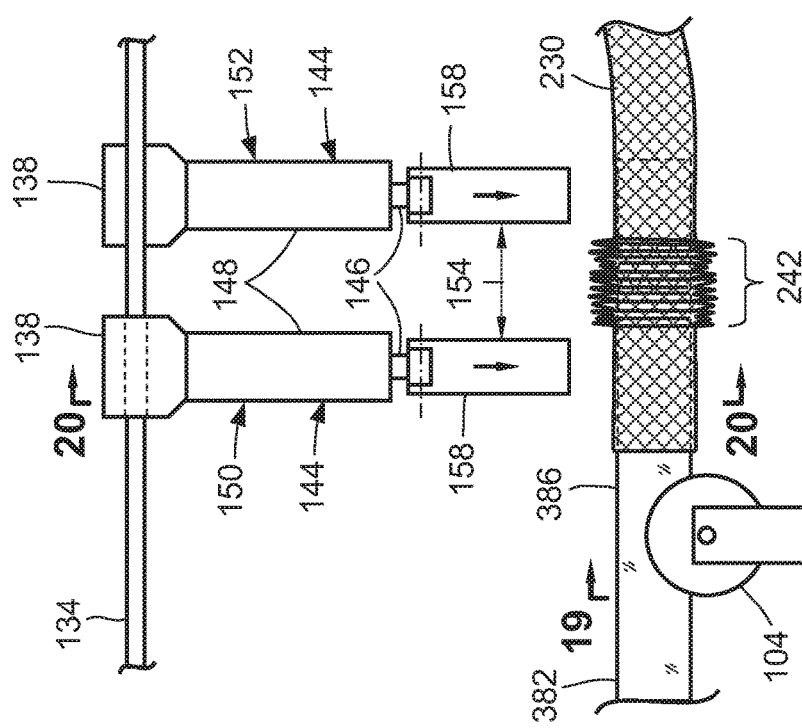
FIG. 18 is a magnified side view of the portion of the tubular material application system identified by reference number 18 and illustrating the tubular material installed on the mandrel downstream end with a gathered portion of tubular material located between the positions of the first gripper and the second gripper.

In the example shown, the first gripper 150 and/or the second gripper 152 may include a gripper arm servomotor 164 at each arm pivot. The gripper arm servomotors 164 may be controlled by the controller 102 (FIG. 1) for pivoting the gripper side arms 162 relative to the gripper upper arm 160 for moving the gripper arms 158 into and out of engagement with the tubular material 230 (FIG. 18). In addition, the gripper arm servomotors 164 may be controlled by the controller 102 to alternatingly clamp and unclamp the gripper arms 158 against the mandrel 382 during the inchworm-type movement of the first gripper 150 and second gripper 152, as described in greater detail below.

It should be noted that FIG. 15 illustrates one possible configuration of the first gripper 150 and second gripper 152, and that the first gripper 150 and second gripper 152 may be provided in any one of a variety of alternative configurations. In this regard, the first gripper 150 and the second gripper 152 are not limited to each having a plurality of movable gripper arms 158 as shown in FIG. 15. For example, the first gripper 150 and/or the second gripper 152 may each be arranged as an opposing pair of clamp halves (not shown) each coupled to a dedicated actuator (not shown), and each clamp half having an inner surface cross-sectional shape that is complementary to the cross-sectional shape of the mandrel 382. In such an arrangement, the opposing pair of clamp halves of each gripper (i.e., the first gripper 150 and second gripper 152) may be respectively actuated by an opposing pair of actuators which may be operated in a coordinated manner to engage the mandrel 382 from opposing lateral sides of the mandrel 382, or from opposing vertical sides (e.g., upper and lower sides) of the mandrel 382, to effectuate the inchworm-type movement of the first gripper 150 and second gripper 152.

As described in greater detail below, the gripper arms 158 of the first gripper 150 and second gripper 152 may each be pivotable into several different positions that facilitate the inchworm-type movement of the first gripper 150 and second gripper 152 along the mandrel 382. For example, the gripper arms 158 of each of the first gripper 150 and the second gripper 152 may be movable between a non-engaged position 180 (FIG. 22) and an engaged position 182 (FIG. 23). In the engaged position 182, the gripper arms 158 may be movable between an unclamped position 186 (FIG. 24) and a clamped position 184 (FIG. 25) as described in greater detail below.

In the example of FIG. 15, the gripper arms 158 of the first gripper 150 and the second gripper 152 may include one or more gripping elements 168 for engaging the tubular material 230 (FIG. 18). The gripping elements 168 may be located on the inner surfaces of the gripper arms 158. In the example shown, the gripping elements 168 may include a plurality of vacuum apertures 170 located along the inner surfaces of the gripper arms 158. The vacuum apertures 170 may be fluidly coupled to a vacuum pressure source 172 (FIGS. 47-49) to generate a suction force along the inner surfaces of the gripper arms 158 for vacuum engagement of the gripper arms 158 to a tubular material 230. The tubular material 230 may be a non-porous material such as a film material 248 (FIG. 19) to facilitate vacuum engagement to the gripper arms 158.

In addition to vacuum apertures 170, one or more of the gripper arms 158 may include a plurality of hook elements 174 located along the inner surfaces of the gripper arms 158. The hook elements 174 may be configured similar to the protruding elements of Velcro™ hook material and/or may be configured or shaped to facilitate mechanical engagement of the gripper arms 158 to a tubular material 230 (FIG. 18) formed of fabric or fibrous material. For example, the hook elements 174 may facilitate mechanical coupling of the gripper arms 158 to a to a fabric material such as breather material 238 (FIG. 90). The hook elements 174 may be integrally formed with the gripper arms 158. For example, the hook elements 174 may be machined into the inner surfaces of the gripper arms 158. Alternatively, the hook elements 174 may be separately manufactured and coupled (e.g., adhesively bonded, mechanically fastened) to the inner surface of the gripper arms 158.

As may be appreciated, the first gripper 150 and the second gripper 152 may be provided with any one of a variety of different configurations of gripping elements 168 for engaging or gripping the tubular material 230 (FIG. 18). The specific configuration of the gripping elements 168 may be dictated at least in part by the material characteristics of the tubular material 230. Such material characteristics may include whether the tubular material 230 is porous or non-porous, fibrous or non-fibrous, flexible or non-flexible, elastic or non-elastic, or any one of a variety of other material characteristics.

The tubular material 230 (FIG. 18) may be provided in any one of a variety of different material compositions and sizes. For example, the tubular material 230 may be provided as the above-mentioned breather material 238 (FIG. 19), which may be described as a breather sock 240 (FIG. 19) having a tubular shape that may be open on both ends. During manufacturing of a composite stringer 406 (FIG. 19), the breather sock 240 may facilitate airflow along the length of the mandrel 382 (FIG. 19) for evacuation of moisture, gas, and volatiles that may be released from the mandrel 382 during curing of the composite stringer 406. The breather sock 240 may have a smaller diameter than the mandrel 382 when the breather sock 240 is in a non-radially-expanded state, such as prior to being installed on the mandrel 382. The breather sock 240 may be capable of resiliently radially expanding or stretching to facilitate loading onto the mandrel 382 to result in a sock-mandrel assembly. The relatively small diameter of the breather sock 240 in its natural, unexpanded state results in the breather sock 240 providing a snug fit against the mandrel surfaces 384. The breather material 238 of the breather sock 240 may be relatively thin (e.g., less than 0.100 inch thick) and may be comprised of natural fibers (e.g., cotton, wool, linen, etc.) or synthetic fibers (e.g., polyester, Nylon, Rayon", etc.) that may be woven or non-woven, knitted, or otherwise intertwined (e.g., felt) or interconnected in a manner allowing the breather sock 240 to expand for installation onto the mandrel 382. The fibers of the breather material 238 may engage with the hook elements 174 (FIG. 15) of the gripper arms 158 (FIG. 15) when the gripper arms 158 are placed in contact with the breather material 238.

In another example, the tubular material 230 (FIG. 19) may be provided as the above-mentioned film material 248 (FIG. 19), and which may be described as a film tube 250 (FIG. 19) that may be open on both ends. The film tube 250 may be applied by the gripper system 130 over the breather sock 240 of the sock-mandrel assembly 201 (FIG. 34), and resulting in a film-sock-mandrel assembly 202 (FIG. 59). The film material 248 may be a relatively thin material having a composition that is chemically non-reactive and non-binding with the composite material of the composite stringer 406 (FIG. 19). The film material 248 may be non-porous and may isolate the breather sock 240 from resin in the composite wrap plies 320 (FIG. 19) that may be applied over the film-sock-mandrel assembly 202, as described in greater detail below. In this manner, the film tube 250 may prevent resin in the composite wrap plies 320 from adhering or bonding to the breather sock 240 during curing of the composite stringer 406. In addition, the film tube 250 may facilitate the removal of the mandrel 382 from the stringer cavity 408 (FIG. 19) after curing of the composite stringer 406 is complete. In one example, the film material 248 may be a polymeric material such as polyolefin, polyvinylchloride, polyethylene, polypropylene, or any other type of film material 248 that is chemically non-reactive with the resin in the composite material. In the open tubular shape, the film tube 250 may have a width or diameter that preferably closely encircles the cross-sectional shape of the breather-covered mandrel 382 (i.e., the sock-mandrel assembly). In some examples, the film material 248 may be a shrink wrap film configured to permanently shrink when heated, causing the shrink wrap film to compress against the surfaces of the sock-mandrel assembly.

Referring to FIGS. 16-17, shown in FIG. 16 is a side view of the tubular material application system 116 illustrating the mandrel 382 supported by the mandrel support stands 190 and showing the mandrel 382 moving into the tubular material application system 116 from the mandrel staging station 106. As indicated above, the mandrel 382 may be moved via the drive roller 104 between the mandrel staging station 106 and the tubular material application station 114, and/or the mandrel 382 may be moved via the drive rollers 104 of the mandrel support stands 190. Also shown in FIG. 16 is the first gripper 150 and the second gripper 152 supported above the mandrel 382, and one or more tubular material spools 222 located downstream of the gripper system 130. FIG. 17 shows the tubular material 230 drawn from a tubular material spool 222, and which tubular material 230 is installed (e.g., manually) on the mandrel downstream end 386. Also shown in FIG. 17 is the gripper arms 158 of the first gripper 150 and the second gripper 152 prior to being moved downwardly, via the gripper actuators 144, to the level of the mandrel 382.

Figure 20:
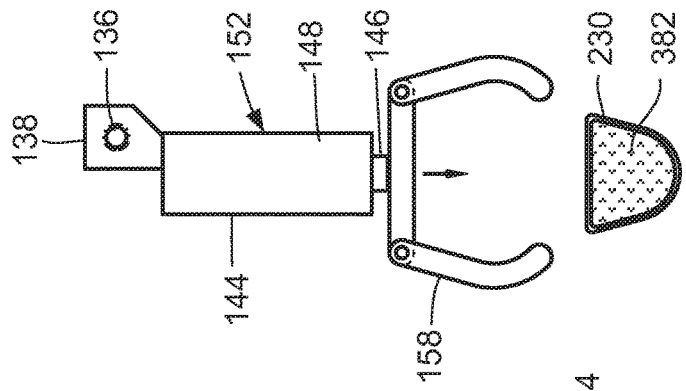
FIG. 20 is an end view of the tubular material application system taken along Line 20-20 of FIG. 18 and illustrating an example of the second gripper prior to moving downwardly into engagement with the tubular material on the mandrel downstream end.

Referring to FIGS. 18-20, shown in FIG. 18 is a magnified view of the tubular material 230 installed over the mandrel downstream end 386 while the mandrel 382 is supported by the mandrel support stands 190. Also shown is the first gripper 150 and second gripper 152 to respectively supported on the first drive screw 134 and second drive screw 136 via the ballscrew nuts 138. The first gripper 150 and the second gripper 152 may each include a gripper actuator 144 for comprised of a gripper actuator cylinder 148 having a gripper actuator piston 146 extensible from the gripper actuator cylinder 148. In addition, the first gripper and the second gripper each include gripper arms 158 coupled to the gripper actuator piston 146.

FIG. 19 is an end view of one of the mandrel support stands 190 supporting the mandrel 382. As mentioned above, the mandrel support stands 190 may each include a drive roller 104 having a circumferential groove for maintaining the mandrel 382 in alignment with the gripper arms 158 of the first gripper 150 and the second gripper 152. Each drive roller 104 may be supported by a U-shaped bracket mounted on top of the mandrel support piston 194. In some examples, each one of the mandrel support stands 190 may be independently vertically retractable to provide clearance for the first gripper 150 and second gripper 152 to pass over each mandrel support stand 190 during the inchworm-type movement of the first gripper 150 and second gripper 152 along the mandrel 382. In this regard, the mandrel support stands 190 may each include a mandrel support actuator 192 having a mandrel support piston 194 extending from a mandrel support cylinder 196. FIG. 20 is an end view of the second gripper 152 prior to the gripper actuator 144 moving the gripper arms 158 downwardly to the vertical level of the mandrel 382.

As shown in FIG. 18, the tubular material 230 may initially be installed (e.g., manually by a technician) over the mandrel downstream end 386. To provide clearance for installing the tubular material 230 over the mandrel downstream end 386, the gripper actuators 144 may support the gripper arms 158 of the first gripper 150 and second gripper 152 at a vertical level above the mandrel 382. The tubular material 230 may be installed in a manner such that a gathered portion 242 of tubular material 230 is formed on the mandrel 382 between the longitudinal position of the first gripper 150 and the longitudinal position of the second gripper 152. The gathered portion 242 may be formed in a manner such that the length of the gathered portion 242 is approximately equal to or no greater than the shortest distance (i.e., a near spacing 154) between the gripper arms 158 of the first gripper 150 and the second gripper 152 when initially engaged to the tubular material 230, and such that the gripper arms 158 of the first gripper 150 and the second gripper 152 do not overlap the gathered portion 242 of tubular material 230.

In addition, the gathered portion 242 may be formed in a manner such that when the tubular material 230 within the gathered portion 242 is in an extended state (e.g., FIGS. 26 and 32), the tubular material 230 in the gathered portion 242 is approximately as long as the longest distance (i.e., a far spacing 156—FIG. 26) between the first gripper 150 and the second gripper 152 during the inchworm-type movement. In addition, the tubular material 230 may be installed over the mandrel downstream end 386 such that the upstream end of the tubular material 230 extends beyond an upstream side of the first gripper 150. In this manner, when the first gripper 150 arrives at the mandrel upstream end 388 (e.g., see FIG. 34) after the tubular material 230 has been pulled over the entire length of the mandrel 382 (FIG. 34), a relatively short length of tubular material 230 (i.e., a material overhang 244) will extend beyond the upstream end of the mandrel 382. As described in greater detail below, an end clamping element 264 (FIG. 65) may be secured or tightened around the material overhang 244 on both ends of the mandrel 382 as a means to restrict or prevent movement of the tubular material 230 relative to the mandrel 382 during downstream operations.

Referring to FIG. 21, shown are the gripper arms 158 of the first gripper 150 and second gripper 152 in position for engagement with the tubular material 230 on the mandrel downstream end 386 after being lowered by the gripper actuators 144 to the vertical level of the mandrel 382. The first gripper 150 is longitudinally positioned on the immediate upstream side of the gathered portion 242, and the second gripper 152 is longitudinally positioned on the immediate downstream side of the gathered portion 242. The drive roller 104 of the mandrel support stand 190 nearest the first gripper 150 is shown retracted downwardly away from the mandrel 382 to provide clearance for the first gripper 150 and second gripper 152 when moving in an upstream direction along the mandrel 382. In this manner, each mandrel support stand 190 may be temporarily retracted downwardly away from the mandrel 382 as the first gripper 150 and second gripper 152 pass by each mandrel support stand 190. As mentioned above, in the example of FIGS. 11-40, the mandrel 382 may be statically positioned on the mandrel support stands 190 during the inchworm-type movement of the gripper system 130 along the mandrel 382. In addition, the first gripper 150 and the second gripper 152 may be maintained, via the gripper actuators 144, at a constant vertical position during the inchworm-type movement of the first gripper 150 and the second gripper 152 along the mandrel 382.

FIG. 22 shows the gripper arms 158 of the first gripper 150 in the non-engaged position 180. As mentioned above, in the non-engaged position 180, the gripper arms 158 may be spread apart by an amount that allows the gripper arms 158 to be positioned over and/or at least partially surrounding the mandrel 382 without contacting and/or engaging the tubular material 230. Although not shown, the gripper arms 158 of the second gripper 152 may also be initially in the non-engaged position 180.

FIG. 23 shows the gripper arms 158 of the first gripper 150 after being moved into the engaged position 182 in which the gripper arms 158 become engaged or attached to the tubular material 230 on the upstream side of the gathered portion 242 (FIG. 21). The gripper arms 158 of the second gripper 152 may also be initially moved into the engaged position 182 for engaging with or attaching to the tubular material 230 on the downstream side of the gathered portion 242. In the engaged position 182, the gripper arms 158 may be closer together than in the non-engaged position 180, and causing the gripper arms 158 to make contact with and/or engage with the tubular material 230. Depending upon the configuration of the gripping elements 168 (FIG. 15), attachment of the gripper arms 158 to the tubular material 230 may occur as a result of physical contact between the gripping elements 168 and the tubular material 230. In the example of the gripping elements 168 configured as hook elements 174 (e.g., FIG. 15), physical contact of the hook elements 174 with a tubular material 230 formed of fibrous or a fabric, such as the above-mentioned breather material 238, may cause the breather material 238 to attach to the gripper arms 158. In the example of the gripper elements configured as vacuum apertures 170 (FIG. 15) formed in the inner surfaces of the gripper arms 158, activation of the vacuum pressure source 172 (FIGS. 47-49) when the gripper arms 158 are in close proximity to a tubular material 230 that is non-porous, such as the above-mentioned film material 248 (FIG. 19), may cause the film material 248 to attach to the gripper arms 158.

Referring still to FIGS. 21-25, once the gripper arms 158 of the first gripper 150 and second gripper 152 are moved into the engaged position 182 with the tubular material 230 at the mandrel downstream end 386, the locally-engaged portions of the tubular material 230 remain attached to the gripper arms 158, and resulting in the locally-engaged portions of the tubular material 230 moving respectively with the first gripper 150 and the second gripper 152 during the inchworm-type movement along the mandrel 382. When the first gripper 150 and second gripper 152 arrive at the mandrel upstream end 388 after the tubular material 230 has been applied over the mandrel 382, the gripper arms 158 are moved (e.g., via the gripper arm servomotors 164—FIG. 15) into the non-engaged position 180 (FIG. 22), causing the tubular material 230 to detach from the gripper arms 158, as described in greater detail below.

As mentioned above, in the engaged position 182, the gripper arms 158 may be either in an unclamped position 186 or in a clamped position 184. FIG. 24 shows the gripper arms 158 of the first gripper 150 in the unclamped position 186 wherein which the gripper side arms 162 are pivoted slightly outwardly away from the mandrel surfaces 384, and which results in the locally-engaged portion of the tubular material 230 pulling away from the mandrel 382. In addition, during outward pivoting of the gripper side arms 162, the gripper actuator piston 146 may be slightly retracted upwardly into the gripper actuator cylinder 148 for pulling the gripper upper arm 160 and the locally-engaged portion of tubular material 230 away from the mandrel surface 384 on the upper side of the mandrel 382. Although a gap is shown between the mandrel surfaces 384 and the gripper arms 158, the gripper arms 158 may be in a clamped position 184 with no discernible gap between the gripper arms 158 and the mandrel surfaces 384. In the unclamped position 186, the first gripper 150 and the locally-engaged portion of tubular material 230 may move freely along the lengthwise direction of the mandrel 382.

FIG. 25 shows the gripper arms 158 of the second gripper 152 in the clamped position 184 in which the gripper arms 158 are clamping the locally-engaged portion of tubular material 230 against the mandrel 382. In the clamped position 184, the gripper arms 158 and the locally-engaged portion of tubular material 230 are unable to move relative to the mandrel 382. The controller 102 (FIG. 1) may control the gripper arm servomotors 164 (FIG. 15) for pivoting the gripper arms 158 between the above-described positions. In addition, the controller 102 may control the first drive motor 140 (FIG. 21) for rotating the first drive screw 134 (FIG. 24) for moving the first gripper 150 in an upstream direction along the mandrel 382 while the second gripper 152 is stationary on the mandrel 382.

Referring to FIGS. 26-30, shown in FIG. 26 is a side view of the tubular material application system 116 following the first part of the inchworm-type movement of the gripper system 130 for pulling the tubular material 230 over the mandrel 382. The first gripper 150 has moved upstream away from the second gripper 152 by a distance equal to the far spacing 156, and which results in the tubular material 230 within the gathered portion 242 (FIG. 20) being in the extended state. In the second part of the inchworm-type movement shown in FIG. 26, the gripper arms 158 of the first gripper 150 are moved from the unclamped position 186 shown in FIG. 27, to the clamped position 184 shown in FIG. 28, and the gripper arms 158 of the second gripper 152 are moved from the clamped position 184 shown in FIG. 29, to the unclamped position 186 shown in FIG. 30. The mandrel support stand 190 (FIG. 26) remains downwardly retracted to provide clearance for the second gripper 152.

FIG. 31 shows the tubular material application system 116 after movement of the second gripper 152 in the upstream direction toward the first gripper 150 while the first gripper 150 remains in the clamped position 184 (FIG. 28) against the mandrel 382. Movement of the second gripper 152 may be effectuated by the controller 102 (FIG. 1) activating the second drive motor 142 for rotating the second drive screw 136. As a result of the movement of the second gripper 152 toward the first gripper 150, another gathered portion 242 of tubular material 230 is formed between the first gripper 150 and the second gripper 152. Also shown is the mandrel support stand 190 nearest the downstream end of the tubular material application station 114 moved back to its original vertical position, and the immediately-adjacent mandrel support stand 190 vertically retracted to provide clearance for the first gripper 150 and second gripper 152 during the next inchworm-type movement.

FIG. 32 shows the first gripper 150 after moving upstream to the far spacing 156 distance from the second gripper 152 while the second gripper 152 remains in the clamped position 184 (FIG. 29) against the mandrel 382, and which results in the tubular material 230 within the gathered portion 242 being placed in the extended state. FIG. 33 shows the second gripper 152 after moving to the near spacing 154 distance from the first gripper 150, while the first gripper 150 remains in the clamped position 184 (FIG. 28) against the mandrel 382, and which results in another gathered portion 242 of tubular material 230 formed between the first gripper 150 and the second gripper 152.

FIG. 34 shows the first gripper 150 at the mandrel upstream end 388 after the tubular material 230 has been applied over the entire length of the mandrel 382 by the gripper system 130. As mentioned above, the tubular material 230 may be initially applied over the mandrel downstream end 386 such that a portion of the tubular material 230 extends upstream of the first gripper 150 (FIG. 21), and resulting in the material overhang 244 at the mandrel upstream end 388 at the completion of the application of the tubular material 230 over the length of the mandrel 382. Although not shown in FIG. 34, after the tubular material 230 has been applied over the mandrel 382, the gripper arms 158 of the first gripper 150 and the second gripper 152 may be moved into the non-engaged position 180 (FIG. 22), and the locally-engaged portions of the tubular material 230 may detach from the gripper arms 158. The gripper actuators 144 may then be activated to upwardly retract the gripper arms 158 above the level of the mandrel 382, and the first drive motor 140 and second drive motor 142 may be activated for moving the first gripper 150 and second gripper 152 back to the downstream end of the tubular material application station 114 in preparation for the next application of tubular material 230 onto the same mandrel 382 or onto another mandrel 382 that may be loaded into the upstream end of the tubular material application station 114 after the current mandrel 382 exits the downstream end of the tubular material application station 114.

Figure 35:
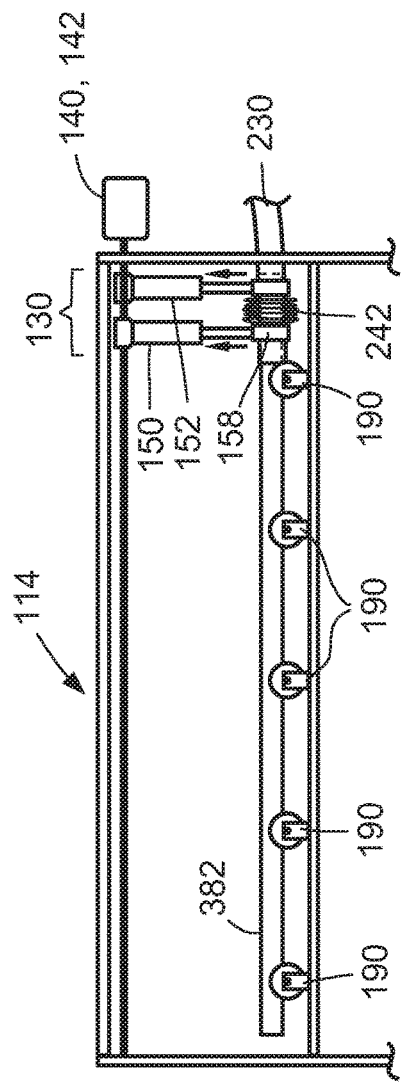
FIG. 35 is a side view of an example of a tubular material application system in which the mandrel support stands are stationary and the gripper system (i.e., the first gripper and the second gripper) are vertically movable for lifting lengthwise sections of the mandrel up and over the mandrel support stands during the inchworm-type movement of the gripper system along the mandrel.
Figure 36:
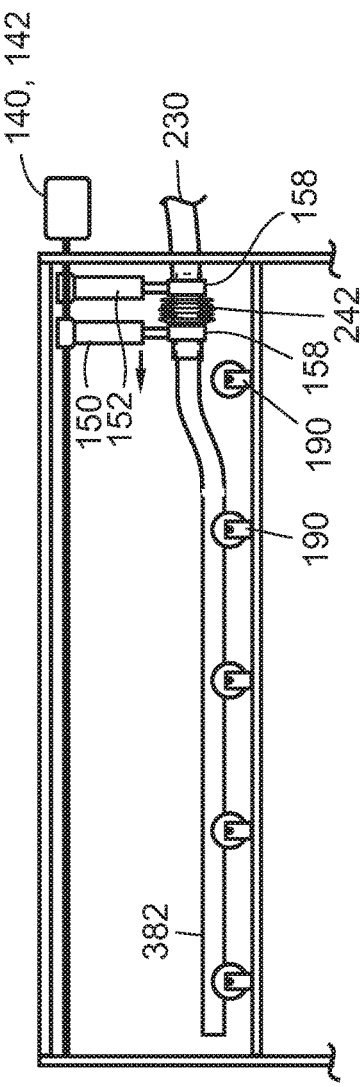
FIG. 36 is a side view of the tubular material application system of FIG. 35 showing the first gripper and second gripper on opposite sides of the gathered portion and vertically lifting a lengthwise section of the mandrel prior to starting the inchworm-type movement.
Figure 37:
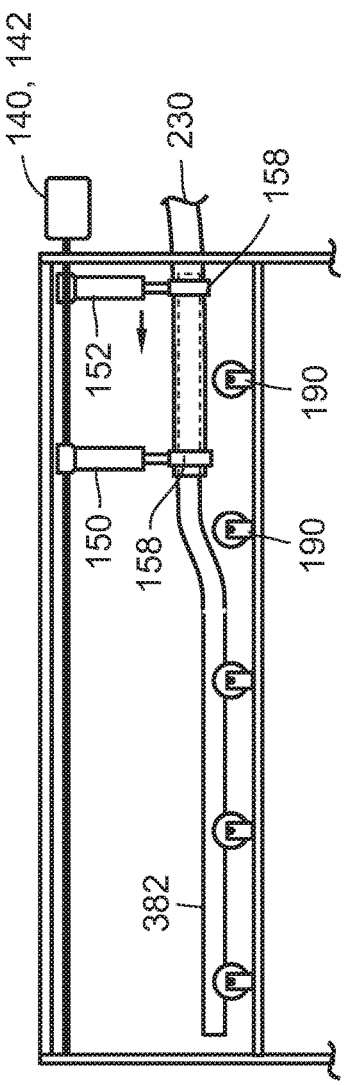
FIG. 37 is a side view of the tubular material application system of FIG. 36 showing the second gripper clamped against the mandrel while the first gripper moves in an upstream direction over the mandrel support stand and the gathered portion of tubular material is extended between the first gripper and the second gripper during the inchworm-type movement.

Referring now to FIGS. 35-40, shown is an example of the tubular material application station 114 wherein the mandrel support stands 190 are vertically stationary, and the first gripper 150 and the second gripper 152 are operated in a manner to vertically lift lengthwise sections of the mandrel 382 up and the mandrel support stands 190 during the inchworm-type movement of the gripper system 130 along the mandrel 382. In FIG. 35, the gripper arms 158 of the first gripper 150 and second gripper 152 may be in the engaged position 182 (FIG. 23) on opposite sides of the gathered portion 242 at the mandrel downstream end 386. In FIG. 36, the first gripper 150 and the second gripper 152 may vertically lift a lengthwise section of the mandrel 382 prior to starting the inchworm-type movement. In FIG. 37, the gripper arms 158 of the second gripper 152 may be in the clamped position 184 (FIG. 25) and may be stationary relative to the mandrel 382, while the gripper arms 158 of the first gripper 150 may be in the unclamped position 186 (FIG. 24) and the first drive motor 140 may move the first gripper 150 in the upstream direction over the mandrel support stand 190, causing the gathered portion 242 of tubular material 230 to be extended between the first gripper 150 and the second gripper 152 during the inchworm-type movement.

in FIG. 38, the gripper arms 158 of the first gripper 150 may be in the clamped position 184 (FIG. 28) against the mandrel 382, while the first gripper 150 and second gripper 152 continue to lift a lengthwise section of the mandrel 382 above the level of the mandrel support stands 190. The gripper arms 158 of the second gripper 152 may be in the unclamped position 186 (FIG. 30), and the second gripper 152 may be moved by the second drive motor 142 in the upstream direction toward the first gripper 150 to result in the formation of another gathered portion 242 of tubular material 230 between the first gripper 150 and the second gripper 152. In FIG. 39, the gripper arms 158 of the second gripper 152 may be in the clamped position 184 against the mandrel 382, while the gripper arms 158 of the first gripper 150 may be in the unclamped position 186, allowing the first drive motor 140 to move the first gripper 150 in the upstream direction above the mandrel support stands 190. The gripper arms 158 of the first gripper 150 and second gripper 152 continue to lift a lengthwise section of the mandrel 382 above the level of the mandrel support stands 190. In FIG. 40, the gripper arms 158 of the first gripper 150 may be in the clamped position 184 against the mandrel 382 while the gripper arms 158 of the second gripper 152 may be in the unclamped position 186, allowing the second drive motor 142 to move the second gripper 152 in the upstream direction over the mandrel support stands 190. In any one of the examples of the tubular material application system 116, the inchworm-type movement may be repeated any number of times until the gripper system 130 applies the tubular material 230 over a desired length of the mandrel 382. For example, the inchworm-type movement may be repeated until the gripper system 130 arrives at the mandrel upstream end 388 and the tubular material 230 has been applied over the entire length of the mandrel 382.

FIG. 41 shows the first gripper 150 and second gripper 152 moving back toward the downstream end of the tubular material application system 116 after the tubular material 230 has been applied over the entire length of the mandrel 382. Although not shown, once the first gripper 150 and second gripper 152 arrived at the mandrel upstream end 388, the gripper arms 158 may be disengaged from the tubular material 230, and the gripper actuators 144 may lift the gripper arms 158 above the level of the mandrel 382, and the first drive motor 140 and second drive motor 142 may be activated for moving the first gripper 150 and second gripper 152 back to the downstream end of the tubular material application system 116. Also shown in FIG. 41 is the tubular material 230 extending between the mandrel downstream end 386 and the tubular material spool 222. In the example shown, the tubular material application system 116 includes a material cutting device 210 which, in the example shown, is mounted on the frame member 118. However, the material cutting device 210 may be mounted in any manner and at any location downstream of the gripper system 130. The tubular material 230 drawn from the spool may extend through the material cutting device 210.

Referring to FIGS. 42-43, shown in FIG. 42 is an end view of the tubular material application system 116 showing an example of the material cutting device 210 for cutting the downstream end of the tubular material 230 after application onto the mandrel 382. As shown in FIG. 43, the material cutting device 210 is configured to cut the tubular material 230 after application onto the mandrel 382 for separating the tubular material 230 on the mandrel 382 from the tubular material 230 on the tubular material spool 222. In the example shown, the material cutting device 210 is configured as a guillotine cutter 212 having a material cutting block 214 and a material cutting blade 216 supported on opposite sides by a blade guide 218. The material cutting blade 216 may be actuated by a blade actuator 220 under control of the controller 102 (FIG. 1) for cutting the tubular material 230 against the material cutting block 214. The tubular material 230 may be cut to a length that result in a material overhang 244 (FIG. 41) extending slightly (e.g., no more than 6 inches) past the mandrel downstream end 386, similar to the material overhang 244 that may be provided on the mandrel upstream end 388, as described above. As an alternative to the material cutting device 210, the downstream end of the tubular material 230 may be manually cut by a technician. To avoid the need to cut the tubular material 230 at the mandrel downstream end 386 the tubular material 230 may optionally be pre-cut in a length that is slightly longer than the mandrel 382 to allow for a material overhang 244 at the mandrel upstream end 388 and at the mandrel downstream end 386.

Referring to FIG. 44, shown is a top view of an example of a spool support rack 224 configured to support one or more tubular material spools 222 each containing a continuous length of tubular material 230 for application by the gripper system 130 (FIG. 41) onto a mandrel 382. As mentioned above, the spool support rack 224 may support a plurality of tubular material spools 222 which may contain the same or different types of tubular material 230. For example, the spool support rack 224 may contain a breather material spool 236 for dispensing breather material 238 (FIG. 90) as a first layer of tubular material 232 (FIG. 19) over the mandrel 382, and a film material spool 246 for dispensing film material 248 as a second layer of tubular material 234 (FIG. 90) to be applied over the breather material 238, as mentioned above. The spool support rack 224 may be mounted on support rack tracks 226 that allows for laterally positioning each tubular material spool 222 into alignment with the gripper system 130 (FIG. 41) and mandrel 382. For example, after breather material 238 has been applied to the mandrel 382, and cut (e.g., by the material cutting device 210) to separate the breather material 238 on the mandrel 382 from the breather material spool 236, the spool support rack 224 may be moved along the support rack tracks 226 to move the breather material spool 236 out of alignment with the mandrel 382 and/or gripper system 130, and move the film material spool 246 into alignment with the mandrel 382 and/or gripper system 130 in preparation for applying the film material 248 over the breather-covered mandrel. As may be appreciated, the spool support rack 224 may contain any number of tubular material spools 222 containing any one or more of a variety of different types of tubular material 230, and is not limited to containing a breather material spool 236 and a film material spool 246.

Referring to FIGS. 45-46, shown in FIG. 45 is the tubular material application system 116 during the initial stage of applying a second layer of tubular material 234 (e.g., film material 248—FIG. 90) over the first layer of tubular material 232 (e.g., breather material 238—FIG. 90). The second layer of tubular material 234 is drawn from the tubular material spool 222 supported on the above-described spool support rack 224. FIG. 46 shows the second layer of tubular material 234 installed (e.g., manually) over the mandrel downstream end 386. Also shown is a lengthwise section of the tubular material 230 formed as a gathered portion 242 which is located between the longitudinal position of the first gripper 150 and the longitudinal position of the second gripper 152. The gripper arms 158 of the first gripper 150 are shown engaged to the tubular material 230 on the upstream side of the gathered portion 242. The gripper arms 158 of the second gripper 152 are shown being lowered by the gripper actuator 144 down to the vertical level of the mandrel 382 to allow the gripper arms 158 to be engaged with the tubular material 230 on the downstream side of the gathered portion 242. In the example shown, the second layer of tubular material 234 may be a film material 248 or otherwise non-porous material to be applied over the breather material 238 previously applied to the mandrel 382.

Figure 49:
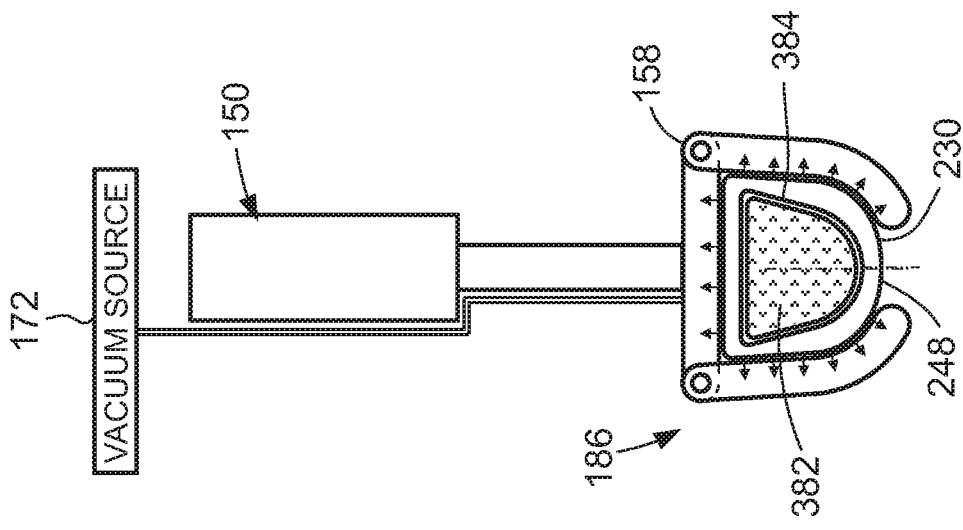
FIG. 49 is an end view of the gripper of FIG. 48 showing the gripper arms moved into the unclamped position while the vacuum pressure maintains engagement between the gripper arms and the second layer of tubular material during inchworm-type movement of the gripper system.
Figure 48:
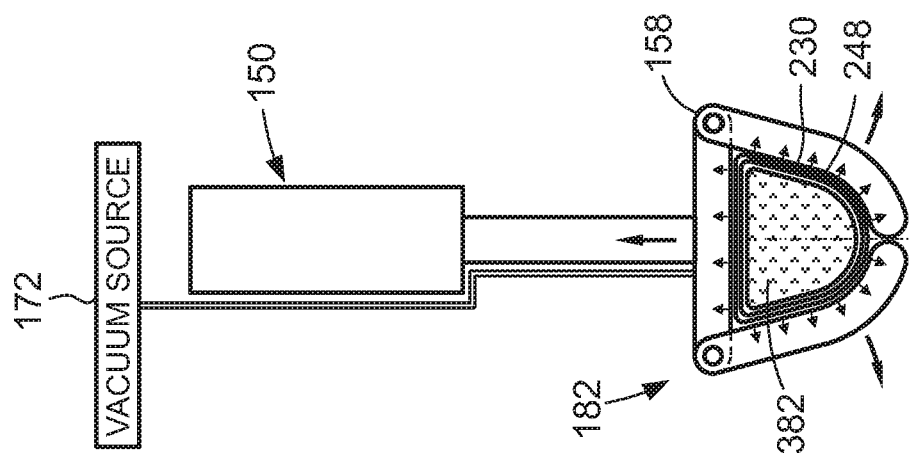
FIG. 48 is an end view of the gripper of FIG. 47 showing the gripper arms in the engaged position and engaged to the second layer of tubular material via vacuum pressure applied by a vacuum pressure source.
Figure 47:
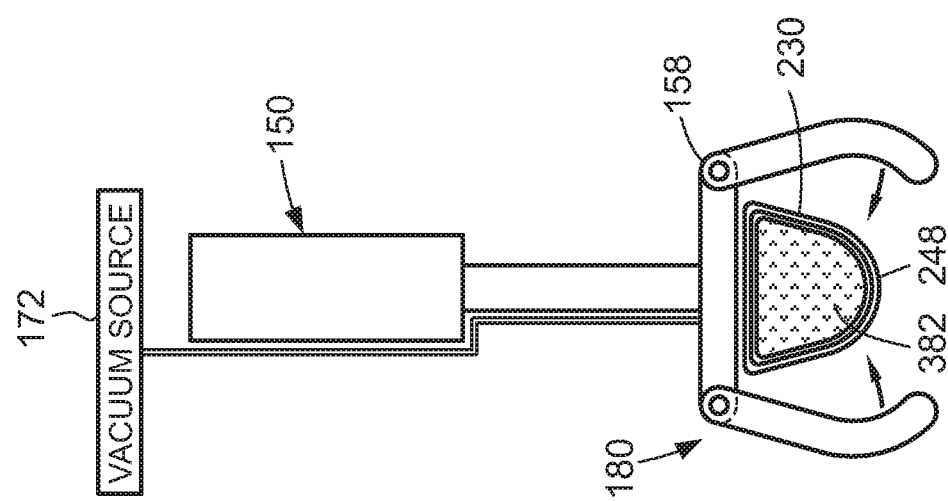
FIG. 47 is an end view of an example of a gripper system (e.g., the first gripper and/or the second gripper) taken long Line 47-47 of FIG. 46 fluidly coupled to a vacuum pressure source and showing the gripper arms in the open position prior to engagement with the second layer of tubular material.

Referring to FIGS. 47-49, shown in FIG. 47 is an example of the first gripper 150 configured for vacuum engagement of the tubular material 230, which may be a non-porous film material 248. The gripper arms 158 (FIG. 15) of the first gripper 150 (and the second gripper 152) may include gripping elements 168 (FIG. 15) configured as one or more vacuum apertures 170 (FIG. 15) located along the inner surfaces of the gripper arms 158, as described above. The vacuum apertures 170 may be fluidly coupled to a vacuum pressure source 172 to generate a suction force along the inner surfaces of the gripper arms 158 for vacuum engagement of the gripper arms 158 to a local portion of the film material 248. The gripper arms 158 are shown in the non-engaged position 180 prior to engagement with the local portion of the film material 248. FIG. 48 shows the gripper arms 158 in the engaged position 182 and vacuum-engaged to the film material 248 via vacuum pressure applied by the vacuum pressure source 172. FIG. 49 shows the gripper arms 158 in the unclamped position 186 while the vacuum apertures 170 maintain engagement between the gripper arms 158 and the local portion of the film material 248. In the unclamped position 186, the gripper arms 158 pull the local portion of the film material 248 away from the mandrel surfaces 384 to allow the gripper arms 158 and the local portion of the film material 248 to move along the lengthwise direction of the mandrel 382 during the inchworm-type movement of the gripper system 130.

Referring to FIGS. 50-58, shown is an example of a tubular material application system 116 in which the gripper system 130 is semi-stationary, and the mandrel 382 moves in a pulsing manner through the tubular material application system 116 during the inchworm-type movement of the gripper system 130 relative to the mandrel 382. The gripper system 130 includes a first gripper 150 and a second gripper 152 which may be configured similar to the above-described configurations of the gripper system 130, with the exception that the first gripper 150 may be longitudinally stationary and the second gripper 152 may move relative to the first gripper 150 in coordination with movement of the mandrel 382, as described in greater detail below. The first gripper 150 may be fixedly coupled to the frame member 118, and the second gripper 152 may be coupled to a second drive screw 136 rotatably driven by a second drive motor 142 for moving the second gripper 152 along a longitudinal direction relative to the first gripper 150 during the inchworm-type movement. The first gripper 150 and the second gripper 152 may each include the above-described gripper arms 158 which may coupled to gripper actuator 144 for adjusting the vertical position of the gripper arms 158 before, during, and after the application of the tubular material 230 onto the mandrel 382, as described above.

The tubular material application system 116 may include a material support table 122 located immediately downstream of the gripper system 130 for supporting the tubular material 230 to be applied to the mandrel 382. In addition, the tubular material application system 116 may include the above-described material cutting device 210, and one or more of the above-described tubular material spools 222 located downstream of the material support table 122. The one or more tubular material spools 222 supported on a spool support rack 224 which may be mounted on support rack tracks 226, as described above. The material support table 122 may have a length that is at least as long as the tubular material 230 to be applied over the mandrel 382. In addition, the material support table 122 may optionally include one or more drive rollers 104 for moving the tubular material covered mandrel off of the material support table 122 in a downstream direction for optional post-processing operations as described in greater detail below. The frame member 118 supporting the gripper system 130 may also include one or more mandrel support stands (not shown)

having drive rollers 104 to support the mandrel 382 and/or facilitate movement of the mandrel 382 in a downstream direction after the tubular material 230 has been applied to the mandrel 382.

Figure 53:
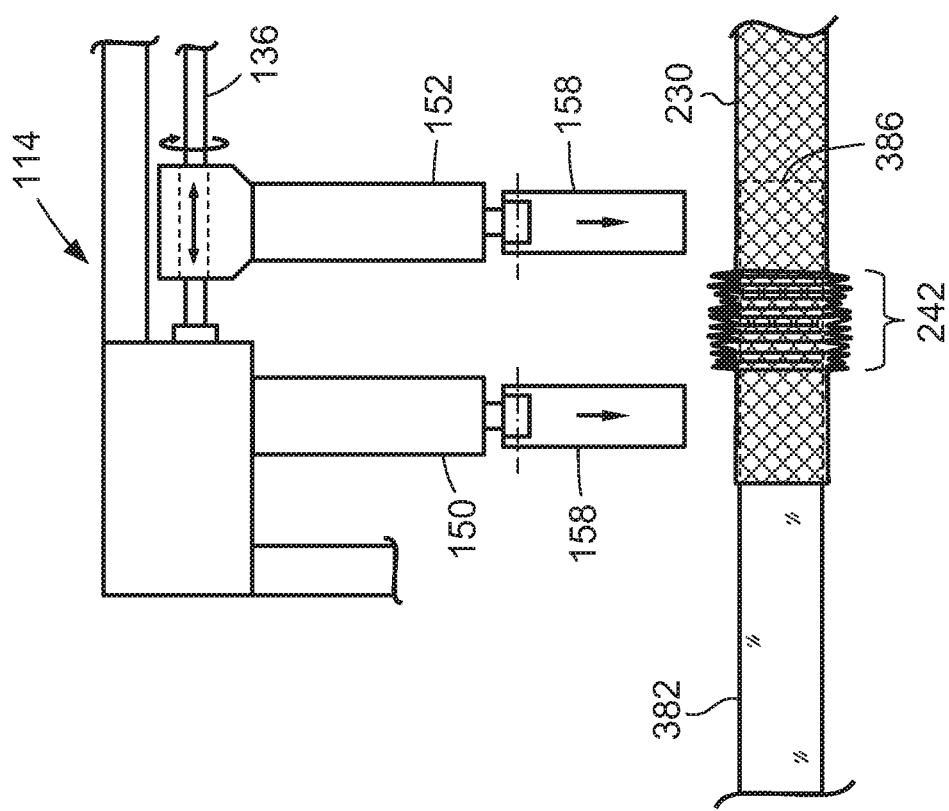
FIG. 53 is a magnified view of the portion of the tubular material application system identified by reference numeral 53 and illustrating the tubular material installed on the mandrel downstream end with a gathered portion of tubular material located between the positions of the first gripper and the second gripper.

FIG. 50 shows a mandrel 382 at the mandrel staging station 106, and a length of tubular material 230 being drawn from the tubular material spool 222 onto the material support table 122. FIG. 51 shows the drive roller 104 at the mandrel staging station 106 feeding the mandrel 382 into the tubular material application station 114 until the mandrel downstream end 386 is positioned underneath the first gripper 150 and second gripper 152. Also shown is a length of tubular material 230 supported on the material support table 122 after being cut away from the tubular material spool 222 by the material cutting device 210. Alternatively, the material cutting device 210 may be omitted from the tubular material application station 114, and the tubular material 230 may be manually cut. FIG. 52 shows the tubular material 230 installed (e.g., manually) on the mandrel downstream end 386, and the gripper arms 158 of the first gripper 150 and second gripper 152 supported above the mandrel 382. FIG. 53 shows a lengthwise section of the tubular material 230 installed on the mandrel downstream end 386 in a manner to include a gathered portion 242 located between the longitudinal position of the gripper arms 158 of the first gripper 150 and the longitudinal position of the gripper arms 158 of the second gripper 152, similar to the above-described arrangements shown in FIGS. 18 and 46. The second gripper 152 may be moved by rotation of the second drive screw 136 via activation of the second drive motor 142.

In FIG. 54, the gripper arms 158 of the first gripper 150 and the second gripper 152 are vertically lowered by the gripper actuators 144 to the level of the mandrel 382. The gripper arms 158 may be moved into the engaged position 182 (FIG. 23) for attachment of the gripper arms 158 to local portions of the tubular material 230 on opposite sides of the gathered portion 242. The gripper arms 158 of the first gripper 150 may initially be in the unclamped position 186 (FIG. 24) in which the gripper arms 158 remain engaged to a local portion of the tubular material 230, and allowing the mandrel 382 to move in a lengthwise direction relative to the gripper arms 158. The gripper arms 158 of the second gripper 152 may initially be in the clamped position 184 (FIG. 25) in which the gripper arms 158 remain engaged to a local portion of the tubular material 230 and are clamped against the mandrel surfaces 384.

In FIG. 55, the mandrel 382 is moved into the tubular material application station 114 by the rotation of the drive roller 104 located immediately downstream of the mandrel staging station 106. The second gripper 152 moves with the mandrel 382 along the downstream direction while the first gripper 150 remains stationary, and which results in the extension of the gathered portion 242 of tubular material 230. When the movement of the mandrel 382 causes the tubular material 230 within the gathered portion 242 to reach the above-described extended state, the movement of the mandrel 382 is stopped. In FIG. 56, the gripper arms 158 of the first gripper 150 are in the clamped position 184 (FIG. 28) against the mandrel 382 while the gripper arms 158 of the second gripper 152 are in the unclamped position 186 (FIG. 30), allowing the second drive motor 142 to move the second gripper 152 in the upstream direction toward the first mandrel 382 to form another gathered portion 242 of tubular material 230 between the first gripper 150 and the second gripper 152 during the inchworm-type movement.

In FIG. 57, the gripper arms 158 of the first gripper 150 arms are in the unclamped position 186 (FIG. 24), and the gripper arms 158 of the second gripper 152 are in the clamped position 184 (FIG. 25) against the mandrel 382. The mandrel 382 is again moved by the rotation of the drive roller 104 located downstream of the mandrel staging station 106, causing the second gripper 152 to again move with the mandrel 382 along the downstream direction while the first gripper 150 remains stationary, and which again results in the extension of the gathered portion 242 of tubular material 230 for further drawing the tubular material 230 over the mandrel 382. The inchworm-type movement may be repeated until the tubular material 230 has been applied over the entire length of the mandrel 382. The gripper arms 158 of the first gripper 150 and second gripper 152 may then be moved into the non-engaged position 180 (FIG. 22), releasing the localized portions of tubular material 230 from the gripper arms 158, and the gripper actuators 144 of the first gripper 150 and second gripper 152 may vertically retracted upwardly. In FIG. 58, the drive rollers 104 of the material support table 122 may be activated for moving the tubular material-mandrel assembly 200 off of the material support table 122.

Referring to FIGS. 59-61, shown in FIG. 59 is an example of the above-described tubular material application system 116 of FIG. 1 after completing the application of tubular material 230 over the mandrel 382, and resulting in a tubular material-mandrel assembly 200. As mentioned above, the tubular material application station 114 may include one or more drive rollers 104 for moving the tubular material-mandrel assembly 200 in a downstream direction for potential post-processing. For example, shown is a drive roller 104 located between the frame member 118 and the spool support rack 224. In addition, a drive roller 104 may be located between the spool support rack 224 and a heat shrink device 252. The heat shrink device 252 may optionally be included with the tubular material application system 116 for examples where the tubular material 230 is a shrink wrap film.

FIG. 60 is a top view of the tubular material application system 116 showing the tubular material-mandrel assembly 200 moving, via the drive rollers 104, through the heat shrink device 252. FIG. 61 is a sectional view of the heat shrink device 252. The heat shrink device 252 may be located downstream of the tubular material spool 222, and may apply heat 256 to the shrink wrap film (e.g., the film material to 48) in a manner to contract the shrink wrap film and thereby compact the one or more layers of tubular material 230 (e.g., breather material 238) against the mandrel surfaces 384. In the example of FIGS. 60-61, the heat shrink device 252 may be a heat shrink oven 254 through which the tubular material-mandrel assembly 200 may be passed for locally applying heat 256 to the shrink wrap film. Alternatively, the heat shrink device 252 may comprise one or more heat guns (not shown) that may be passed over the tubular material-mandrel assembly 200, or such heat guns may be held stationary while the tubular material-mandrel assembly 200 is moved in a downstream direction.

Referring to FIGS. 62-65, shown in FIG. 62 is a side view of a portion of the mandrel preparation system 100 showing an example of an end preparation station 260 and a composite ply application station 270. The end preparation station 260 may include an end preparation platform 262 that may be located downstream of the heat shrink device 252, and may be configured to support the tubular material-mandrel assembly 200 during the optional installation of an end clamping element 264 (FIG. 65) onto at least one of opposing ends of the tubular material-mandrel assembly 200. FIG. 63 is a transverse sectional view of the end preparation platform 262 showing a lengthwise notch 266 in the end preparation platform 262 for stably supporting the tubular material-mandrel assembly 200 during the installation of the end clamping elements 264. As mentioned above, the tubular material application system 116 may apply tubular material 230 over the mandrel 382 in a manner to result in a material overhang 244 (FIGS. 34, 41 and 64) of tubular material 230 at each of the opposing ends of the mandrel 382.

FIG. 64 is a side view of the upstream and downstream ends of the tubular material-mandrel assembly 200 showing the material overhang 244 of tubular material 230 (e.g., a first layer of tubular material 232 and a second layer of tubular material 234) extending beyond the mandrel upstream end 388 and also extending beyond the mandrel downstream end 386. As mentioned above, in one example, the first layer of tubular material 232 may be a breather sock 240, and the second layer of tubular material 234 may be a film tube 250. FIG. 65 shows an end clamping element 264 installed on each of the opposing ends of the tubular material-mandrel assembly 200. Each end clamping element 264 may comprise a cord, a wire, a twist tie, or other similar device for cinching together the material overhang 244 at the mandrel upstream end 388 and at the mandrel downstream end 386. The end clamping elements 264 may restrict or prevent movement of the tubular material 230 relative to the mandrel 382 during the application of composite wrap plies 320 (FIGS. 75-78) over the tubular material-mandrel assembly 200, as described below.

Referring to FIGS. 66-67, shown respectively are top and sectional views of an example of the composite ply application station 270. The composite ply application station 270 has a wrap ply forming bed 272 containing at least one forming bed opening 274. The composite ply application station 270 may also include a ply lamination head 300, a ply trimming device 344, and a wrap ply folding mechanism 360 which may include a first wrap ply folding plate 362 and a second wrap ply folding plate 364 mounted respectively on opposite sides of the wrap ply forming bed 272. The wrap ply forming bed 272 is configured to receive one or more composite wrap plies 320 (FIG. 69) dispensed by the ply lamination head 300 to result in a wrap laminate 322 (FIG. 72). Each of the composite wrap plies 320 may be a fibrous material that is pre-impregnated with resin (e.g., prepreg). In one example, the composite wrap plies 320 may be epoxy-impregnated carbon fiber plies. The wrap laminate 322 may be trimmed by the ply trimming device 344 as described below. In addition, the wrap laminate 322 may be folded over the tubular material-mandrel assembly 200 by the first wrap ply folding plate 362 and the second wrap ply folding plate 364 in a manner described below.

In the example of FIGS. 66-67, the wrap ply forming bed 272 has 3 forming bed openings 274 configured as die cavities 278, each having a cross-sectional shape that is complementary to the cross-sectional shape and size respectively of 3 different mandrel configurations that may be prepared by the presently-disclosed mandrel preparation system 100. However, the wrap ply forming bed 272 may have any number of forming bed openings 274 of different cross-sectional shapes and sizes, and is not limited to 3 forming bed openings 274. In FIGS. 66-67, one of the die cavities 278 is contoured complementary to the cross-sectional shape and size of the tubular material-mandrel assembly 200 that is supported on the end preparation platform 262. As shown in FIGS. 73-74 and described below, the wrap laminate 322 may be urged downwardly into one of the die cavities 278 by the tubular material-mandrel assembly 200 until the wrap laminate 322 conforms to the cross-sectional shape of the die cavities 278. As shown in FIGS. 75-78 and described below, protruding portions of the wrap laminate 322 may be folded over into overlapping relation to each other on top of the tubular material-mandrel assembly 200 by the wrap ply folding mechanism 360 to produce a ply-tubular material-mandrel assembly 204. Although FIGS. 66-67 show each of the die cavities 278 contoured complementary to the cross-sectional shape of the mandrel 382 about which composite wrap plies 320 are to be formed, FIG. 85 shows a simplified configuration of a forming bed opening 274 which is configured to support a wrap laminate 322 only at the uppermost opposing side edges of the forming bed opening 274, as described in greater detail below.

Referring to FIGS. 68-69, shown in FIG. 68 is a side view of the end preparation platform 262 and the composite ply application station 270. FIG. 69 is a sectional view of the ply lamination station showing an example of the ply lamination head 300. The ply lamination head 300 is configured to be translated along a lengthwise direction of the composite ply application station 270 for laying up the wrap laminate 322 on the wrap ply forming bed 272. The ply lamination head 300 is configured to dispense one or more composite wrap plies 320 of composite material in centered relation over one of the die cavities 278. However, in an example of the composite ply application station 270 not shown, the ply lamination head 300 may be omitted, and the wrap laminate 322 may be manually laid up on the wrap ply forming bed 272.

In the example of FIGS. 68-69, the ply lamination head 300 may be supported on a head gantry 302 configured to move along the lengthwise direction of the composite ply application station 270. The composite ply application station 270 may include a device staging area 340 having one or more device stands 342 for temporarily storing a ply trimming device 344 while the ply lamination head 300 lays up the wrap laminate 322 on the wrap ply forming bed 272. The ply lamination head 300 may be supported on an upper beam 304 of the head gantry 302. In the example shown, the upper beam 304 may be cantilevered outwardly from a generally vertically oriented beam support 306 of the head gantry 302.

The head gantry 302 may be movable along one or more longitudinal tracks 308 extending along a lengthwise direction of the composite ply application station 270. In some examples, the ply lamination head 300 may also be configured to be movable along a transverse direction (e.g., perpendicular to the longitudinal tracks 308) along the upper beam 304 to allow the ply lamination head 300 to be centered over the die cavity 278 that has a cross-sectional shape and size that corresponds to the tubular material-mandrel assembly 200 at the end preparation platform 262. In addition to longitudinal and transverse movement, the ply lamination head 300 may also be rotatable about a vertical axis (not shown) and may also be vertically movable as may be required during the starting and stopping of the dispensing of each course of composite wrap ply 320 onto the wrap ply forming bed 272. Although the figures illustrate a head gantry 302 supporting the ply lamination head 300, the ply lamination head 300 may be supported by any one of a variety of different arrangements (e.g., a robotic device, a non-cantilevered gantry) for moving the ply lamination head 300 during the laying up of the wrap laminate 322, and is not limited to the above-described gantry configuration.

Referring still to FIGS. 68-69, the ply lamination head 300 may include a mounting frame 310 coupled to the upper beam 304. The ply lamination head 300 may include a material supply drum 312 supported on the mounting frame 310 and configured to support a material roll of composite material (e.g., prepreg) which may be backed by a backing layer. The ply lamination head 300 may further include a backing layer separation assembly 316 supported on the mounting frame 310 and configured to separate the backing layer from the composite material. The ply lamination head 300 may also include a backing layer collection drum 314 supported on the mounting frame 310 and configured to collect the backing layer after separation from the composite material as the composite material is applied onto the wrap ply forming bed 272 or onto previously applied composite wrap plies 320. The ply lamination head 300 may further include a compaction device 318 such as a compaction roller or a compaction shoe for applying compaction pressure to the composite material during dispensation from the ply lamination head 300 onto the wrap ply forming bed 272.

Referring now to FIGS. 70-72, shown in FIG. 70 is a side view of the end preparation platform 262 and the composite ply application station 270. FIG. 71 is a sectional view of the composite ply application station 270 showing an example of a ply trimming device 344 that may be included with the composite ply application station 270 for trimming the wrap laminate 322. Prior to trimming the wrap laminate 322, the head gantry 302 may transfer the ply lamination head 300 to the device staging area 340, and may release the ply lamination head 300 to one of the device stands 342 before moving over to the other device stand 342 at the device staging area 340, and coupling the head gantry 302 to the ply trimming device 344 supported on the other device stand 342.

FIG. 72 is a top view of the composite ply application station 270 showing the ply trimming device 344 positioned by the head gantry 302 at one of the ends of the wrap laminate 322 for trimming the wrap laminate 322 on the wrap ply forming bed 272. In the example shown, the ply trimming device 344 is configured as a stamp or punch-type trimming device configured to stamp-cut a relief notch 346 into each of opposing ends of the wrap laminate 322. However, the ply trimming device 344 may be configured to form any one of a variety of geometric shapes on or in the wrap laminate 322, and is not limited to forming a relief notch 346 in the opposing ends of the wrap laminate 322. For example, the ply trimming device 344 may be configured as a laser trimming device (not shown) configured to emit a laser beam for trimming the sides and/or the ends of the wrap laminate 322.

Referring to FIGS. 73-75, after the wrap laminate 322 has been laid up on the wrap ply forming bed 272, the tubular material-mandrel assembly 200 may be lifted off of the end preparation platform 262 and placed on top of the wrap laminate 322 supported on the wrap ply forming bed 272. In this regard, the end preparation station 260 may include a mandrel transfer mechanism 350 for transferring the tubular material-mandrel assembly 200 from the end preparation station 260 to the composite ply application station 270. In the example shown, the mandrel transfer mechanism 350 may comprise a lifting beam 352 having vacuum suction cups 354 located at spaced intervals along the length of the lifting beam 352 for vacuum coupling to the tubular material-mandrel assembly 200. The lifting beam 352 may be suspended from an overhead crane or gantry (not shown) which may be controlled by an operator or technician. As an alternative to the lifting beam 352, the mandrel transfer mechanism 350 may comprise alternative mechanisms including, but not limited to, a robotic device, a pick-and-place device, or other transfer mechanism. After lifting the tubular material-mandrel assembly 200 off of the end preparation platform 262, the lifting beam 352 may lower the tubular material-mandrel assembly 200 onto the wrap laminate 322 and urge the wrap laminate 322 into the die cavity 278 of the wrap ply forming bed 272. As shown in FIG. 75, the wrap laminate 322 may be laid up at a width such that when the wrap laminate 322 is urged into the cross-sectional shape of the die cavity 278, a first protruding portion 324 and a second protruding portion 326 of the wrap laminate 322 protrude outwardly from the opposite sides of the die cavity 278.

Referring to FIGS. 72 and 76-78, the composite ply application station 270 may include the above-mentioned wrap ply folding mechanism 360 which may include the first wrap ply folding plate 362 and the second wrap ply folding plate 364 mounted respectively on opposite sides of the wrap ply forming bed 272, and configured to respectively fold the first protruding portion 324 and the second protruding portion 326 into overlapping relation with each other on top of the tubular material-mandrel assembly 200. The first wrap ply folding plate 362 and the second wrap ply folding plate 364 may each be configured as relatively rigid (e.g., non-flexible or non-bendable) members. The first wrap ply folding plate 362 and the second wrap ply folding plate 364 may each be independently actuated by one or more folding plate actuators 366. The folding plate actuators 366 may be configured as telescopic mechanisms configured to extend and retract the folding plates as shown in FIGS. 76-78. However, the mandrel preparation system 100 may include any one of a variety of different arrangements for folding the first protruding portion 324 and second protruding portion 326 into overlapping relation with each other on top of the tubular material-mandrel assembly 200. For example, although not shown, the wrap ply folding mechanism 360 may comprise a pair of pivoting plates (not shown) for respectively folding the first protruding portion 324 and second protruding portion 326 over each other on top of the tubular material-mandrel assembly 200.

FIG. 75 shows the first wrap ply folding plate 362 and the second wrap ply folding plate 364 in a retracted position 370. FIG. 76 shows the lifting beam 352 removed from the tubular material-mandrel assembly 200, and the first wrap ply folding plate 362 moved into an extended position 372 which causes the first wrap ply folding plate 362 to fold the first protruding portion 324 of the wrap laminate 322 over on top of the tubular material-mandrel assembly 200. FIG. 77 shows the second wrap ply folding plate 364 moved into an extended position 372, and which causes the second wrap ply folding plate 364 to fold the second protruding portion 326 of the wrap laminate 322 over on top of the first protruding portion 324 to result in a wrap ply lap joint 328. The second wrap ply forming plate may include a heating element 368 for locally applying heat 256 for tacking together the first protruding portion 324 and the second protruding portion 326.

In FIG. 77, the heating element 368 may locally heat the resin in the overlapping portions of the first protruding portion 324 and second protruding portion 326 causing softening and intermingling of the resin in the first protruding portion 324 and second protruding portion 326. Upon cooling of the resin, the overlapping portions of the first protruding portion 324 and second protruding portion 326 may remain tacked together, which may thereby secure the wrap laminate 322 to the tubular material-mandrel assembly 200. In one example, the heating element 368 may be configured as a resistive wire mounted to or incorporated into the second wrap ply folding plate 364. After tacking together the first protruding portion 324 and second protruding portion 326 at the wrap ply lap joint 328, the first wrap ply folding plate 362 and the second wrap ply folding plate 364 may each be moved to the retracted position 370 as shown in FIG. 78. The lifting beam 352 may be vertically lowered and vacuum pressure may be applied to the vacuum suction cups 354 for vacuum coupling to the ply-tubular material-mandrel assembly 204 to thereby allow the lifting beam 352 to lift the ply-tubular material-mandrel assembly 204 out of the die cavity 278.

Referring to FIGS. 79-81, shown in FIGS. 79-80 is the mandrel transfer mechanism 350 (e.g., the lifting beam 352) removing the ply-tubular material-mandrel assembly 204 from the die cavity 278. In an example not shown, the mandrel transfer mechanism 350 may move the ply-tubular material-mandrel assembly 204 to a bladder kitting station (not shown) for final preparation prior to installation of the ply-tubular material-mandrel assembly 204 into a stringer cavity 408 (FIG. 90) of a composite stringer 406 (FIG. 90). FIG. 81 shows an example of a ply-tubular material-mandrel assembly 204 in which the mandrel 382 is configured as a bladder 394 having end fittings 390 and which is covered by breather sock 240, which is in turn covered by a film tube 250. The film tube 250 is covered by the composite wrap plies 320. The film tube 250, the breather sock 240, and the composite wrap plies 320 are shown partially cut away to show the layers of the assembly surrounding the bladder 394.

Referring to FIGS. 82-85, shown are examples of alternative configurations of the wrap ply forming bed 272 for accommodating different mandrel cross-sectional shapes and sizes. FIG. 82 shows an example of a rotatable forming die 282 having a plurality of uniquely-shaped die cavities 278 each corresponding to the cross-sectional shape and/or size of a mandrel 382 that the mandrel preparation system 100 is capable of processing. FIG. 83 shows an example of a horizontally translatable forming die 280 having a plurality of die cavities 278, and which is horizontally movable within a recess to allow for centering or alignment of the die cavities 278 with the ply lamination head 300 (FIG. 69), which may be non-movable in a transverse direction (e.g., perpendicular to the lengthwise direction of the composite ply application station 270).

FIG. 84 shows an example of a composite ply application station 270 having a recess configured to receive a replaceable forming die 284 containing a single die cavity 278. The replaceable forming die 284 may be removed and replaced with any one of a variety of other replaceable forming dies 276 each having a single, uniquely-shaped or sized die cavity 278. Any one of the above-described wrap ply forming bed configurations may be implemented for laying up, trimming, and forming a wrap laminate 322 (FIG. 71) in a manner similar to the above-described operations shown in FIGS. 68-78. FIG. 85 shows an example of a wrap ply forming bed 272 having a forming bed opening 274 configured to support a wrap laminate 322 only at the opposing side edges of the forming bed opening 274. As mentioned above, the tubular material-mandrel assembly 200 may urge the wrap laminate 322 downwardly into the forming bed opening 274 to drape-form the wrap laminate 322 to at least partially surround the tubular material-mandrel assembly 200, and thereby result in a ply-tubular material-mandrel assembly 204.

Referring to FIGS. 86-90, shown in FIG. 86 is an example of an aircraft 400 which may include one or more components formed of composite material. FIG. 87 shows an example of a composite skin panel 404 of a composite wing 402 of the aircraft 400. The composite skin panel 404 includes a plurality of longitudinally extending composite stringers 406 located on the skin surface of a composite skin panel 404. The composite skin panel 404 and/or the composite stringers 406 may be manufactured using one or more ply-tubular material-mandrel assemblies 204 produced using the presently-disclosed mandrel preparation system 100 and method 500. FIG. 88 is a sectional view of the composite skin panel 404 showing a plurality of composite stringers 406 mounted on the skin inner surface. FIG. 89 is an enlarged view of one of the composite stringers 406 co-cured or co-bonded to the composite skin panel 404. FIG. 90 shows an example of a ply-film-sock-mandrel assembly 206 (e.g., a ply-tubular material-mandrel assembly 204) protruding from the stringer cavity 408 of a composite stringer 406 formed and/or cured using the ply-film-sock-mandrel assembly 206. The composite stringer 406 may be manufactured by assembling and co-curing a cover laminate 410 and a base laminate 412 with the wrap laminate 322 of the ply-film-sock-mandrel assembly 206.

Referring to FIG. 91, shown is a flow chart of operations included in a method 500 of applying a tubular material 230 over an elongated member 380, such as a mandrel 382 or a bladder 394 as described above. The method 500 may be implemented using the above-described examples of the tubular material application system 116, which may be part of a mandrel preparation system 100. The method 500 may be part of a process of preparing the mandrel 382 (e.g., or bladder) for use in manufacturing a composite stringer 406.

The method 500 may include storing a plurality of mandrels 382 at a mandrel staging station 106 which may be located upstream of the tubular material application system 116. The method 500 may include moving a plurality of mandrels 382 along a conveyor system 108, and sequentially positioning each mandrel 382 into alignment with the upstream end of the tubular material application system 116. The conveyor system 108 may be operated in a pulsing manner wherein the conveyor system 108 stops whenever a mandrel 382 on the conveyor belt 110 becomes aligned with the tubular material application system 116, and the mandrel 382 may then be manually or autonomously moved into the tubular material application system 116 to start the process of applying one or more layers of tubular material 230 over the mandrel 382, as described below. The method 500 may include activating one or more drive rollers 104 for moving each mandrel 382 into, through, and out of the tubular material application system 116, and through one or more stations of the mandrel preparation system 100. As mentioned above, the starting and stopping of the drive rollers 104 may be controlled by a controller 102 which may also control the operation of the various components of the tubular material application system 116 and the composite ply application station to 70 and other components that may make up the mandrel preparation system 100.

The method 500 may include supporting the mandrel 382 on a plurality of mandrel support stands 190 of the tubular material application system 116. As described above, the plurality of mandrel support stands 190 may be located at spaced intervals relative to each other. At least one of the mandrel support stands 190 may include a mandrel support actuator 192 having a mandrel support piston 194 extending from a mandrel support cylinder 196. One or more of the mandrel support stands 190 may include a drive roller 104 mounted on the mandrel support piston 194 for supporting the mandrel 382 in centered relation to the gripper system 130.

The method 500 may include applying (e.g., manually) the tubular material 230 over the mandrel downstream end 386 in preparation for engagement of the tubular material 230 by the first gripper 150 and second gripper 152 of the gripper system 130. As mentioned above, the tubular material 230 may be any one of a variety of different types of materials including, but not limited to, a breather material 238 or a film material 248. The application of the tubular material 230 over the mandrel downstream end 386 may include forming a gathered portion 242 of the tubular material 230 between a longitudinal location of the first gripper 150 and a longitudinal location of the second gripper 152 such that when the first gripper 150 and the second gripper 152 are engaged to the tubular material 230, the first gripper 150 is located on an immediate upstream side of the gathered portion 242 and the second gripper 152 is located on an immediate downstream side of the gathered portion 242.

Step 502 of the method 500 includes engaging the first gripper 150 and the second gripper 152 of the gripper system 130 to the tubular material 230 covering the mandrel downstream end 386. The method 500 may include vertically positioning the first gripper 150 and/or the second gripper 152 relative to the mandrel 382 using the gripper actuators 144. For example, prior to applying the tubular material 230 over the mandrel downstream end 386, the method 500 may include maintaining the gripper arms 158 of the first gripper 150 and second gripper 152 above the level of the mandrel 382 to provide clearance for installing the tubular material 230 over the mandrel downstream end 386. Prior to the gripper arms 158 engaging the tubular material 230, the method 500 may include activating the gripper actuators 144 of the first gripper 150 and second gripper 152 to move the gripper arms 158 of the first gripper 150 and second gripper 152 downwardly to the vertical level of the mandrel 382.

With the gripper arms 158 at the vertical level of the mandrel 382, the method 500 may include moving the gripper arms 158 (e.g., via the gripper arm servomotors 164) from a non-engaged position 180 to an engaged position 182 wherein the gripper arms 158 engage with localized portions of the tubular material 230. In this regard, the method 500 may include engaging the first gripper 150 and/or the second gripper 152 to localized portions of the tubular material 230 via at least one of vacuum engagement and mechanical engagement. For example, the method 500 may include vacuum coupling the gripper arms 158 to the tubular material 230 at a plurality of vacuum apertures 170 included with the first gripper 150 and/or the second gripper 152. As described above, the first gripper 150 and/or second gripper 152 may include vacuum apertures 170 located along an inner surface of the gripper arms 158. The vacuum apertures 170 may be fluidly coupled to a vacuum pressure source 172 for vacuum engagement of the gripper arm to the tubular material 230, which may be a non-porous material such as a film material 248. The method 500 may also include mechanically coupling the gripper arms 158 to the tubular material 230 using a plurality of hook elements 174 located along the inner surfaces of the gripper arm for mechanical engagement to the tubular material 230, which may be a fibrous tubular material 230 such as breather material 238. As mentioned above, once the gripper arms 158 of the first gripper 150 and second gripper 152 are engaged to the tubular material 230 (e.g., at the mandrel downstream end 386), the gripper arms 158 remain engaged to the tubular material 230 throughout the inchworm-type movement of the gripper system 130 along the mandrel length, after which the gripper arms 158 are moved into the non-engaged position 180 to release the locally-engaged portions of the tubular material 230 from the gripper arms 158 (e.g., at the mandrel upstream end 388).

Step 504 of the method 500 includes moving the gripper system 130 with inchworm-type movement relative to the mandrel 382, and incrementally applying the tubular material 230 onto the mandrel 382 to thereby result in a tubular material-mandrel assembly 200. The first gripper 150 and the second gripper 152 move relative to each other with inchworm-type movement from the mandrel downstream end 386 to the mandrel upstream end 388. The step of moving the gripper system 130 with inchworm-type movement may include moving, using the gripper drive assembly 132, the first gripper 150 and second gripper 152 relative to each other along the mandrel 382. As described above, the gripper drive assembly 132 may include a first drive screw 134 and a second drive screw 136 respectively rotatably driven by a first drive motor 140 and a second drive motor 142 configured to respectively move the first gripper 150 and second gripper 152 relative to each other in the inchworm-type movement along the mandrel 382. Alternatively, the inchworm-type movement of the gripper system 130 may be performed using one or more robotic devices (not shown) respectively coupled to the first gripper 150 and second gripper 152.

As described above with reference to FIGS. 21-34, the inchworm-type movement of the gripper system 130 may include moving the gripper arms 158 (e.g., via the gripper arm servomotors 164) of the second gripper 152 into the clamped position 184 (FIG. 25), thereby clamping the gripper arms 158 and a locally-engaged portion of the tubular material 230 against the mandrel 382. The gripper arms 158 of the first gripper 150 may remain in the unclamped position 186 (FIG. 24) while the first gripper 150 is moved (e.g., via the gripper drive assembly 132) relative the mandrel 382 in an upstream direction, and the second gripper 152 is stationary relative to the mandrel 382. The first gripper 150 may be moved in an upstream direction until the gathered portion 242 of the tubular material 230 is in an extended state between the first gripper 150 and the second gripper 152 as shown in FIG. 26. The gripper arms 158 of the first gripper 150 are then moved (e.g., via the gripper arm servomotors 164) from the unclamped position 186 (FIG. 27) to the clamped position 184 (FIG. 20), and the gripper arms 158 of the second gripper 152 are moved (e.g., via the gripper arm servomotors 164) from the clamped position 184 (FIG. 20) into the unclamped position 186 (FIG. 30). The second gripper 152 may then be moved (e.g., via the gripper drive assembly 132) in the upstream direction toward the first gripper 150 to form another gathered portion 242 between the first gripper 150 and the second gripper 152 as shown in FIG. 31.

The above-described inchworm-type movement of the first gripper 150 and second gripper 152 may be repeated until the first gripper 150 reaches the mandrel upstream end 388, resulting in the tubular material 230 being applied over the length of the mandrel 382. As mentioned above, the first gripper 150 may be initially engaged to the tubular material 230 such that a portion of the tubular material 230 extends upstream of the gripper arms 158 of the first gripper 150. When the first gripper 150 reaches the mandrel upstream end 388, the portion of the tubular material 230 extending upstream of the first gripper 150 may extend beyond the mandrel upstream end 388, and resulting in the material overhang 244 shown in FIG. 34. The gripper arms 158 of the first gripper 150 and second gripper 152 may be released from the tubular material 230 at the mandrel upstream end 388, and moved (e.g., via the gripper drive assembly 132) back to the mandrel downstream end 386 in preparation for the optional application of another layer of tubular material 230 over the same mandrel 382.

The method 500 may include moving the gripper system 130 with the inchworm-type movement along the mandrel 382 while the mandrel 382 is stationary, as shown in the example of FIGS. 21-34. In this regard, the mandrel 382 may be statically positioned on the mandrel support stands 190 during the inchworm-type movement of the gripper system 130. In such an arrangement, the method 500 may include individually activating the mandrel support actuators 192 for temporarily retracting the mandrel support stands 190 downwardly away from the mandrel 382 during the inchworm-type movement of the gripper system 130 while the remaining mandrel support stands 190 continue to support the mandrel 382 during the application of tubular material 230 onto the mandrel 382. The mandrel support actuators 192 may retract the mandrel support stands 190 by an amount providing clearance for the first gripper 150 and second gripper 152 passing over the mandrel support stand 190, after which the mandrel support actuators 192 may return the mandrel support stands 190 upwardly to their original vertical position. During the temporary retraction of each mandrel support stand 190, the remaining mandrel support stands 190 may be maintained at their original vertical position.

As an alternative to vertically retracting the mandrel support stands 190 to provide clearance for the first gripper 150 and second gripper 152, the method 500 may include maintaining the mandrel support stands 190 at the same vertical level, and temporarily lifting, using the gripper actuators 144 of the first gripper 150 and the second gripper 152, lengthwise sections of the mandrel 382 up and over one or more of the mandrel support stands 190 during the inchworm-type movement of the gripper system 130, as shown in FIG. 35-40. In the example shown, the gripper arms 158 of the first gripper 150 and second gripper 152 may be lifted in unison with each other.

As an alternative to moving the gripper system 130 over a stationary mandrel 382 during inchworm-type movement of both the first gripper 150 and second gripper 152, the method 500 may include moving the mandrel 382 in a pulsing manner while the first gripper 150 is stationary and the second gripper 152 moves longitudinally relative to the first gripper 150, as shown in FIGS. 50-58 and described above. In such an arrangement, the method 500 may include positioning a length of tubular material 230 on a material support table 122 located immediately downstream of the gripper system 130. The length of the tubular material 230 may be at least as long as the mandrel 382. The method 500 may include applying (e.g., manually) a lengthwise section of the tubular material 230 over the mandrel downstream end 386 in a manner as described above. As mentioned above, the pulsing movement of the mandrel 382 may be effectuated by one or more drive rollers 104 that may be included with the mandrel preparation system 100, such as a drive roller 104 located between the mandrel staging station 106 and the tubular material application station 114, and/or by one or more drive rollers (not shown) that may be included with the tubular material application system 116. Regardless of location, one or more drive rollers 104 may move the mandrel 382 in a pulsing manner along the downstream direction in coordination with movement of the second gripper 152 toward and away from the first gripper 150 to effectuate the inchworm-type movement of the gripper system 130 for applying the tubular material 230 over the mandrel 382.

Regardless of whether the mandrel 382 is stationary or moving during the application of tubular material 230, once the tubular material 230 is applied over a desired length (e.g., an entire length) of the mandrel 382, the method 500 may include moving (e.g., via the gripper arm servomotors 164) the gripper arms 158 of the first gripper 150 and second gripper 152 from the engaged position 182 (FIG. 23) to the non-engaged position 180 (FIG. 22), causing the locally-engaged portions of tubular material 230 to disengage or detach from the gripper arms 158. The method 500 may include raising, using the gripper actuators 144, the first gripper 150 and the second gripper 152 above the level of the mandrel 382 at the mandrel upstream end 388, and returning the first gripper 150 and second gripper 152 to the downstream end of the tubular material application station 114 in preparation for the optional application of another layer of tubular material 230 over the same mandrel 382 or another mandrel 382.

The method 500 may additionally include cutting, using a material cutting device 210 located downstream of the gripper system 130, the tubular material 230 after applying the tubular material 230 onto the mandrel 382. As shown in FIGS. 41-43 and described above, the tubular material 230 may be cut in order to separate the tubular material 230 on the mandrel 382 from the tubular material 230 on the tubular material spool 222. The cutting of the tubular material 230 may be performed manually or autonomously under control of the controller 102. For example, the tubular material application system 116 may include the above-described material cutting device 210 which may be controlled by the controller 102.

For examples where the tubular material 230 comprises a shrink wrap film, the method 500 may include heating, using a heat shrink device 252, the shrink wrap film of the tubular material-mandrel assembly 200 in a manner to shrink the shrink wrap film and thereby contract or compact the shrink wrap film against the mandrel surfaces 384. As shown in FIG. 60-61, in one example, the method 500 may include moving the tubular material-mandrel assembly 200 (e.g., film-sock-mandrel assembly 202) through a heat shrink oven 254 to apply heat to the shrink wrap film. Alternatively, the method 500 may include holding the tubular material-mandrel assembly stationary, and passing a heat source (e.g., one or more heat guns—not shown) over the tubular material-mandrel assembly 200 for heating and thereby contracting the shrink wrap film.

The method 500 may further include gathering the material overhang 244 at the mandrel upstream end 388 and/or mandrel downstream end 386, and installing an end clamping element 264 (a cord, wire, twist tie, etc.) onto the material overhangs 244 on at least one of opposing ends of the tubular material-mandrel assembly 200 (e.g., film-sock-mandrel assembly 202). The application of the end clamping elements 264 on the material overhangs 244 may restrict axial movement of the tubular material 230 relative to the mandrel 382 during the application of the composite wrap plies 320. The application of the end clamping elements 264 may be performed on the end preparation platform 262 which may be located downstream of the tubular material application station 114.

The method 500 may additionally include receiving, at a composite ply application station 270, one or more composite wrap plies 320 over a die cavity 278 of a wrap ply forming bed 272 to result in a wrap laminate 322 as shown in FIGS. 69 and 72. The composite wrap plies 320 may be laid up over a forming bed opening 274 which may be a die cavity 278 of a forming die 276. As described above, the die cavity 278 may have a cross-sectional shape and size that is complementary to the cross-sectional shape and size of the mandrel 382. The step of receiving the composite wrap plies 320 over the forming bed opening 274 may include dispensing, using the above-described ply lamination head 300, one or more composite wrap plies 320 of composite material over the forming bed opening 274 of the die cavity 278 to result in a wrap laminate 322.

After the ply lamination head 300 dispenses the composite wrap plies 320 over the forming bed opening 274 to form a wrap laminate 322, the method 500 may additionally include trimming, using a ply trimming device 344, the wrap laminate 322 prior to urging the wrap laminate 322 into the forming bed opening 274. In one example, trimming of the wrap laminate 322 may be performed by punch trimming the wrap laminate 322 using a punch trimming device. The punch trimming device may stamp-cut a relief notch 346 into each of the opposing ends of the wrap laminate 322. The relief notches 346 in each of the opposing ends of the wrap laminate 322 may be shaped and sized complementary to the end fittings 390 on opposing ends of the mandrel 382. However, the ply trimming device 344 may be provided in alternative configurations such as a laser trimming device (not shown) configured to form any one of a variety of geometric shapes and sizes of cuts, profiles, holes and/or notches in the wrap laminate 322.

The method 500 may include urging, using the tubular material-mandrel assembly 200, the wrap laminate 322 into the die cavity 278 to produce a ply-tubular material-mandrel assembly 204. The forming bed opening 274 may comprise one of several die cavities 278 that may be included in the wrap ply forming bed 272. The ply-tubular material-mandrel assembly 204 may be positioned on top of the wrap laminate 322 in alignment with or centered on the forming bed opening 274. The lifting of the ply-tubular material-mandrel assembly 204 off of the end preparation platform 262 and onto the wrap laminate 322 may be performed by the above-described mandrel transfer mechanism 350 which may be configured as a lifting beam 352 having vacuum suction cups 354 for vacuum engagement to the ply-tubular material-mandrel assembly 204. The weight or mass of the ply-tubular material-mandrel assembly 204 may urge the wrap laminate 322 into the forming bed opening 274, and may facilitate the wrap laminate 322 conforming to the cross-sectional shape of the die cavity 278. Alternatively or additionally, a downward force (not shown) may be applied by the mandrel transfer mechanism 350 to facilitate the urging of the ply-tubular material-mandrel assembly 204 and wrap laminate 322 into the die cavity 278.

After the wrap laminate 322 and the ply-tubular material-mandrel assembly 204 have been urged into the forming bed opening 274 (e.g., into the die cavity 278), the method 500 may include sequentially folding, using a wrap ply folding mechanism 360, the first protruding portion 324 and the second protruding portion 326 of the wrap laminate 322 over each other on top of the ply-tubular material-mandrel assembly 204 to result in a wrap ply lap joint 328 as shown in FIGS. 76-78. For example, the method 500 may include moving a first wrap ply folding plate 362 from the retracted position 370 to the extended position 372 for folding the first protruding portion 324 of the wrap laminate 322 over on top of the ply-tubular material-mandrel assembly 204, followed by moving a second wrap ply folding plate 364 from the retracted position 370 to the extended position 372 for folding the second protruding portion 326 of the wrap laminate 322 on top of the first protruding portion 324 to result in the wrap ply lap joint 328. The method 500 may additionally include locally heating and tacking together, using a heating element 368 of the second wrap ply folding plate 364, the first protruding portion 324 and the second protruding portion 326 at the wrap ply lap joint 328 to produce the ply-tubular material-mandrel assembly 204. After forming the wrap ply lap joint 328, the method 500 may include lifting the ply-tubular material-mandrel assembly 204 off of the wrap ply forming bed 272 and transferring the ply-tubular material-mandrel assembly 204 to a bladder kitting station (not shown) prior to assembly of the ply-tubular material-mandrel assembly 204 with a cover laminate 410 and a base laminate 412 for co-curing with the wrap laminate 322 to result in the composite stringer 406.

As mentioned above, any one or more of the above-described operations may be controlled by a controller 102. For example, the controller 102 may control the operation of the various components that make up the mandrel preparation system 100. The controller 102 may control the operation of the gripper system 130 including the vertical motion and horizontal motion of the first gripper 150 and second gripper 152, the movement of the mandrel 382 along the conveyor system 108 of the mandrel staging station 106, the movement of the mandrel 382 through the mandrel preparation system 100, including movement of the mandrel 382 through the tubular material application station 114, the end preparation station 260, and the composite ply application station 270. The controller 102 may be comprised of one or more processors configured to execute computable readable program instructions (e.g., a numerical-control program) that may be preprogrammed for manufacturing a tubular material-mandrel assembly 200 (e.g., film-sock-mandrel assembly 202), and/or a ply-tubular material-mandrel assembly 204 (e.g., a ply-film-sock-mandrel assembly 206).

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A tubular material application system for applying a tubular material onto an elongate mandrel, comprising:
   a gripper system including a first gripper and a second gripper configured to move independent of each other with inchworm-type movement along an elongated mandrel and incrementally apply a tubular material onto the mandrel to thereby result in a tubular material-mandrel assembly, the inchworm-type movement comprising movement of the first gripper away from the second gripper, followed by movement of the second gripper toward the first gripper, and repeating the movement of the first and second grippers.

2. The tubular material application system of claim 1, further comprising:
   a motorized gripper drive assembly configured to move the first gripper and second gripper relative to each other in the inchworm-type movement relative to the mandrel.

3. The tubular material application system of claim 2, wherein the first gripper and the second gripper each comprise:

a plurality of gripper arms movable between a clamped position and an unclamped position for respectively clamping against and expanding away from the mandrel during the inchworm-type movement of the gripper system;

at least some of the gripper arms having one or more gripping elements for engaging a portion of the tubular material;

the gripper arms in the clamped position configured to clamp the tubular material against the mandrel during the inchworm-type movement of the gripper system; and the gripper arms in the unclamped position configured to remain engaged to the tubular material and allow the mandrel to move relative to the gripper arms during the inchworm-type movement of the gripper system.

4. The tubular material application system of claim 3, wherein the one or more gripping elements comprises at least one of the following:

a plurality of vacuum apertures located along an inner surface of at least one gripper arm and fluidly coupled to a vacuum pressure source for vacuum engagement of the gripper arm to the tubular material; and a plurality of hook elements located along the inner surface of the gripper arm for mechanical engagement of the gripper arm to the tubular material.

5. The tubular material application system of claim 1, wherein:

the gripper system is configured to move with the inchworm-type movement along the mandrel while the mandrel is stationary.

6. The tubular material application system of claim 1, further comprising:

a plurality of mandrel support stands located at spaced intervals relative to each other and configured to support the mandrel during the application of the tubular material.

7. The tubular material application system of claim 6, wherein:

the mandrel support stands are individually retractable away from the mandrel by an amount providing clearance for the gripper system passing by the mandrel support stand during the inchworm-type movement of the gripper system while the remaining mandrel support stands continue to support the mandrel during the application of the tubular material.

8. The tubular material application system of claim 6, wherein:

the mandrel support stands are stationary and the gripper system is configured to be vertically movable for lifting lengthwise sections of the mandrel up and over one or more of the mandrel support stands during the inchworm-type movement of the gripper system along the mandrel.

9. The tubular material application system of claim 1, further comprising:

one or more drive rollers configured to move the mandrel in a pulsing manner while the first gripper is stationary and the second gripper moves longitudinally relative to the first gripper during the inchworm-type movement of the gripper system relative to the mandrel, the pulsing manner comprising movement of the mandrel, following by temporary non-movement of the mandrel in a starting and stopping manner.

10. A mandrel preparation system for use in manufacturing a composite stringer, comprising:

a tubular material application station having a gripper system, the gripper system including a first gripper and a second gripper configured to move with inchworm-type movement along an elongated mandrel and incrementally apply a tubular material onto the mandrel to thereby result in a tubular material-mandrel assembly, the inchworm-type movement comprising movement of the first gripper away from the second gripper, followed by movement of the second gripper toward the first gripper, and repeating the movement of the first and second grippers; and a composite ply application station located downstream of the tubular material application station and having a wrap ply forming bed containing at least one forming bed opening, the wrap ply forming bed configured to receive one or more wrap plies of a wrap laminate for urging into the forming bed opening by the tubular material-mandrel assembly to produce a ply-tubular material-mandrel assembly for assembly with a composite stringer.

11. A method of applying a tubular material onto an elongated mandrel, comprising:

engaging a first gripper and a second gripper of a gripper system to a tubular material covering a mandrel downstream end of an elongate mandrel; and moving the first gripper and the second gripper independent of each other with inchworm-type movement relative to the mandrel from the mandrel downstream end to a mandrel upstream end for incrementally applying the tubular material onto the mandrel to thereby result in a tubular material-mandrel assembly, the inchworm-type movement comprising movement of the first gripper away from the second gripper, followed by movement of the second gripper toward the first gripper, and repeating the movement of the first and second grippers.

12. The method of claim 11, wherein prior to engaging the first gripper and the second gripper to the tubular material, the method comprising:

applying the tubular material over the mandrel downstream end; and forming a gathered portion of the tubular material between a longitudinal location of the first gripper and a longitudinal location of the second gripper such that when the first gripper and the second gripper are engaged to the tubular material, the first gripper is on an immediate upstream side of the gathered portion and the second gripper is on an immediate downstream side of the gathered portion.

13. The method of claim 11, wherein moving the gripper system with inchworm-type movement along the mandrel comprises:

moving, using a motorized gripper drive assembly, the first gripper and second gripper relative to each other in the inchworm-type movement along the mandrel.

14. The method of claim 13, wherein engaging the first gripper and the second gripper to the tubular material comprises:

engaging at least one of the first gripper and the second gripper to the tubular material via at least one of vacuum engagement and mechanical engagement.

15. The method of claim 14, wherein engaging at least one of the first gripper and the second gripper to the tubular material via at least one of vacuum engagement and mechanical respectively comprises:

vacuum coupling to the tubular material at a plurality of vacuum apertures included with the first gripper and/or the second gripper; and mechanically coupling to the tubular material using a plurality of hook elements included with the first gripper and/or the second gripper.

16. The method of claim 11, wherein moving the gripper system with inchworm-type movement relative to the mandrel comprises:

moving the gripper system with the inchworm-type movement along the mandrel while the mandrel is stationary.

17. The method of claim 11, further comprising:

supporting the mandrel using a plurality of mandrel support stands located at spaced intervals relative to each other.

18. The method of claim 17, wherein moving the gripper system with inchworm-type movement relative to the mandrel includes:

individually retracting the mandrel support stands away from the mandrel by an amount providing clearance for the gripper system passing by the mandrel support stand during the inchworm-type movement of the gripper system while the remaining mandrel support stands continue to support the mandrel during the applying of the tubular material.

19. The method of claim 17, wherein the mandrel support stands are stationary, and moving the gripper system with inchworm-type movement relative to the mandrel includes:

lifting, using the first gripper and the second gripper, lengthwise sections of the mandrel up and over one or more of the mandrel support stands during the inchworm-type movement of the gripper system.

20. The method of claim 11, wherein moving the gripper system with inchworm-type movement relative to the mandrel includes:

moving the mandrel in a pulsing manner while the first gripper is stationary and the second gripper moves longitudinally relative to the first gripper, the pulsing manner comprising movement of the mandrel, following by temporary non-movement of the mandrel in a starting and stopping manner.

* * * * *